(12) United States Patent
Goldfarb

(10) Patent No.: US 8,515,786 B2
(45) Date of Patent: Aug. 20, 2013

(54) RULE GENERATION SYSTEM ADAPTED FOR AN INSURANCE CLAIM PROCESSING SYSTEM

(75) Inventor: Eugene Goldfarb, Whitehouse Station, NJ (US)

(73) Assignee: Accenture Global Services GmbH, Dublin (IE)

( * ) Notice: Subject to any disclaimer, the term of this patent is extended or adjusted under 35 U.S.C. 154(b) by 1411 days.

(21) Appl. No.: 12/036,115

(22) Filed: Feb. 22, 2008

(65) Prior Publication Data

US 2009/0216803 A1 Aug. 27, 2009

(51) Int. Cl.
*G06Q 40/00* (2012.01)
*G06F 7/00* (2006.01)

(52) U.S. Cl.
USPC ............................................. 705/4; 707/758

(58) Field of Classification Search
None
See application file for complete search history.

(56) References Cited

U.S. PATENT DOCUMENTS

| | | | |
|---|---|---|---|
| 4,648,037 A | 3/1987 | Valentino |
| 4,713,755 A | 12/1987 | Worley, Jr. et al. |
| 4,796,181 A | 1/1989 | Wiedemer |
| 4,831,526 A | 5/1989 | Luchs et al. |
| 4,975,840 A | 12/1990 | DeTore et al. |
| 5,093,794 A | 3/1992 | Howie et al. |
| 5,128,859 A | 7/1992 | Carbone et al. |
| 5,181,162 A | 1/1993 | Smith et al. |
| 5,182,705 A | 1/1993 | Barr et al. |
| 5,191,522 A | 3/1993 | Bosco et al. |
| 5,208,748 A | 5/1993 | Flores et al. |
| 5,216,603 A | 6/1993 | Flores et al. |
| 5,241,664 A | 8/1993 | Ohba et al. |
| 5,253,362 A | 10/1993 | Nolan et al. |
| 5,307,262 A | 4/1994 | Ertel |
| 5,325,291 A | 6/1994 | Garrett et al. |
| 5,367,619 A | 11/1994 | Dipaolo et al. |
| 5,386,556 A | 1/1995 | Hedin et al. |
| 5,392,428 A | 2/1995 | Robins |
| 5,404,518 A | 4/1995 | Gilbertson et al. |

(Continued)

FOREIGN PATENT DOCUMENTS

| | | |
|---|---|---|
| EP | 0841612 A2 | 5/1998 |
| EP | 0844558 A2 | 5/1998 |

(Continued)

OTHER PUBLICATIONS

"Mantas and IBM Offer Joint Solution to Help Detect and Address Mutual Fund Abuses; Companies to Promote Comprehensive Compliance Solutions for Financial Markets", Feb. 7, 2004, www.buisinesswire.com.*

(Continued)

*Primary Examiner* — Charles Kyle
*Assistant Examiner* — Irene Kang
(74) *Attorney, Agent, or Firm* — Brinks Hofer Gilson & Lione

(57) ABSTRACT

A rule generation system facilitates the dynamic generation of rules for an insurance claim processing computer system. The rule generation system includes various modules and graphical user interfaces that provide a streamlined mechanism for creating new rules for the insurance claim processing architecture. The rule generation system may include various levels of usability that distinguish between an advanced user of the rule generation system and basic user that uses the generated rules. The rule generation system may also include graphical user interfaces directed to adding, editing, removing, or maintaining rules for the insurance claim processing computer system.

19 Claims, 26 Drawing Sheets

(56) References Cited

U.S. PATENT DOCUMENTS

| | | | |
|---|---|---|---|
| 5,420,973 A | 5/1995 | Dagdeviren | |
| 5,428,731 A | 6/1995 | Powers, III | 395/154 |
| 5,445,653 A | 8/1995 | Hixson et al. | |
| 5,446,653 A | 8/1995 | Miller et al. | |
| 5,523,942 A | 6/1996 | Tyler et al. | |
| 5,530,861 A | 6/1996 | Diamant et al. | |
| 5,557,515 A | 9/1996 | Abbruzzese et al. | |
| 5,581,682 A | 12/1996 | Anderson et al. | |
| 5,592,611 A | 1/1997 | Midgely et al. | |
| 5,602,982 A | 2/1997 | Judd et al. | 395/326 |
| 5,613,108 A | 3/1997 | Morikawa | |
| 5,627,764 A | 5/1997 | Schutzman et al. | |
| 5,630,069 A | 5/1997 | Flores et al. | |
| 5,632,015 A | 5/1997 | Zimowski et al. | |
| 5,640,501 A | 6/1997 | Turpin | |
| 5,649,182 A | 7/1997 | Reitz | |
| 5,655,085 A | 8/1997 | Ryan et al. | |
| 5,664,109 A | 9/1997 | Johnson et al. | |
| 5,671,360 A | 9/1997 | Hambrick et al. | |
| 5,673,402 A | 9/1997 | Ryan et al. | |
| 5,675,745 A | 10/1997 | Oku et al. | |
| 5,687,385 A | 11/1997 | Janay | |
| 5,692,501 A | 12/1997 | Minturn | |
| 5,701,400 A | 12/1997 | Amado | |
| 5,706,452 A | 1/1998 | Ivanov | |
| 5,721,913 A | 2/1998 | Ackroff et al. | |
| 5,721,940 A | 2/1998 | Luther et al. | |
| 5,724,575 A | 3/1998 | Hoover et al. | |
| 5,726,884 A | 3/1998 | Sturgeon et al. | |
| 5,734,837 A | 3/1998 | Flores et al. | |
| 5,742,836 A | 4/1998 | Turpin et al. | |
| 5,745,687 A | 4/1998 | Randell | |
| 5,745,901 A | 4/1998 | Entner et al. | |
| 5,752,055 A | 5/1998 | Redpath et al. | |
| 5,754,858 A | 5/1998 | Broman et al. | 395/701 |
| 5,758,351 A | 5/1998 | Gibson et al. | |
| 5,765,170 A | 6/1998 | Morikawa | |
| 5,768,506 A | 6/1998 | Randell | |
| 5,790,116 A | 8/1998 | Malone et al. | |
| 5,799,297 A | 8/1998 | Goodridge et al. | |
| 5,809,318 A | 9/1998 | Rivette et al. | |
| 5,809,478 A | 9/1998 | Greco et al. | |
| 5,819,230 A | 10/1998 | Christie et al. | |
| 5,826,020 A | 10/1998 | Randell | |
| 5,826,237 A | 10/1998 | Macrae et al. | |
| 5,826,239 A | 10/1998 | Du et al. | |
| 5,836,011 A | 11/1998 | Hambrick et al. | |
| 5,839,112 A | 11/1998 | Schreitmueller et al. | |
| 5,845,289 A | 12/1998 | Baumeister et al. | |
| 5,848,271 A | 12/1998 | Caruso et al. | |
| 5,848,393 A | 12/1998 | Goodridge et al. | |
| 5,855,005 A | 12/1998 | Schuler et al. | |
| 5,860,066 A | 1/1999 | Rouse | |
| 5,862,327 A | 1/1999 | Kwang et al. | |
| 5,867,385 A | 2/1999 | Brown et al. | |
| 5,870,711 A | 2/1999 | Huffman | |
| 5,873,066 A | 2/1999 | Underwood et al. | |
| 5,875,330 A | 2/1999 | Goti | |
| 5,881,230 A | 3/1999 | Christensen et al. | |
| 5,884,256 A | 3/1999 | Bennett et al. | |
| 5,886,693 A | 3/1999 | Ho et al. | |
| 5,890,130 A | 3/1999 | Cox et al. | |
| 5,890,133 A | 3/1999 | Ernst | |
| 5,899,989 A | 5/1999 | Ikeuchi et al. | |
| 5,903,873 A | 5/1999 | Peterson et al. | |
| 5,907,828 A | 5/1999 | Meyer et al. | |
| 5,920,696 A | 7/1999 | Brandt et al. | |
| 5,925,100 A | 7/1999 | Drewry et al. | |
| 5,940,804 A | 8/1999 | Turley et al. | |
| 5,946,694 A | 8/1999 | Copeland et al. | |
| 5,950,169 A | 9/1999 | Borghesi et al. | |
| 5,956,687 A | 9/1999 | Wamsley et al. | |
| 5,970,464 A | 10/1999 | Apte et al. | |
| 5,974,390 A | 10/1999 | Ross | |
| 5,987,247 A | 11/1999 | Lau | |
| 5,991,733 A | 11/1999 | Aleia et al. | |
| 5,999,911 A | 12/1999 | Berg et al. | |
| 6,002,396 A | 12/1999 | Davies | |
| 6,003,007 A | 12/1999 | DiRienzo | |
| 6,003,011 A | 12/1999 | Sarin et al. | |
| 6,012,066 A | 1/2000 | Discount et al. | |
| 6,021,418 A | 2/2000 | Brandt et al. | |
| 6,023,572 A | 2/2000 | Lautzenheiser et al. | |
| 6,023,578 A | 2/2000 | Birsan et al. | |
| 6,028,997 A | 2/2000 | Leymann et al. | |
| 6,038,590 A | 3/2000 | Gish | |
| 6,041,304 A | 3/2000 | Meyer et al. | |
| 6,044,382 A | 3/2000 | Martino | |
| 6,044,384 A | 3/2000 | Ishima et al. | |
| 6,049,773 A | 4/2000 | McCormack et al. | |
| 6,055,519 A | 4/2000 | Kennedy et al. | |
| 6,058,413 A | 5/2000 | Flores et al. | |
| 6,061,665 A | 5/2000 | Bahreman et al. | |
| 6,065,000 A | 5/2000 | Jensen | |
| 6,065,009 A | 5/2000 | Leymann et al. | |
| 6,067,525 A | 5/2000 | Johnson et al. | |
| 6,070,152 A | 5/2000 | Carey et al. | |
| 6,073,109 A | 6/2000 | Flores et al. | |
| 6,076,066 A | 6/2000 | DiRienzo et al. | |
| 6,078,890 A | 6/2000 | Mangin et al. | |
| 6,098,070 A | 8/2000 | Maxwell | |
| 6,101,488 A | 8/2000 | Hayashi et al. | |
| 6,108,673 A | 8/2000 | Brandt et al. | |
| 6,112,190 A | 8/2000 | Fletcher et al. | |
| 6,115,646 A | 9/2000 | Fiszman et al. | |
| 6,119,093 A | 9/2000 | Walker et al. | |
| 6,125,363 A | 9/2000 | Buzzeo et al. | |
| 6,131,085 A | 10/2000 | Rossides | |
| 6,131,155 A | 10/2000 | Alexander et al. | |
| 6,134,536 A | 10/2000 | Shepherd | |
| 6,141,011 A | 10/2000 | Bodnar et al. | |
| 6,151,660 A | 11/2000 | Aoki | |
| 6,158,044 A | 12/2000 | Tibbetts | |
| 6,163,781 A | 12/2000 | Wess, Jr. | |
| 6,163,784 A | 12/2000 | Taguchi | |
| 6,170,002 B1 | 1/2001 | Ouchi | |
| 6,182,095 B1 | 1/2001 | Leymaster et al. | 707/515 |
| 6,182,274 B1 | 1/2001 | Lau | |
| 6,189,029 B1 | 2/2001 | Fuerst | 709/217 |
| 6,199,099 B1 | 3/2001 | Gershman et al. | |
| 6,222,925 B1 | 4/2001 | Shiels et al. | 380/211 |
| 6,223,164 B1 | 4/2001 | Seare et al. | |
| 6,230,169 B1 | 5/2001 | Nagae | |
| 6,233,537 B1 | 5/2001 | Gryphon et al. | |
| 6,253,369 B1 | 6/2001 | Cloud et al. | |
| 6,256,636 B1 | 7/2001 | Choy | |
| 6,262,729 B1 | 7/2001 | Marcos et al. | |
| 6,266,645 B1 | 7/2001 | Simpson | |
| 6,266,666 B1 | 7/2001 | Ireland et al. | |
| 6,272,482 B1 | 8/2001 | McKee et al. | |
| 6,278,977 B1 | 8/2001 | Agrawal et al. | |
| 6,279,009 B1 | 8/2001 | Smirnov et al. | |
| 6,289,348 B1 | 9/2001 | Richard et al. | |
| 6,289,385 B1 | 9/2001 | Whipple et al. | |
| 6,304,886 B1 | 10/2001 | Bernardo et al. | |
| 6,308,188 B1 | 10/2001 | Bernardo et al. | |
| 6,308,224 B1 | 10/2001 | Leymann et al. | |
| 6,311,192 B1 | 10/2001 | Rosenthal et al. | |
| 6,321,133 B1 | 11/2001 | Smirnov et al. | |
| 6,321,374 B1 | 11/2001 | Choy | |
| 6,327,046 B1 | 12/2001 | Miyamoto et al. | |
| 6,330,541 B1 | 12/2001 | Meyer et al. | |
| 6,332,155 B1 | 12/2001 | Notani | |
| 6,334,146 B1 | 12/2001 | Parasnis et al. | |
| 6,336,096 B1 | 1/2002 | Jernberg | |
| 6,343,271 B1 | 1/2002 | Peterson et al. | |
| 6,347,303 B2 | 2/2002 | Nagai et al. | |
| 6,349,238 B1 | 2/2002 | Gabbita et al. | |
| 6,349,320 B1 | 2/2002 | Emberton et al. | |
| 6,356,905 B1 | 3/2002 | Gershman et al. | |
| 6,370,508 B2 | 4/2002 | Beck et al. | |
| 6,380,951 B1 | 4/2002 | Petchenkine et al. | |
| 6,389,588 B1 | 5/2002 | Wadhwa et al. | |
| 6,393,431 B1 | 5/2002 | Salvati et al. | |

| Patent No. | Date | Name | |
|---|---|---|---|
| 6,393,456 B1 | 5/2002 | Ambler et al. | |
| 6,397,191 B1 | 5/2002 | Notani et al. | |
| 6,397,192 B1 | 5/2002 | Notani et al. | |
| 6,415,259 B1 | 7/2002 | Wolfinger et al. | |
| 6,426,759 B1 | 7/2002 | Ting et al. | |
| 6,442,528 B1 | 8/2002 | Notani et al. | |
| 6,442,557 B1 | 8/2002 | Buteau et al. | |
| 6,442,563 B1 | 8/2002 | Bacon et al. | |
| 6,470,303 B2 | 10/2002 | Kidd et al. | |
| 6,493,675 B1 | 12/2002 | Kanaya et al. | |
| 6,496,202 B1 | 12/2002 | Prinzing | |
| 6,501,832 B1 | 12/2002 | Saylor et al. | |
| 6,505,176 B2 | 1/2003 | De Francesco, Jr. et al. | |
| 6,516,322 B1 | 2/2003 | Meredith | |
| 6,519,578 B1 | 2/2003 | Reddy | |
| 6,535,883 B1 | 3/2003 | Lee et al. | |
| 6,546,396 B1 | 4/2003 | Borkowski et al. | |
| 6,549,893 B1 | 4/2003 | Lannert et al. | |
| 6,564,321 B2 | 5/2003 | Bobo, II | |
| 6,567,783 B1 | 5/2003 | Notani et al. | |
| 6,574,636 B1 | 6/2003 | Balon et al. | |
| 6,584,464 B1 | 6/2003 | Warthen | |
| 6,603,854 B1 | 8/2003 | Judkins et al. | |
| 6,606,740 B1 | 8/2003 | Lynn et al. | |
| 6,625,602 B1 | 9/2003 | Meredith et al. | |
| 6,632,251 B1 | 10/2003 | Rutten et al. | |
| 6,633,846 B1 | 10/2003 | Bennett et al. | |
| 6,651,060 B1 | 11/2003 | Harper et al. | |
| 6,658,398 B1 | 12/2003 | Bertrand et al. | 706/47 |
| 6,658,432 B1 | 12/2003 | Alavi et al. | |
| 6,665,640 B1 | 12/2003 | Bennett et al. | |
| 6,671,692 B1 | 12/2003 | Marpe et al. | |
| 6,671,693 B1 | 12/2003 | Marpe et al. | |
| 6,671,716 B1 | 12/2003 | Diedrichsen et al. | |
| 6,679,959 B2 | 1/2004 | Boyd et al. | |
| 6,681,217 B1 | 1/2004 | Lewak | 707/3 |
| 6,684,190 B1 | 1/2004 | Powers et al. | |
| 6,687,557 B2 | 2/2004 | Ouchi | |
| 6,687,685 B1 | 2/2004 | Sadeghi et al. | |
| 6,687,878 B1 | 2/2004 | Eintracht et al. | |
| 6,691,100 B1 | 2/2004 | Alavi et al. | |
| 6,697,784 B2 | 2/2004 | Bacon et al. | |
| 6,697,824 B1 | 2/2004 | Bowman-Amuah | 707/229 |
| 6,714,914 B1 | 3/2004 | Peters et al. | |
| 6,725,224 B1 | 4/2004 | McCarthy et al. | |
| 6,728,947 B1 | 4/2004 | Bengston | |
| 6,738,736 B1 | 5/2004 | Bond | |
| 6,738,757 B1 | 5/2004 | Wynne et al. | |
| 6,763,353 B2 | 7/2004 | Li et al. | |
| 6,768,984 B2 | 7/2004 | Allen et al. | |
| 6,769,112 B1 | 7/2004 | Montana et al. | |
| 6,810,383 B1 | 10/2004 | Loveland | |
| 6,816,849 B1 | 11/2004 | Halt, Jr. | 707/1 |
| 6,826,579 B1 | 11/2004 | Leymann et al. | |
| 6,832,368 B1 | 12/2004 | Zimowski | |
| 6,850,996 B2 | 2/2005 | Wagner | |
| 6,862,732 B1 | 3/2005 | Schultz et al. | |
| 6,868,193 B1 | 3/2005 | Gharbia et al. | |
| 6,871,197 B1 | 3/2005 | Johnson | 706/61 |
| 6,874,008 B1 | 3/2005 | Eason et al. | |
| 6,877,137 B1 | 4/2005 | Rivette et al. | |
| 6,877,153 B2 | 4/2005 | Konnersman | |
| 6,879,959 B1 | 4/2005 | Chapman et al. | |
| 6,879,970 B2 | 4/2005 | Shiffman et al. | |
| 6,888,929 B1 | 5/2005 | Saylor et al. | |
| 6,889,375 B1 | 5/2005 | Chan et al. | |
| 6,895,084 B1 | 5/2005 | Saylor et al. | |
| 6,896,574 B2 | 5/2005 | Needham et al. | |
| 6,898,574 B1 | 5/2005 | Regan | |
| 6,901,405 B1 | 5/2005 | McCrady et al. | |
| 6,918,053 B1 | 7/2005 | Thatte et al. | |
| 6,920,456 B2 | 7/2005 | Lee et al. | |
| 6,925,593 B1 | 8/2005 | Knutson et al. | |
| 6,928,487 B2 | 8/2005 | Eggebraaten et al. | |
| 6,937,990 B1 | 8/2005 | Walker et al. | |
| 6,938,030 B1 | 8/2005 | Simone, Jr. et al. | |
| 6,940,870 B2 | 9/2005 | Hamlin | |
| 6,941,521 B2 | 9/2005 | Lin et al. | |
| 6,948,133 B2 | 9/2005 | Haley | |
| 6,952,679 B1 | 10/2005 | Pulford | |
| 6,970,931 B1 | 11/2005 | Bellamy et al. | |
| 6,973,626 B1 | 12/2005 | Lahti et al. | |
| 6,975,914 B2 | 12/2005 | DeRemer et al. | |
| 6,993,528 B1 | 1/2006 | Aver et al. | |
| 7,000,186 B1 | 2/2006 | Gropper et al. | |
| 7,007,227 B1 | 2/2006 | Constantino et al. | |
| 7,013,284 B2 | 3/2006 | Guyan et al. | |
| 7,013,309 B2 | 3/2006 | Chakraborty et al. | |
| 7,031,951 B2 | 4/2006 | Mancisidor et al. | |
| 7,039,597 B1 | 5/2006 | Notani et al. | |
| 7,047,535 B2 | 5/2006 | Lee et al. | |
| 7,051,036 B2 | 5/2006 | Rosnow et al. | |
| 7,051,071 B2 | 5/2006 | Stewart et al. | |
| 7,051,072 B2 | 5/2006 | Stewart et al. | |
| 7,051,074 B1 | 5/2006 | Buchsbaum et al. | |
| 7,065,504 B2 | 6/2006 | Sakuma et al. | |
| 7,069,234 B1 | 6/2006 | Cornelius et al. | 705/26 |
| 7,069,536 B2 | 6/2006 | Yaung | |
| 7,076,504 B1 | 7/2006 | Handel et al. | |
| 7,100,147 B2 | 8/2006 | Miller et al. | |
| 7,103,590 B1 | 9/2006 | Murthy et al. | |
| 7,110,952 B2 | 9/2006 | Kursh | |
| 7,113,913 B1 | 9/2006 | Davis et al. | |
| 7,117,271 B2 | 10/2006 | Haverstock et al. | |
| 7,124,203 B2 | 10/2006 | Joshi et al. | |
| 7,150,000 B1 | 12/2006 | Feldman | |
| 7,171,647 B1 | 1/2007 | Smith et al. | |
| 7,174,349 B1 | 2/2007 | Alavi et al. | |
| 7,174,506 B1 | 2/2007 | Dunsmoir et al. | |
| 7,174,514 B2 | 2/2007 | Subramaniam et al. | |
| 7,181,427 B1 | 2/2007 | De Francesco et al. | |
| 7,184,967 B1 | 2/2007 | Mital et al. | |
| 7,188,073 B1 | 3/2007 | Tam et al. | |
| 7,194,679 B1 | 3/2007 | Green | |
| 7,203,654 B2 | 4/2007 | Menendez | |
| 7,216,163 B2 | 5/2007 | Sinn | |
| 7,219,050 B2 | 5/2007 | Ishikawa et al. | |
| 7,228,547 B2 | 6/2007 | Yaung | |
| 7,242,991 B2 | 7/2007 | Budinger et al. | |
| 7,249,157 B2 | 7/2007 | Stewart et al. | |
| 7,249,180 B2 | 7/2007 | Erickson et al. | |
| 7,269,621 B2 | 9/2007 | Chang et al. | |
| 7,269,718 B2 | 9/2007 | Alexander, III et al. | |
| 7,275,216 B2 | 9/2007 | Paoli et al. | |
| 7,296,056 B2 | 11/2007 | Yaung | |
| 7,305,488 B2 | 12/2007 | Wallace et al. | |
| 7,310,607 B2 | 12/2007 | Brandt et al. | |
| 7,333,967 B1 | 2/2008 | Bringsjord et al. | 706/45 |
| 7,337,121 B1 | 2/2008 | Beinat et al. | |
| 7,398,218 B1 | 7/2008 | Bernaski et al. | |
| 7,464,369 B1 | 12/2008 | Banerjee et al. | 717/106 |
| 7,506,143 B2 | 3/2009 | Sarwono et al. | 713/1 |
| 7,613,641 B1 | 11/2009 | Jenkins et al. | 705/35 |
| 7,618,259 B2 | 11/2009 | Manos | 434/322 |
| 7,698,543 B2 | 4/2010 | Sarwono et al. | 713/1 |
| 7,886,226 B1 | 2/2011 | McCoy et al. | 715/273 |
| 7,895,064 B2 | 2/2011 | Wahlbin | 705/4 |
| 7,933,786 B2 | 4/2011 | Wargin et al. | |
| 8,032,837 B2 | 10/2011 | Bowman et al. | 715/760 |
| 8,069,131 B1 | 11/2011 | Luechtefeld et al. | |
| 8,131,663 B1 | 3/2012 | Taylor | 706/59 |
| 2001/0034639 A1 | 10/2001 | Jacoby et al. | 705/10 |
| 2002/0035488 A1 | 3/2002 | Aquila et al. | |
| 2002/0049628 A1 | 4/2002 | West | |
| 2002/0068857 A1 | 6/2002 | Iliff | |
| 2002/0069083 A1 | 6/2002 | Harter et al. | 705/1 |
| 2002/0120491 A1 | 8/2002 | Nelson | 705/10 |
| 2002/0135614 A1 | 9/2002 | Bennett | 345/745 |
| 2002/0165739 A1 | 11/2002 | Guyan et al. | |
| 2002/0188674 A1 | 12/2002 | Brown et al. | |
| 2003/0009357 A1 | 1/2003 | Pish | |
| 2003/0023641 A1 | 1/2003 | Gorman et al. | 707/530 |
| 2003/0105884 A1 | 6/2003 | Upton | 709/318 |
| 2003/0113699 A1 | 6/2003 | Johnson et al. | |
| 2003/0145124 A1 | 7/2003 | Guyan et al. | |
| 2003/0200527 A1 | 10/2003 | Lynn et al. | |
| 2004/0111301 A1 | 6/2004 | Wahlbin et al. | 705/4 |
| 2004/0205157 A1 | 10/2004 | Bibelnieks et al. | 709/218 |

| | | | |
|---|---|---|---|
| 2004/0225535 | A1 | 11/2004 | Bond, Jr. et al. |
| 2005/0022160 | A1 | 1/2005 | Uluakar et al. ............... 717/105 |
| 2005/0055263 | A1 | 3/2005 | Pabuwal |
| 2005/0131752 | A1 | 6/2005 | Gracie et al. .................... 705/10 |
| 2005/0187881 | A1 | 8/2005 | McGriffin et al. |
| 2005/0234755 | A1 | 10/2005 | Baggett, Jr. et al. .............. 705/7 |
| 2005/0246206 | A1 | 11/2005 | Obora et al. |
| 2006/0040748 | A1 | 2/2006 | Barthold ........................ 463/43 |
| 2006/0047540 | A1 | 3/2006 | Hutten et al. |
| 2006/0101127 | A1 | 5/2006 | Brown .......................... 709/207 |
| 2006/0185019 | A1 | 8/2006 | Wong ............................. 726/26 |
| 2006/0218017 | A1 | 9/2006 | Ren et al. |
| 2007/0005463 | A1 | 1/2007 | Davis et al. |
| 2007/0005515 | A1 | 1/2007 | Rosenberg ...................... 705/76 |
| 2007/0099684 | A1 | 5/2007 | Butterworth ..................... 463/1 |
| 2007/0156463 | A1 | 7/2007 | Burton et al. |
| 2007/0162454 | A1 | 7/2007 | D'Albora et al. |
| 2007/0255601 | A1 | 11/2007 | Heydon et al. |
| 2008/0028313 | A1 | 1/2008 | Ebert ............................ 715/730 |
| 2008/0104065 | A1 | 5/2008 | Agarwal et al. ................... 707/6 |
| 2008/0134338 | A1* | 6/2008 | Chen et al. ....................... 726/25 |
| 2008/0189092 | A1 | 8/2008 | Hagelin et al. .................... 703/8 |
| 2008/0275746 | A1 | 11/2008 | Musier et al. ...................... 705/7 |
| 2009/0216772 | A1 | 8/2009 | Goldfarb ......................... 707/10 |
| 2009/0217146 | A1 | 8/2009 | Goldfarb ....................... 715/205 |
| 2009/0217185 | A1 | 8/2009 | Goldfarb ....................... 715/763 |
| 2009/0248481 | A1 | 10/2009 | Dick et al. ......................... 705/9 |
| 2010/0031137 | A1 | 2/2010 | Amaral et al. |
| 2010/0241466 | A1 | 9/2010 | Chambers et al. ................ 705/4 |
| 2011/0106731 | A1 | 5/2011 | Pearson et al. .................. 706/11 |

FOREIGN PATENT DOCUMENTS

| | | |
|---|---|---|
| EP | 0854431 A2 | 7/1998 |
| EP | 0897149 A1 | 2/1999 |
| JP | 11-353234 A2 | 12/1999 |
| WO | WO 8401448 A1 | 4/1984 |
| WO | WO 9108543 A1 | 6/1991 |
| WO | WO 9300643 A1 | 1/1993 |
| WO | WO 9416395 A1 | 7/1994 |
| WO | WO 9503569 A2 | 2/1995 |
| WO | WO 9631828 A1 | 10/1996 |
| WO | WO 9812616 A2 | 3/1998 |
| WO | WO 9821680 A1 | 5/1998 |
| WO | WO 9838563 A2 | 9/1998 |
| WO | WO 0067180 A2 | 11/2000 |
| WO | WO 0067181 A2 | 11/2000 |
| WO | WO 0067182 A2 | 11/2000 |
| WO | WO 0067184 A2 | 11/2000 |
| WO | WO 0067186 A2 | 11/2000 |

OTHER PUBLICATIONS

Accenture Claim Components version 7.0, 35 pages.
Office Action, dated Jul. 2, 2010, pp. 1-24, U.S. Appl. No. 12/036,103, U.S. Patent and Trademark Office, Virginia.
Office Action, dated Jan. 31, 2012, pp. 1-45, U.S. Appl. No. 12/036,120, U.S. Patent and Trademark Office, Virginia.
Agarwal et al., Architecting Object Applications for High Performance with Relational Databases, High Performance Object/Relational Applications. Aug. 10, 1995, pp. 1-8.
Freeman, Charles, "Microsoft Access 97 Step by Step," published by Microsoft Press, 1997, Table of Contents and Quick Look Guide vii-xiv, Finding You Best Starting Point pp. xvi-xxvi, Part 1, Lesson 1 and Lesson 2, pp. Cover-40, 63-108, 251-254.
Request for Ex Parte Reexamination, including exhibits H, I, J, and K, dated Nov. 10, 2009, for U.S. Appl. No. 09/305,234, filed May 4, 1999 and later assigned U.S. Appl. No. 90/010,735. pp. 1-831.
Order Granting Ex Parte Reexamination mailed Jan. 7, 2010, for U.S. Appl. No. 09/305,234, filed May 4, 1999 and later assigned U.S. Appl. No. 90/010,735. pp. 1-17.
U.S. Office Action mailed Sep. 24, 2010, for Reexamination No. 90/010,735 regarding commonly owned U.S. Patent No. 7,617,240. pp. 1-18.
Patent Owner's Response with Appendices dated Dec. 27, 2010, for Reexamination No. 90/010,735 regarding commonly owned U.S. Patent No. 7,617,240. pp. 1-1,103.
Final Office Action mailed Feb. 4, 2011 for Reexamination No. 90/010,735 regarding commonly owned U.S. Patent No. 7,617,240. pp. 1-22.
Office Action, dated Mar. 27, 2012, pp. 1-32, U.S. Appl. No. 12/036,119, U.S. Patent and Trademark Office, Virginia.
International Search Report dated Apr. 17, 2002, for PCT Application No. PCT/US00/12351, filed May 4, 2000. 5 pages.
International Search Report dated Jun. 3, 2002, for corresponding international application PCT/US00/12240. 2 pages.
International Search Report dated Aug. 6, 2002, for PCT Application No. PCT/US00/12501, filed May 4, 2000. 3 pages.
International Search Report dated Aug. 8, 2002 for PCT/US00/12508, 2 pages.
International Search Report dated Dec. 9, 2002 for PCT/US00/12238, 2 pages.
European Examination Report dated Feb. 18, 2004, for European Patent Application No. 00928844.0, filed May 4, 2000. 4 pages.
European Examination Report dated Feb. 1, 2005, for European Patent Application No. 00928844.0, filed May 4, 2000. 16 pages.
Extended European Search Report for European Patent Application No. 06005193.5, dated Aug. 22, 2006. 8 pages.
Accenture, Accenture to Implement Claim Components Solution for OneBeacon Insurance. available: http://newsroom.accenture.com/article_print.cfm?article_id=3830; Jan. 10, 2002, 1 Page.
Anonymous, Accountancy, "Proposals to Admit Corporate Capital Lift Off," Nov. 1993, vol. 112, Iss.1203, p. 57, printed 3 Pages.
Anonymous, National Underwriter, "Market Mix," Property & Casualty/risk & Benefits Management ed.), Erlanger: vol. 97, Iss. 25, p. 47, Jun. 21, 1993. Printed 2 pages.
Baldwin, Robert W., Naming and Grouping Privileges to Simplify Security Management in Large Databases, available at http://www.cs.purdue.edu/homes/ninghui/courses/Fall03/papers/baldwin.pdf (17 pages) (Copyrighted in 1990).
Bandat, K, "Document Based Customization and Adaptation of Process" *IBM Technical Disclosure Bulletin*, Sep. 1994, pp. 629-630.
Bloss, Code optimizations for lazy evaluation, Lisp and Symbolic Computation, vol. 1, Sep. 1988, pp. 147-164.
Bulletin of the Technical Committee on Data Engineering, *IEEE Computer Society*, vol. 16 No. 2, Jun. 1993, pp. 1-56.
Claims Technology, A Five-Step Diagnosis for Your Claim Operation by John Raguin, available at http://web/archive.org/20040808072822/www.claimsmag.com/Issues/sept02/claims_tech.asp. (Sep. 2002) (3 pages).
Cugola, G., et al., "Exploiting an event-based infrastructure to develop complex distributed systems," Software Engineering, 1988; Proceedings of the 1988 International Conference on Kyoto, Japan, Apr. 19-25, 1998, IEEE pp. 261-270.
Denning, Peter J. et al. "Completing the Loops," *INTERFACES: Institute for Operations Research and the Management Science*, vol. 25 No. 3, May-Jun. 1995. pp. 42-57.
Engel, James D., "Technology in claims management", *Risk Management*, vol. 42 No. 12. Dec. 1995, 2 pages.
Feiler, Peter H. et al. "An Incremental Programming Environment," *Proceedings of the 5th International Conference on Software Engineering*, San Diego, California, 1981. pp. 44-53.
Fisher, Susan, E., "Insurer streamlines info gathering" (Client/Server Deployment: Arkwright Mutual Insurance) *PC Week*, vol. 10 No. 45, Nov. 15, 1993. 2 pages.
Georgakopoulos, D., Hornick, M., "An Overflow of Work Management: From Processing Modeling to Workflow Automation Infrastructure," Distributed and Parallel Databases, © 1995 Kluwer Academic Publishers, Boston, Manufactured in The Netherlands; (1995) vol. 3, pp. 119-153.
Groiss, Herbert, et al., "Interoperability with World Wide Workflows," *1st World Conference on Integrated Design & Process Technology*, 1995, pp. 1-7.
Held, Jeffrey J., Network Computing Practice, "GroupWare In Investment Banking: Improving Revenue and Deal Flow", *GroupWare '92*, Edited by David D. Coleman, The Conference Group, Morgan Kaufmann Publishers, 1992, pp. 461-464.
Hung K. Sun Y. Rose T. "A dynamic business object architecture for an insurance industrial project." *Proceedings of International Conference on Object Oriented Information Systems, (OOIS'97)*. Brisbane, Qld., Australia Nov. 10-12, 1997, Published 1998, abstract 1 page.

Image-Enabled App Streams Workflow for Gerling Re.(Gerling Global Reinsurance's use of keyFile's document management software and insurance Software and Systems' SICS insurance record-keeping software)(Product Information).*Insurance & Technology*, Feb. 1, 1997, 3 pages.

Kappel, G. et al., "Coordination in Workflow Management Systems A Rule-Based Approach", *Department of Information Systems, University of Linz, A-4040* Linz, Austria, 1998. pp. 99-119.

Kellogg et al. "Interface management: a CORBA universal service manager," *Systems Management*, 1998. Proceedings of the IEEE Third International Workshop On Newport, RI, USA, Apr. 22-24, 1998, Los Alamitos, CA, USA, IEEE Comput. Soc., US, Apr. 22, 1998. pp. 148-149.

Koehler SH, "Objects in Insurance. Gaining the Competitive Edge in Financial Services." *Proceedings of OBJECT EXPO '94*. New York, NY, USA Jun. 6-10, 1994, Published 1994. Abstract, 1 page.

Korzeniowski, Paul, "Workflow software automates processes; passing messages on network platform helps CareAmerica process insurance claims" (use of workflow software to streamline business processes) (Client/Service Computing), *Software Magazine*, vol. 13 No. 3. Feb. 1993, 4 pages.

Koschel et al. "Configurable event triggered services for CORB-based systems," *Enterprise Distributed Object Computing Workshop*, 1998. EDOC '98 Proceedings, Second International La Jolla, CA, USA, Nov. 3-5, 1998. New York, NY, USA, IEEE, US. Nov. 1998, pp. 306-318.

McCall, Grant Watch, Health Affairs Spring 1991, pp. 164-176.

Medina-Mora, Raul et al. "ALOE Users' and Implentors' Guide," *Technical Report CMUCS-81-145, CMU, Computer Science Department*, Nov. 1981. pp. I-III and 1-79.

Medina-Mora, Raul "Syntax-Directed Editing Towards Integrated Programming Environments," *Doctoral Thesis, Department of Computer Science, Carnegie-Mellon University*. Mar. 1982, Summary pp. 1-14 and pp. 1-149.

Medina-Mora, "Action Workflow™ Technology and Applications for Groupware" *GroupWare '92*, Edited by David D. Coleman, The Conference Group, Morgan Kaufmann Publishers, 1992. pp. 165-167.

Medina-Mora, Raul et al. "The Action Workflow Approach to Workflow Management Technology," *Proceedings of the 1992 ACM conference on Computer-supported cooperative work*, Nov. 1992. pp. 281-288.

Medina-Mora, Raul et al. "ActionWorkflow in Use: Clark County Department of Business License," *Proceedings of the Twelfth International Conference on Data Engineering*, Feb.-Mar. 1996, pp. 288-294.

Medina-Mora, Raul, et al. "Action Workflow as the Enterprise Integration Technology." Bulletin of the Technical Committee on Data Engineering. *IEEE Computer Societ*. vol. 16 No. 2, pp. 49-52.

Milligan, John. "Case study: Advantage. (Motorists Insurance Companies uses Advantage, a business-rule DBMS developed in-house, to manage quoting, data entry, rating and other core processes)" (Data Architect) (Company Operations). *Database Programming & Design*, vol. 10 No. 12, Dec. 1997, 5 pages.

Nilsson, Y. "TFM: a tool for task flow management." *Philips Telecommunication and Data Systems Review*, vol. 47, No. 4, Dec. 1989, pp. 33-46. Netherlands. Abstract.

Potel, M. "MVP: Model-View-Presenter The Taligent Programming Model for C++ and Java," Taligent, Inc., 1994, 16 pages.

"Primavera Extends Lead in High-End Project Management Software," *Business Wire*, Apr. 4, 1995. 3 pages.

"Primavera Products and Solutions," www.primavera.com/products/p3.html, downloaded from internet Feb. 2, 2001, 2 pages.

Publishing A FileMaker Pro 4/5, Database on the Web: A tutorial, available at http://ion.uillinois.edu/resources/tutorials/software/tutorials/fmpro/filemakertutorial1.doc (last updated May 21, 2000) (10 pages).

Stickel E., "Competitive product development in the financial services industry—a knowledge-based approach" *International Journal of Intelligent Systems in Accounting, Finance and Management*, vol. 4, No. 4, Dec. 1995, pp. 273-287, abstract. 1 page.

Sutherland, RW, "TABLE Driven Health Insurance Claim Preparation" *IBM Technical Disclosure Bulletin*, Jul. 1986, abstract. 1 page.

Tauhert, Christy, "AFLAC cuts processing time with object system. (American Family Life Assurance, Portable Systems Technology's SmartImage insurance processing automation system) (Company Operations)". *Insurance & Technology*, vol. 22 No. 6, Jun. 1997, pp. 25(2) abstract, 1 page.

Todd, G. et al. "Microsoft Exchange Server 5.5", published by SAMS publishing, Indianapolis, Indiana, 1998, pp. i-xliii and 1-1060.

Tombros, Dimitrios et al., "Semantics of Reactive Components in Event-Driven Workflow EXecution", *Institut for Informatic, Universitat Zurich, Advanced Information systems Engineering, 9th International Conference, SAiSE'97*, Barcelona,Catalonia, Spain, Jun. 16-20, 1997 Proceedings, pp. 409-422.

Tsai, W.H. et al. "Architecture of a Multi-Microprocessor System for Parallel Processing of Image Sequences," *Proceedings of 1981 IEEE Computer Society Workshop on Computer Architecture of Pattern Analysis and Image Database Management*, 1981. pp. 104-111.

Tsuchiya et al. "Operator-oriented approach for the inter-work of service and network management," *Global Convergence of Telecommunications and Distributed Object Computing*, 1997. Proceedings. Tine 97 Santiago, Chile, Nov. 17-20, 1997, Los Alamitos, CA, USA, EEE Comput. Soc., US, Nov. 17, 1997. pp. 144-150.

Way, P. John Hancock streamlines legacy systems with objects. (John Hancock Mutual Life Insurance)(Company Operations). *Insurance & Technology* vol. 22. No. 9 Sep. 1997. Abstract, 1 page.

Winograd, Terry et al. (1986) Understanding Computers and Cognition: A New Foundation for Design, Ablex Publishing Corporation, Norwood, New Jersey, 1986. pp. i-xii and 1-207.

Winograd, Terry "A Language/Action Perspective on the Design of Cooperative Work," *Published in Human-Computer Interaction* vol. 3 No. 1, 1987-88, 15 pages.

Winograd, Terry, "Groupware And The Emergence of Business Technology", *GroupWare '92*, Edited by David D. Coleman, The Conference Group, Morgan Kaufmann Publishers, 1992, pp. 69-72.

Zhao, J.L., Stohr, E.A., "Temporal Workflow Management in a Claim Handling System," 1999, ACM SIGSOFT Software Engineering Notes, San Francisco, CA, USA © 1999 ACM 1-58113-070-8/99/0002. vol. 24, Issue 2,, WACC '99, Feb. 1999. pp. 187-195.

"Report on the Filing or Determination of an Action Regarding a Patent or Trademark," identifying U.S. Patent No. 7,013,284 B2 asserted in *Accenture Global Services GmbH, et al. v. Guidewire Software, Inc.*, D. Del. Dec. 18, 2007. 1 page.

"Answers and Counterclaims," filed on Feb. 6, 2008 in lawsuit asserting U.S. Patent No. 7,013,284 B2, captioned *Accenture Global Services GmbH, et al. v. Guidewire Software, Inc.*, D. Del. Dec. 18, 2007, 25 pages.

Accenture's Reply to Guidewire's Counterclaims with Defenses filed Mar. 25, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages.

Defendant Guidewire Software Inc.'s Objections and Response to Plaintiff Accenture's First Set of Interrogatories, Aug. 22, 2008, In lawsuit asserting U.S. Patent No. 7,013,284 B2, captioned *Accenture Global Services GmbH, et al. v. Guidewire Software, Inc.*, D. Del. Dec. 18, 2007. pp. 1-5.

Accenture's Amended Complaint for Patent Infringement, Trade Secret Misappropriation, and related State Law Claims filed Nov. 13, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 17 pages.

Accenture's Second Amended Complaint for Patent Infringement, Trade Secret Misappropriation, and related State Law Claims filed Dec. 17, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 19 pages.

Guidewire's Answer to Second Amended Complaint filed Jan. 9, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 19 pages.

Accenture's Reply to Guidewire's Counterclaims with Defenses to Accenture's Second Amended Complaint filed Jan. 29, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 9 pages.

Memorandum Opinion filed Jul. 1, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 11 pages.

Accenture's Reply to Guidewire's Amended Counterclaims with Defenses to Accenture's Second Amended Complaint filed Aug. 6, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages.

Joint Claim Construction Statement filed Sep. 29, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages.

Joint Claim Construction Appendix vol. III of III Exhibits 3-4 filed Oct. 2, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 219 pages.

Accenture's Opening Claim Construction Brief filed Oct. 2, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 31 pages.

Declaration of Diana Luo in Support of Plaintiffs Accenture Global Services GmbH and Accenture LLP'S Opening Claim Construction Brief filed Oct. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 5 pages.

Guidewire's Answering Claim Construction Brief filed on Oct. 30, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 49 pages.

Declaration of Diana Luo in Support of Accenture's Claim Construction Answering Brief filed Nov. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 8 pages.

Redacted Accenture's Claim Construction Answering Brief filed Nov. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 25 pages.

Redacted Defendant Guidewire's Opening Claim Construction Brief, filed Nov. 6, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 30 pages.

Accenture's Responses to Interrogatory No. 14, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 21 pages.

Accenture's Responses to Interrogatory No. 16, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 55 pages.

Memorandum Order denying without Prejudice and to be re-filed after the Supreme Court issues its ruling in *Bilski v. Doll*, 129 S. Ct. 2735 (U.S. 2009), filed Feb. 26, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 3 pages.

Memorandum Order regarding claim construction of the '284 patent and '111 patent, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages.

Memorandum Opinion, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 43 pages.

Opening Brief in Support re Motion for Summary Judgment (Partial) That the '284 Patent is Invalid as Indefinite, filed Dec. 16, 2009, in lawsuit asserting U.S. Patent No. 7,013,284 B2, captioned *Accenture Global Services GmbH, et al. v. Guidewire Software, Inc.*,Case No. 07cv826, D. Del. Dec. 18, 2007. 21 pages.

Opening Brief in Support re Motion for Summary Judgment (Partial) That the '284 Patent is Invalid as Claiming Unpatentable Subject Matter, filed Dec. 16, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 15 pages.

Redacted version of Opening Brief in Support of Motion for Summary Judgment (Partial) of Invalidity of '284 Patent because of an On-Sale Bar, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 31 pages.

Redacted Version of Opening Brief in Support of Motion for Summary Judgment(Partial) of Invalidity of '284 Patent because of an On-Sale Bar, , filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 75 pages.

Redacted version of Opening Brief in Support of Motion for Summary Judgment (Partial) Regarding Statute of Limitations, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages.

Redacted Version of Opening Brief in Support, of Motion for Summary Judgment That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 46 pages.

Answering Brief in Opposition re Motion for Summary Judgment (Partial) That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 23 pages.

Redacted version of Appendix, vol. 1 of 12, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 202 pages.

Redacted version of Appendix, (vol. 2 of 12—Exhibits 26-38), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 34 pages.

Redacted version of Appendix, (vol. 3 of 12—Exhibits 39-58), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 44 pages.

Redacted version of Appendix, (vol. 4 of 12—Exhibits 59-64), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 39 pages.

Redacted version of Appendix, (vol. 5 of 12—Exhibits 65-99), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 195 pages.

Redacted version of Appendix, (vol. 6 of 12—Exhibits 100-129), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 427 pages.

Redacted version of Appendix, (vol. 7 of 12—Exhibits 130-154), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 467 pages.

Redacted version of Appendix, (vol. 8 of 12—Exhibits 155-161), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 330 pages.

Redacted version of Appendix, (vol. 9 of 12—Exhibits 162-164), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages.

Redacted version of Appendix, (vol. 10 of 12—Exhibits 165-170), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages.
Redacted version of Appendix, (vol. 11 of 12—Exhibit 171), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages.
Redacted version of Appendix, (vol. 12 of 12—Exhibits 172-183), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 80 pages.
Redacted version of Appendix, Corrected vol. 12 (Exhibits 172-183), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 80 pages.
Redacted version of Declaration of W. Michael Flaherty in Support of Plaintiffs Briefs in Opposition to Defendants' Motions for Summary Judgment, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 6 pages.
Redacted version of Declaration of Diana Luo in Support of Plaintiffs Briefs in Opposition to Defendants' Motions for Partial Summary Judgment, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 68 pages.
Redacted Version of Answering Brief in Opposition to Defendant's Motion for Partial Summary Judgment of Invalidity for Indefiniteness of the '284 Patent, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 22 pages.
Redacted Version of Declaration of Michael Ian Shamos in Support of Plaintiffs' Brief in Opposition to Defendants Motion for Partial Summary Judgment, filed Jan. 20, 2010, in lawsuit asserting U.S. Patent No. 7,013,284 B2, captioned *Accenture Global Services GmbH, et al. v. Guidewire Software, Inc.*, D. Del. Dec. 18, 2007. 6 pages.
Redacted version of Answering Brief in Opposition to Defendant's Motion for Partial Summary Judgment of Invalidity of the '284 Patent as Anticipated or, in the alternative, Obvious, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 36 pages.
Redacted version of Answering Brief in Opposition to Defendant's Motion for Partial Summary Judgment of Invalidity of '284 Patent Because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 51 pages.
Redacted version of Declaration of Ruchika Agrawal in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 33 pages.
Redacted version of Declaration of Michael Ian Shamos in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 26 pages.
Redacted version of Declaration of George Victor Guyan in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages.
Redacted version of Declaration of Jeffrey Wargin in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 8 pages.
Redacted version of Reply Brief re Motion for Summary Judgment (Partial) of Invalidity of '284 Patent because of an On-Sale Bar, filed Feb. 2, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 21 pages.
Redacted version of Reply Brief re Motion for Summary Judgment (Partial) That the '284 Patent is Invalid as Indefinite, filed Feb. 2, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages.
Redacted version of Reply Brief re Motion for Summary Judgment (Partial) that the '284 Patent is Invalid as claiming Unpatentable Subject Matter, filed Feb. 2, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages.
Redacted version of Reply Brief re Motion for Summary Judgment that the '284 is Invalid as Anticipated or, in the Alternative, Obvious, filed Feb. 2, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages.
Order denying Motion for Summary Judgment (Partial) denying Motion for Summary Judgment, denying Motion for Summary Judgment, denying Motion to Strike, denying Motion for Summary Judgment, denying Motion for Summary Judgment, re Memorandum Opinion, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 2 pages.
Guidewire's Supplemental Reply Brief in Support of Its Motion for Partial Summary Judgment Regarding Invalidity of the '284 and '111 Patents as Claiming Unpatentable Subject Matter filed Aug. 26, 2010, *Accenture Global Services, GMBH et al. v. Guidewire Software Inc.*, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 10 pages.
Accenture's Brief In Opposition to Guidewire's Supplemental Brief In Support of Its Motion for Partial Summary Judgment of Invalidity as Claiming Unpatentable Subject Matter filed Oct. 15, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 15 pages.
Complaint for Patent Infringement filed Nov. 10, 2009, in lawsuit asserting U.S. Patent No. 7,617,240, captioned *Accenture Global Services GmbH, et al. v. Guidewire Software, Inc.*, D. Del. Nov. 10, 2009. 6 pages.
Defendant Guidewire's Answer and Counterclaims to Accenture's Complaint for Patent Infringement filed Nov. 30, 2009, in lawsuit asserting U.S. Patent No. 7,617,240, captioned *Accenture Global Services GmbH, et al. v. Guidewire Software, Inc.*, 09cv848, D. Del. Nov. 10, 2009, 9 pages.
Stipulation and Order to Amend Answer and Counterclaims filed Sep. 13, 2010, in lawsuit asserting U.S. Patent No. 7,617,240, captioned *Accenture Global Services GmbH, et al. v. Guidewire Software, Inc.*, Case No. 09cv848, D. Del. Nov. 10, 2009. 46 pages.
Guidewire's Amended Answer and Counterclaims to Accenture's Complaint for Patent Infringement filed Nov. 2, 2010, in lawsuit asserting U.S. Patent No. 7,617,240, captioned *Accenture Global Services GmbH, et al. v. Guidewire Software, Inc.*, Case No. 09cv848, D. Del. Nov. 10, 2009, 18 pages.
Accenture's Opening Brief in Support of Motion to Strike Allegations in Defendant Guidewire's Amended Answer and Counterclaims filed Nov. 15, 2010, in lawsuit asserting U.S. Patent No. 7,617,240, captioned *Accenture Global Services GmbH, et al. v. Guidewire Software, Inc.*, Case No. 09cv848, D. Del. Nov. 10, 2009, 8 pages.
Plaintiffs Accenture Global Service GmbH and Accenture LLP's Reply to Guidewire's Amended Counterclaims to Accenture's Complaint for Infringement of the '240 Patent filed Nov. 15, 2010, in lawsuit asserting U.S. Patent No. 7,617,240, captioned *Accenture*

*Global Services GmbH, et al.* v. *Guidewire Software, Inc.*, Case No. 09cv848, D. Del. Nov. 10, 2009, 8 pages.
Office Action, mailed Feb. 26, 2001, for commonly owned U.S. Appl. No. 09/305,228, filed May 4, 1999. 7 pages.
Aug. 27, 2001 Response to Office Action mailed Feb. 26, 2001, for commonly owned U.S. Appl. No. 09/305,228, filed May 4, 1999. 9 pages.
Office Action, mailed Oct. 18, 2001, for commonly owned U.S. Appl. No. 09/305,228, filed May 4, 1999. 12 pages.
Jan. 18, 2002 Response to Office Action, mailed Oct. 18, 2001, for commonly owned U.S. Appl. No. 09/305,228, filed May 4, 1999. 6 pages.
Mar. 11, 2002 Amendment after Office Action mailed Oct. 18, 2001, for commonly owned U.S. Appl. No. 09/305,228, filed May 4, 1999. 16 pages.
Office Action, mailed Mar. 1, 2002, for commonly owned U.S. Appl. No. 09/305,228, filed May 4, 1999. 3 pages.
Office Action, mailed Apr. 9, 2002, for commonly owned U.S. Appl. No. 09/305,228, filed May 4, 1999. 3 pages.
Continued Prosecution Application (CPA) Request dated Apr. 18, 2002, for commonly owned U.S. Appl. No. 09/305,228, filed May 4, 1999. 2 pages.
Jul. 1, 2002 Response to Office Action, mailed Mar. 1, 2002, for commonly owned U.S. Appl. No. 09/305,228, filed May 4, 1999. 9 pages.
Office Action, mailed Sep. 11, 2002, for commonly owned U.S. Appl. No. 09/305,228, filed May 4, 1999. 10 pages.
Mar. 11, 2003 Response to Office Action mailed Sep. 11, 2002, for commonly owned U.S. Appl. No. 09/305,228, filed May 4, 1999. 14 pages.
Office Action, mailed Jun. 4, 2003, for commonly owned U.S. Appl. No. 09/305,228, filed May 4, 1999. 12 pages.
Oct. 6, 2003 Response to Office Action mailed Jun. 4, 2003, for commonly owned U.S. Appl. No. 09/305,228, filed May 4, 1999. 7 pages.
Request for Continued Examination dated Oct. 6, 2003, for commonly owned U.S. Appl. No. 09/305,228, filed May 4, 1999. 2 pages.
Office Action, mailed Oct. 22, 2003, for commonly owned U.S. Appl. No. 09/305,228, filed May 4, 1999. 11 pages.
Feb. 20, 2004 Response to Office Action mailed Oct. 22, 2003, for commonly owned U.S. Appl. No. 09/305,228, filed May 4, 1999. 8 pages.
Office Action, mailed May 13, 2004, for commonly owned U.S. Appl. No. 09/305,228, filed May 4, 1999. 12 pages.
Office Action, mailed Nov. 16, 2004, for commonly owned U.S. Appl. No. 09/305,228, filed May 4, 1999. 3 pages.
Office Action, mailed Mar. 21, 2001, for commonly owned U.S. Appl. No. 09/305,816, filed May 4, 1999. 11 pages.
Sep. 21, 2001 Response to Office Action, mailed Mar. 21, 2001, for commonly owned U.S. Appl. No. 09/305,816, filed May 4, 1999. 4 pages.
Office Action, mailed Nov. 23, 2001 for commonly owned U.S. Appl. No. 09/305,816, filed May 4, 1999. 10 pages.
Apr. 19, 2002 Response to Office Action, mailed Nov. 23, 2001 for commonly owned U.S. Appl. No. 09/305,816, filed May 4, 1999. 7 pages.
Office Action, Notice of Allowability, mailed May 3, 2002 for commonly owned U.S. Appl. No. 09/305,816, filed May 4, 1999. 9 pages.
Office Action, mailed Aug. 13, 2001, for commonly owned U.S. Appl. No. 09/305,817, filed May 4, 1999. 8 pages.
Feb. 12, 2002 Response to Office Action, mailed Aug. 13, 2001, for commonly owned U.S. Appl. No. 09/305,817, filed May 4, 1999. 14 pages.
Office Action, mailed Mar. 22, 2002, for commonly owned U.S. Appl. No. 09/305,817, filed May 4, 1999. 11 pages.
Preliminary Amendment and Continued Prosecution Application mailed Aug. 22, 2002, for commonly owned U.S. Appl. No. 09/305,817, filed May 4, 1999. 4 pages.
Oct. 9, 2002 Response to Office Action, mailed Mar. 22, 2002, for commonly owned U.S. Appl. No. 09/305,817, filed May 4, 1999. 14 pages.
Office Action, mailed Dec. 20, 2002, for commonly owned U.S. Appl. No. 09/305,817, filed May 4, 1999. 17 pages.
Jun. 20, 2003 Response to Office Action, mailed Dec. 20, 2002, for commonly owned U.S. Appl. No. 09/305,817, filed May 4, 1999. 23 pages.
Office Action, mailed Jul. 22, 2003, for commonly owned U.S. Appl. No. 09/305,817, filed May 4, 1999. 16 pages.
Office Action, mailed Apr. 6, 2004, for commonly owned U.S. Appl. No. 09/305,817, filed May 4, 1999. 2 pages.
Office Action, mailed Mar. 14, 2001, for commonly owned U.S. Appl. No. 09/305,331, filed May 4, 1999. 11 pages.
Sep. 14, 2001 Response to Office Action, mailed Mar. 14, 2001, for commonly owned U.S. Appl. No. 09/305,331, filed May 4, 1999. 10 pages.
Office Action, mailed Dec. 3, 2001, for commonly owned U.S. Appl. No. 09/305,331, filed May 4, 1999. 10 pages.
May 31, 2002 Amendment and Request for Reconsideration after Office Action mailed Dec. 3, 2001, for commonly owned U.S. Appl. No. 09/305,331, filed May 4, 1999. 12 pages.
Office Action, mailed Aug. 14, 2002, for commonly owned U.S. Appl. No. 09/305,331, filed May 4, 1999. 15 pages.
Nov. 14, 2002 Response to Office Action, mailed Aug. 14, 2002, for commonly owned U.S. Appl. No. 09/305,331, filed May 4, 1999. 13 pages.
Office Action, mailed Dec. 20, 2002, for commonly owned U.S. Appl. No. 09/305,331, filed May 4, 1999. 14 pages.
Feb. 20, 2003 Response to Office Action, mailed Dec. 20, 2002, for commonly owned U.S. Appl. No. 09/305,331, filed May 4, 1999. 7 pages.
Office Action, mailed Mar. 4, 2003, for commonly owned U.S. Appl. No. 09/305,331, filed May 4, 1999. 3 pages.
Request for Continued Examination dated Apr. 28, 2003, for commonly owned U.S. Appl. No. 09/305,331, filed May 4, 1999. 2 pages.
Office Action, mailed Jun. 30, 2003, for commonly owned U.S. Appl. No. 09/305,331, filed May 4, 1999. 15 pages.
Sep. 22, 2003 Response to Office Action, mailed Jun. 30, 2003, for commonly owned U.S. Appl. No. 09/305,331, filed May 4, 1999. 6 pages.
Office Action, mailed Dec. 3, 2003, for commonly owned U.S. Appl. No. 09/305,331, filed May 4, 1999. 2 pages.
Jan. 5, 2004 Response to Office Action, mailed Dec. 3, 2003, for commonly owned U.S. Appl. No. 09/305,331, filed May 4, 1999. 8 pages.
Feb. 2, 2004 Response to Office Action, mailed Dec. 3, 2003, for commonly owned U.S. Appl. No. 09/305,331, filed May 4, 1999. 8 pages.
Notice of Allowability mailed Oct. 27, 2004, for commonly owned U.S. Appl. No. 09/305,331, filed May 4, 1999. 9 pages.
Second Request for Ex Parte Reexamination, including exhibits I,J,K,L,M,N,O,P, and Q, dated Oct. 9, 2009, for commonly owned U.S. Appl. No. 09/305,331, filed May 4, 1999, and later assigned U.S. Appl. No. 90/010,713. 974 pages.
Order Granting Ex Parte Reeexamination mailed Dec. 17, 2009, for commonly owned U.S. Appl. No. 09/305,331, filed May 4, 1999, and later assigned U.S. Appl. No. 90/010,713. 15 pages.
U.S. Office Action mailed May 9, 2001, for commonly owned U.S. Appl. No. 09/305,234, filed May 4, 1999. 4 pages.
Nov. 27, 2001 Response to Office Action dated May 9, 2001, for commonly owned U.S. Appl. No. 09/305,234, filed May 4, 1999. 9 pages.
U.S. Office Action mailed Feb. 7, 2002, for commonly owned U.S. Appl. No. 09/305,234, filed May 4, 1999. 4 pages.
Mar. 6, 2002 Response to Office Action dated Feb. 7, 2002, for commonly owned U.S. Appl. No. 09/305,234, filed May 4, 1999. 2 pages.
U.S. Office Action dated Jun. 3, 2002, for commonly owned U.S. Appl. No. 09/305,234, filed May 4, 1999. 6 pages.
Sep. 3, 2002 Amendment in Response to Office Action dated Jun. 3, 2002, for commonly owned U.S. Appl. No. 09/305,234, filed May 4, 1999. 5 pages.
Advisory Action mailed Sep. 17, 2002, for commonly owned U.S. Appl. No. 09/305,234, filed May 4, 1999. 3 pages.
Filing of Continued Prosecution Application dated Nov. 4, 2002, for commonly owned U.S. Appl. No. 09/305,234, filed May 4, 1999. 2 pages.

U.S. Office Action mailed Nov. 26, 2002, for commonly owned U.S. Appl. No. 09/305,234, filed May 4, 1999. 4 pages.
Mar. 4, 2003 Response to Office Action dated Nov. 26, 2002, for commonly owned U.S. Appl. No. 09/305,234, filed May 4, 1999. 13 pages.
U.S. Office Action mailed May 21, 2003, for commonly owned U.S. Appl. No. 09/305,234, filed May 4, 1999. 6 pages.
Sep. 22, 2003 Amendment in Response to Office Action mailed May 21, 2003, for commonly owned U.S. Appl. No. 09/305,234, filed May 4, 1999. 10 pages.
Request for Continued Examination dated Oct. 21, 2003, for commonly owned U.S. Appl. No. 09/305,234, filed May 4, 1999. 2 pages.
Advisory Action mailed Oct. 28, 2003, for commonly owned U.S. Appl. No. 09/305,234, filed May 4, 1999. 2 pages.
U.S. Office Action mailed Nov. 17, 2003 for commonly owned U.S. Appl. No. 09/305,234, filed May 4, 1999. 5 pages.
Feb. 17, 2004 Response to Office Action mailed Nov. 17, 2003, for commonly owned U.S. Appl. No. 09/305,234, filed May 4, 1999. 11 pages.
U.S. Office Action mailed May 4, 2004, for commonly owned U.S. Appl. No. 09/305,234, filed May 4, 1999. 4 pages. 6 pages.
Jul. 6, 2004 Amendment in Response to Office Action mailed May 4, 2004, for commonly owned U.S. Appl. No. 09/305,234, filed May 4, 1999. 9 pages.
Advisory Action mailed Aug. 31, 2004, for commonly owned U.S. Appl. No. 09/305,234, filed May 4, 1999. 3 pages.
Request for Continued Examination and Amendment dated Sep. 7, 2004, for commonly owned U.S. Appl. No. 09/305,234, filed May 4, 1999. 10 pages.
Advisory Action mailed Sep. 14, 2004, for commonly owned U.S. Appl. No. 09/305,234, filed May 4, 1999. 3 pages.
U.S. Office Action mailed Nov. 3, 2004, for commonly owned U.S. Appl. No. 09/305,234, filed May 4, 1999. 6 pages.
May 5, 2005 Amendment and Response to Office Action mailed Nov. 3, 2004, for commonly owned U.S. Appl. No. 09/305,234, filed May 4, 1999. 13 pages.
Notice of Informal or Non-Responsive Amendment mailed Jul. 26, 2005, for commonly owned U.S. Appl. No. 09/305,234, filed May 4, 1999. 2 pages.
Aug. 24, 2005 Response to Office Action mailed Jul. 26, 2005, for commonly owned U.S. Appl. No. 09/305,234, filed May 4, 1999. 8 pages.
U.S. Office Action mailed Nov. 17, 2005, for commonly owned U.S. Appl. No. 09/305,234, filed May 4, 1999. 6 pages.
Jan. 17, 2006 Amendment after Final Rejection dated Nov. 17, 2005, for commonly owned U.S. Appl. No. 09/305,234, filed May 4, 1999. 14 pages.
Advisory Action mailed Feb. 9, 2006, for commonly owned U.S. Appl. No. 09/305,234, filed May 4, 1999. 3 pages.
Mar. 29, 2006 Second Response to Office Action dated Nov. 17, 2005, for commonly owned U.S. Appl. No. 09/305,234, filed May 4, 1999. 12 pages.
Examiner Interview Summary mailed Mar. 30, 2006, for commonly owned U.S. Appl. No. 09/305,234, filed May 4, 1999. 4 pages.
Ex Parte Quayle Action mailed Apr. 12, 2006, for commonly owned U.S. Appl. No. 09/305,234, filed May 4, 1999. 4 pages.
May 18, 2006 Amendment and Response to Ex Parte Quayle Action mailed Apr. 12, 2006, for commonly owned U.S. Appl. No. 09/305,234, filed May 4, 1999. 5 pages.
Notice of Informal or Non-Responsive Amendment mailed Jun. 1, 2006, for commonly owned U.S. Appl. No. 09/305,234, filed May 4, 1999. 2 pages.
Jun. 16, 2006 Response to Notice of Non-Compliant Amendment dated Jun. 1, 2006, for commonly owned U.S. Appl. No. 09/305,234, filed May 4, 1999. 4 pages.
Ex Parte Quayle mailed May 18, 2007, for commonly owned U.S. Appl. No. 09/305,234, filed May 4, 1999. 3 pages.
Jun. 25, 2007 Response to Ex Parte Quayle dated May 18, 2007, for commonly owned U.S. Appl. No. 09/305,234, filed May 4, 1999. 10 pages.
Notice of Allowance and Fees Due, mailed Jan. 10, 2008, for commonly owned U.S. Appl. No. 09/305,234. 4 pages.
Apr. 10, 2008 Request for Continued Examination, for commonly owned U.S. Appl. No. 09/305,234, filed May 4, 1999. 2 pages.
Notice of Allowance mailed Apr. 30, 2008, for commonly owned U.S. Appl. No. 09/305,234, filed May 4, 1999. 4 pages.
Issue Notification dated Jun. 25, 2008, for commonly owned U.S. Appl. No. 09/305,234, filed May 4, 1999. 1 page.
Jul. 3, 2008 Request for Continued Examination, for commonly owned U.S. Appl. No. 09/305,234, filed May 4, 1999. 2 pages.
Notice of Withdrawal from Issue mailed Jul. 8, 2008, for commonly owned U.S. Appl. No. 09/305,234, filed May 4, 1999. 1 page.
U.S. Office Action mailed Aug. 1, 2008, for commonly owned U.S. Appl. No. 09/305,234, filed May 4, 1999. 6 pages.
Examiner Interview Summary mailed Oct. 27, 2008, for commonly owned U.S. Appl. No. 09/305,234, filed May 4, 1999. 2 pages.
Dec. 1, 2008 Response to the Non-Final Office Action mailed Aug. 1, 2008, for commonly owned U.S. Appl. No. 09/305,234, filed May 4, 1999. Dated Dec. 1, 2008. 22 pages.
Examiner's Amendment mailed Aug. 12, 2009, for commonly owned U.S. Appl. No. 09/305,234, filed May 4, 1999. 7 pages.
Notice of Allowance mailed Sep. 3, 2009, for commonly owned U.S. Appl. No. 09/305,234, filed May 4, 1999. 10 pages.
U.S. Office Action mailed Mar. 9, 2001, for commonly owned U.S. Appl. No. 09/305,146, filed May 4, 1999. 5 pages.
Sep. 10, 2001 Amendment and Response to Office Action mailed Mar. 9, 2001, for commonly owned U.S. Appl. No. 09/305,146, filed May 4, 1999. 7 pages.
U.S. Office Action mailed Dec. 4, 2001, for commonly owned U.S. Appl. No. 09/305,146, filed May 4, 1999. 7 pages.
Preliminary Amendment dated Apr. 19, 2002, for commonly owned U.S. Appl. No. 09/305,146, filed May 4, 1999. 12 pages.
Continuing Prosecution Application (ACPA) dated Apr. 19, 2002, for commonly owned U.S. Appl. No. 09/305,146, filed May 4, 1999. 2 pages.
U.S. Office Action mailed May 6, 2002, for commonly owned U.S. Appl. No. 09/305,146, filed May 4, 1999. 6 pages.
Amendment dated Jul. 3, 2002, for commonly owned U.S. Appl. No. 09/305,146, filed May 4, 1999. 10 pages.
Advisory Action mailed Jul. 23, 2002, for commonly owned U.S. Appl. No. 09/305,146, filed May 4, 1999. 3 pages.
Request for Continued Examination and Amendment dated Oct. 7, 2002, for commonly owned U.S. Appl. No. 09/305,146, filed May 4, 1999. 14 pages.
Jan. 9, 2003 Supplemental Response and Request for Continued Examination, for commonly owned U.S. Appl. No. 09/305,146, filed May 4, 1999. 14 pages.
Jan. 17, 2003 Request for Corrected RCE Filing, for commonly owned U.S. Appl. No. 09/305,146, filed May 4, 1999. 5 pages.
U.S. Office Action mailed Mar. 18, 2003, for commonly owned U.S. Appl. No. 09/305,146, filed May 4, 1999. 6 pages.
Amendment dated Jun. 17, 2003, for commonly owned U.S. Appl. No. 09/305,146, filed May 4, 1999. 7 pages.
U.S. Office Action mailed Nov. 13, 2003, for commonly owned U.S. Appl. No. 09/305,146, filed May 4, 1999. 6 pages.
Proposed Amendment for RCE for personal Interview on Feb. 3, 2004 dated Jan. 29, 2004, for commonly owned U.S. Appl. No. 09/305,146, filed May 4, 1999. 8 pages.
Interview Summary dated Feb. 3, 2004, for commonly owned U.S. Appl. No. 09/305,146, filed May 4, 1999. 2 pages.
Amendment dated Feb. 13, 2004, for commonly owned U.S. Appl. No. 09/305,146, filed May 4, 1999. 7 pages.
Request for Continued Examination dated Feb. 13, 2004, for commonly owned U.S. Appl. No. 09/305,146, filed May 4, 1999. 2 pages.
U.S. Office Action mailed May 20, 2004, for commonly owned U.S. Appl. No. 09/305,146, filed May 4, 1999. 6 pages.
Amendment dated Aug. 20, 2004, for commonly owned U.S. Appl. No. 09/305,146, filed May 4, 1999. 11 pages.
U.S. Office Action mailed Jan. 21, 2005, for commonly owned U.S. Appl. No. 09/305,146, filed May 4, 1999. 7 pages.
Mar. 21, 2005 Amendment and Response to Office Action mailed Jan. 21, 2005, for commonly owned U.S. Appl. No. 09/305,146, filed May 4, 1999. 11 pages.
Advisory Action mailed Apr. 28, 2005, for commonly owned U.S. Appl. No. 09/305,146, filed May 4, 1999. 3 pages.

Request for Continued Examination dated May 31, 2005, for commonly owned U.S. Appl. No. 09/305,146, filed May 4, 1999. 2 pages.
Amendment dated May 31, 2005, for commonly owned U.S. Appl. No. 09/305,146, filed May 4, 1999. 11 pages.
U.S. Office Action mailed Aug. 23, 2005, for commonly owned U.S. Appl. No. 09/305,146, filed May 4, 1999. 5 pages.
Amendment dated Nov. 22, 2005, for commonly owned U.S. Appl. No. 09/305,146, filed May 4, 1999. 14 pages.
U.S. Office Action mailed Feb. 24, 2006, for commonly owned U.S. Appl. No. 09/305,146, filed May 4, 1999. 7 pages.
Pre-Appeal Brief Request for Review dated Apr. 24, 2006, for commonly owned U.S. Appl. No. 09/305,146, filed May 4, 1999. 5 pages.
Notice of Appeal dated Apr. 24, 2006, for commonly owned U.S. Appl. No. 09/305,146, filed May 4, 1999. 1 page.
Appeal Brief dated Jul. 24, 2006, for commonly owned U.S. Appl. No. 09/305,146, filed May 4, 1999. 28 pages.
Notification of Non-Compliant Appeal Brief mailed Oct. 13, 2006, for commonly owned U.S. Appl. No. 09/305,146, filed May 4, 1999. 2 pages.
Response to Notification of Non-Compliant Appeal Brief dated Nov. 13, 2006, for commonly owned U.S. Appl. No. 09/305,146, filed May 4, 1999. 2 pages.
Amended Appeal Brief dated Nov. 13, 2006, for commonly owned U.S. Appl. No. 09/305,146, filed May 4, 1999. 30 pages.
Notification of Non-Compliant Appeal Brief mailed Mar. 9, 2007, for commonly owned U.S. Appl. No. 09/305,146, filed May 4, 1999. 2 pages.
Response to Notification of Non-Compliant Appeal Brief dated Mar. 28, 2007, for commonly owned U.S. Appl. No. 09/305,146, filed May 4, 1999. 7 pages.
Examiner's Answer mailed Jul. 30, 2007, for commonly owned U.S. Appl. No. 09/305,146, filed May 4, 1999. 11 pages.
Reply Brief dated Oct. 1, 2007, for commonly owned U.S. Appl. No. 09/305,146, filed May 4, 1999. 12 pages.
Reply Brief noted by Examiner mailed Dec. 17, 2007, for commonly owned U.S. Appl. No. 09/305,146, filed May 4, 1999. 3 pages.
Decision of the Board of Patent Appeals and Interferences mailed Jun. 9, 2009, for commonly owned U.S. Appl. No. 09/305,146, 14 pages.
Notice of Allowance mailed Sep. 2, 2009, for commonly owned U.S. Appl. No. 09/305,146, filed May 4, 1999. 5 pages.
Request for Continued Examination dated Sep. 3, 2009, for commonly owned U.S. Appl. No. 09/305,146, filed May 4, 1999. 4 pages.
Notice of Allowance mailed Nov. 3, 2009, for commonly owned U.S. Appl. No. 09/305,146, filed May 4, 1999. 4 pages.
Request for Continued Examination dated Feb. 2, 2010, for commonly owned U.S. Appl. No. 09/305,146, filed May 4, 1999. 4 pages.
Notice of Allowance mailed Apr. 4, 2010, for commonly owned U.S. Appl. No. 09/305,146, filed May 4, 1999. 4 pages.
Request for Continued Examination dated Jul. 1, 2010, for commonly owned U.S. Appl. No. 09/305,146, filed May 4, 1999. 2 pages.
Notice of Allowance mailed Jul. 15, 2010, for commonly owned U.S. Appl. No. 09/305,146, filed May 4, 1999. 4 pages.
Request for Continued Examination dated Oct. 14, 2010, for commonly owned U.S. Appl. No. 09/305,146, filed May 4, 1999. 2 pages.
Notice of Allowance issued Oct. 19, 2010, for commonly owned U.S. Appl. No. 09/305,146, filed May 4, 1999. 4 pages.
Issue Fee Payment dated Nov. 22, 2010, for commonly owned U.S. Appl. No. 09/305,146, filed May 4, 1999. 1 page.
Preliminary Amendment filed Dec. 20, 2004, for commonly owned U.S. Appl. No. 11/017,086, filed Dec. 20, 2004. 9 pages.
U.S. Office Action mailed Sep. 23, 2005, for commonly owned U.S. Appl. No. 11/017,086, filed Dec. 20, 2004. 22 pages.
Jan. 23, 2006 Response to Office Action dated Sep. 23, 2005, for commonly owned U.S. Appl. No. 11/017,086, filed Dec. 20, 2004. 19 pages.
U.S. Office Action mailed Apr. 18, 2006, for commonly owned U.S. Appl. No. 11/017,086, filed Dec. 20, 2004. 24 pages.
Notice of Appeal filed Sep. 15, 2006, for commonly owned U.S. Appl. No. 11/017,086, filed Dec. 20, 2004. 1 page.
Feb. 14, 2007 Amendment and Request for Continued Examination, for commonly owned U.S. Appl. No. 11/017,086, filed Dec. 20, 2004. 18 pages.

U.S. Office Action mailed Mar. 22, 2007, for commonly owned U.S. Appl. No. 11/017,086, filed Dec. 20, 2004. 21 pages.
Aug. 17, 2007 Response to U.S. Office Action dated Mar. 22, 2007, for commonly owned U.S. Appl. No. 11/017,086, filed Dec. 20, 2004. 16 pages.
Office Action, mailed Nov. 5, 2007, for commonly owned U.S. Appl. No. 11/017,086. 23 pages.
Request for Continued Examination dated May 2, 2008, for commonly owned U.S. Appl. No. 11/017,086, filed Dec. 20, 2004. 2 pages.
Office Action mailed Aug. 11, 2008, for commonly owned U.S. Appl. No. 11/017,086, filed Dec. 20, 2004. 23 pages.
Jan. 8, 2009 Response to the final Office Action of Aug. 11, 2008, for commonly owned U.S. Appl. No. 11/017,086, filed Dec. 20, 2004. 17 pages.
Advisory Action mailed Feb. 2, 2009, for commonly owned U.S. Appl. No. 11/017,086, filed Dec. 20, 2004. 2 pages.
Request for Continued Examination dated Feb. 10, 2009, for commonly owned U.S. Appl. No. 11/017,086, filed Dec. 20, 2004. 2 pages.
U.S. Office Action mailed Mar. 3, 2009, for commonly owned U.S. Appl. No. 11/017,086, filed Dec. 20, 2004. 26 pages.
USPTO Communication mailed Mar. 12, 2009, for commonly owned U.S. Appl. No. 11/017,086, filed Dec. 20, 2004. 2 pages.
U.S. Office Action mailed Jul. 21, 2009, for commonly owned U.S. Appl. No. 11/017,086, filed Dec. 20, 2004. 25 pages.
Notice of Abandonment mailed Mar. 24, 2010, for commonly owned U.S. Appl. No. 11/017,086, filed Dec. 20, 2004. 3 pages.
Preliminary Amendment dated Jan. 21, 2010, for commonly owned U.S. Appl. No. 12/691,515, filed Jan. 21, 2010. 3 pages.
U.S. Office Action mailed on Nov. 9, 2010, for commonly owned U.S. Appl. No. 12/691,515, filed Jan. 21, 2010. 10 pages.
U.S. Patent 7,013,284 Re-Examination Request Application No. 90/010,201 filed Jun. 19, 2008. 128 pages.
Determination of Reexam mailed Aug. 1, 2008, for commonly owned U.S. Reexamination No. 90/010,201, filed Jun. 19, 2008. 12 pages.
U.S. Office Action mailed Jul. 17, 2009, for commonly owned U.S. Reexamination No. 90/010,201, filed Jun. 19, 2008. 28 pages.
Sep. 17, 2009 Response to Office Action mailed Jul. 17, 2009, for commonly owned U.S. Reexamination No. 90/010,201, filed Jun. 19, 2008. 49 pages.
Examiner Interview Summary Record dated Sep. 17, 2009, for commonly owned U.S. Reexamination No. 90/010,201, filed Jun. 19, 2008. 3 pages.
Sep. 17, 2009 Affidavits, Declarations, and/or Exhibits filed, for commonly owned U.S. Reexamination No. 90/010,201, filed Jun. 19, 2008. 201 pages.
Decision Merging Proceedings Granted, mailed Feb. 26, 2010, for commonly owned U.S. Reexamination No. 90/010,201 filed Jun. 19, 2008. 3 pages.
Mar. 26, 2010 Amendment and Response to Office Action dated Feb. 26, 2010, for commonly owned U.S. Reexamination No. 90/010,201 filed Jun. 19, 2008. 11 pages.
Decision Merging Proceedings Granted, mailed Feb. 26, 2010, for commonly owned U.S. Reexamination No. 90/010,713 filed Oct. 9, 2009. 3 pages.
Mar. 26, 2010 Amendment in response to Notice to Merge Reexamination dated Feb. 26, 2010, for commonly owned U.S. Reexamination No. 90/010,713 filed Oct. 9, 2009. 11 pages.
Examiner Interview Summary Record dated Jul. 13, 2010, for merged Reexamination Nos. 90/010,201 and 90/010,713 regarding commonly owned U.S. Patent No. 7,013,284 (41 pages).
Patent Owner's Statement of the Interview Under 37 C.F.R. 1.560(b) dated Jul. 30, 2010 for merged Reexamination Nos. 90/010,201 and 90/010,713 regarding commonly owned U.S. Patent No. 7,013,284 (17 pages).
Supplemental Response dated Aug. 27, 2010, for merged Reexamination Nos. 90/010,201 and 90/010,713 regarding commonly owned U.S. Patent No. 7,013,284 (63 pages).
U.S. Office Action mailed Oct. 1, 2010, for merged Reexamination Nos. 90/010,201 and 90/010,713 regarding commonly owned U.S. Patent No. 7,013,284. 40 pages.

Examiner Interview Summary mailed Dec. 15, 2010, for merged Reexamination Nos. 90/010,201 and 90/010,713 regarding commonly owned U.S. Patent No. 7,013,284. 56 pages.
Patent Owner's Response with Appendices dated Jan. 3, 2011, for merged Reexamination Nos. 90/010,201 and 90/010,713 regarding commonly owned U.S. Patent No. 7,013,284. 928 pages. (Document filed in 25 parts).
Dec. 16, 2009 Report on the Filing or Determination of an Action Regarding a Patent or Trademark, for commonly owned U.S. Appl. No. 09/305,234, filed May 4, 1999 and later assigned U.S. Appl. No. 90/010,735. 1 page.
Examiner Interview Summary mailed Dec. 15, 2010, for Reexamination No. 90/010,735 regarding commonly owned U.S. Patent No. 7,617,240. 6 pages.
Interview Summary dated Mar. 3, 2011 in Reexamination (Control No. 90/010,735) filed Nov. 10, 2009, for commonly owned U.S. Patent No. 7,617,240. 49 pages.
U.S. Patent 7,013,284 Re-Examination Request Application No. 90/011,484, filed Feb. 10, 2011. 90 pages.
Exhibit D—Archived description of the Diamond product from Applied Systems, published at least by Jul. 15, 1997, filed in U.S. Patent 7,013,284 Re-Examination Request Application No. 90/011,484, filed Feb. 10, 2011. 8 pages.
Exhibit I—Claim Interpretations, filed in U.S. Patent 7,013,284 Re-Examination Request Application No. 90/011,484, filed Feb. 10, 2011. 18 pages.
Exhibit J—Claims Charts for Claims 1-40 based on Flores and Abbruzzese under 35 U.S.C. § 103, filed in U.S. Patent 7,013,284 Re-Examination Request Application No. 90/011,484, filed Feb. 10, 2011. 207 pages.
Exhibit K—Claim Chart for Claims 1-40 based on Flores, Diamond and Abbruzzese under 35 U.S.C. § 103, filed in U.S. Patent 7,013,284 Re-Examination Request Application No. 90/011,484, filed Feb. 10, 2011. 186 pages.
Exhibit L—Claim Chart for Claims 1-40 based on Flores, Borghesi, and Abbruzzese under 35 U.S.C. § 103, filed in U.S. Patent 7,013,284 Re-Examination Request Application No. 90/011,484, filed Feb. 10, 2011. 181 pages.
Exhibit M—Claim Chart for Claims 1-40 based on Lynn and Abbruzzese under 35 U.S.C. § 103, filed in U.S. Patent 7,013,284 Re-Examination Request Application No. 90/011,484, filed Feb. 10, 2011. 138 pages.
Exhibit N—Claim Chart for Charts 1-40 based on Schutzman and Abbruzzese under 35 U.S.C. § 103, filed in U.S. Patent 7,013,284 Re-Examination Request Application No. 90/011,484, filed Feb. 10, 2011. 119 pages.
Exhibit O—Claim Chart for Charts 1-40 based on Caruso and Abbruzzese under 35 U.S.C. § 103, filed in U.S. Patent 7,013,284 Re-Examination Request Application No. 90/011,484, filed Feb. 10, 2011. 102 pages.
Exhibit P—Action Finishes 1995 with Strong December Sales, PR Newswire, Jan. 1996, filed in U.S. Patent 7,013,284 Re-Examination Request Applicaiton No. 90/011,484, filed Feb. 10, 2011. 3 pages.
Order Granting Re-Examination (Control No. 90/011,484) dated Mar. 4, 2011, for commonly owned U.S. Patent No. 7,013,284. 15 pages.
Notice of Allowance issued Feb. 7, 2011, for commonly owned U.S. Appl. No. 11/264,115, filed Nov. 1, 2005. 24 pages.
Notice of Allowance issued Mar. 7, 2011, for commonly owned U.S. Appl. No. 09/305,146. 5 pages.
Accenture Global Service's GmbH and Accenture LLP's Jan. 18, 2011 Response to Guidewire, Inc.'s Third Set of Interrogatories, in lawsuit asserting U.S. Patent No. 7,617,240, captioned *Accenture Global Services GmbH, et al.* v. *Guidewire Software, Inc.*, D. Del. Nov. 10, 2009, 8 pages.
Defendant Guidewire Software, Inc.'s Feb. 28, 2011 Supplemental Objections and Response to Accenture's Interrogatory No. 4, in lawsuit asserting U.S. Patent No. 7,617,240, captioned *Accenture Global Services GmbH, et al.* v. *Guidewire Software, Inc.*, D. Del. Nov. 10, 2009, No. 6., 6 pgs.
Accenture Global Services GMBH, and Accenture LLP's Supplemental Response to Interrogatories Nos. 7 and 8, dated Mar. 11, 2011, in lawsuit asserting U.S. Patent No. 7,617,240, captioned *Accenture Global Services GmbH, et al.* v. *Guidewire Software, Inc.*, D. Del. Nov. 10, 2009, 15 pgs.
Exhibit F of Accenture Global Services GMBH, and Accenture LLP's Supplemental Response to Interrogatories Nos. 7 and 8—Rebuttal of Guidewire's Invalidity Assertions Against '240 Patent Based on Access 97, 22 pgs.
Exhibit G of Accenture Global Services GMBH, and Accenture LLP's Supplemental Response to Interrogatories Nos. 7 and 8—Rebuttal of Guidewire's Invalidity Assertions Against '240 Patent Based on '109 Patent (Flores), 22 pgs.
Exhibit H of Accenture Global Services GMBH, and Accenture LLP's Supplemental Response to Interrogatories Nos. 7 and 8—Rebuttal of Guidewire's Invalidity Assertions Against '240 Patent Based on '764 Patent (Schutzman), 27 pgs.
Exhibit J of Accenture Global Services GMBH, and Accenture LLP's Supplemental Response to Interrogatories Nos. 7 and 8—Rebuttal of Guidewire's Invalidity Assertions Against '240 Patent Based on '169 Patent (Borghesi), 27 pgs.
Exhibit K of Accenture Global Services GMBH, and Accenture LLP's Supplemental Response to Interrogatories Nos. 7 and 8—Rebuttal of Guidewire's Invalidity Assertions Against '240 Patent Based '247 Patent (Lau), 37 pgs.
Exhibit L of Accenture Global Services GMBH, and Accenture LLP's Supplemental Response to Interrogatories Nos. 7 and 8—Rebuttal of Guidewire's Invalidity Assertions Against '240 Patent Based on '740 Patent (Lynn), 27 pgs.
Exhibit M of Accenture Global Services GMBH, and Accenture LLP's Supplemental Response to Interrogatories Nos. 7 and 8—Rebuttal of Guidewire's Invalidity Assertions Against '240 Patent Based on '271 Patent (Caruso), 33 pgs.
Exhibit N of Accenture Global Services GMBH, and Accenture LLP's Supplemental Response to Interrogatories Nos. 7 and 8—Rebuttal of Guidewire's Invalidity Assertions Against '240 Patent Based on Agarwal, 22 pgs.
Defendant Guidewire Software, Inc.'s Mar. 29, 2011 Supplemental Objections and Response to Accenture's Interrogatory No. 3, in lawsuit asserting U.S. Patent No. 7,617,240, captioned *Accenture Global Services GmbH, et al.* v. *Guidewire Software, Inc.*, D. Del. Nov. 10, 2009, No. 6., 24 pgs.
Exhibit C of Defendant Guidewire Software, Inc.'s Mar. 29, 2011 Redacted Supplemental Objections and Response to Accenture's Interrogatory No. 3 (F623) (Microsoft TODD, as cited in Mar. 14, 2001 and Dec. 3, 2001 Office Actions in 284 Patent File History)—Guidewire Invalidity Contentions Invalidity Claim Chart for '240 Patent, 19 pages.
Exhibit F of Defendant Guidewire Software, Inc.'s Mar. 29, 2011 Redacted Supplemental Objections and Response to Accenture's Interrogatory No. 3 (F623) (Microsoft Access 97)—Guidewire Invalidity Contentions Invalidity Claim Chart for '240 Patent, 15 pages.
Exhibit G of Defendant Guidewire Software, Inc.'s Mar. 29, 2011 Redacted Supplemental Objections and Response to Accenture's Interrogatory No. 3 (F623) ('109 Patent (Flores))—Guidewire Invalidity Contentions Invalidity Claim Chart for '240 Patent, 42 pages.
Exhibit H of Defendant Guidewire Software, Inc.'s Mar. 29, 2011 Redacted Supplemental Objections and Response to Accenture's Interrogatory No. 3 (F623) ('764 Patent (Shutzman)—Guidewire Invalidity Contentions Invalidity Claim Chart for '240 Patent, 73 pages.
Exhibit J of Defendant Guidewire Software, Inc.'s Mar. 29, 2011 Redacted Supplemental Objections and Response to Accenture's Interrogatory No. 3 (F623) ('169 Patent (Borgheshi)—Guidewire Invalidity Contentions Invalidity Claim Chart for '240 Patent, 39 pages.
Exhibit K of Defendant Guidewire Software, Inc.'s Mar. 29, 2011 Redacted Supplemental Objections and Response to Accenture's Interrogatory No. 3 (F623) ('247 Patent (Lau))—Guidewire Invalidity Contentions Invalidity Claim Chart for '240 Patent, 25 pages.
Exhibit L of Defendant Guidewire Software, Inc.'s Mar. 29, 2011 Redacted Supplemental Objections and Response to Accenture's Interrogatory No. 3 (F623) ('740 Patent (Lynn)—Guidewire Invalidity Contentions Invalidity Claim Chart for '240 Patent, 44 pages.

Exhibit M of Defendant Guidewire Software, Inc.'s Mar. 29, 2011 Redacted Supplemental Objections and Response to Accenture's Interrogatory No. 3 (F623) ('271 Patent (Caruso))—Guidewire Invalidity Contentions Invalidity Claim Chart for '240 Patent, 39 pages.

Exhibit O of Defendant Guidewire Software, Inc.'s Mar. 29, 2011 Redacted Supplemental Objections and Response to Accenture's Interrogatory No. 3 (F623) (Project Salsa)—Guidewire Invalidity Contentions Invalidity Claim Chart for '240 Patent, 44 pages.

Accenture Global Services GMBH, Accenture LLP's and Guidewire Software, Inc.'s Joint Claim Construction Statement and Joint Claim Construction Chart—Exhibit A filed Apr. 11, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009, 6 pages.

Accenture's Opening Claim Construction Brief, filed Apr. 25, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 22 pages.

Office Action dated Jan. 24, 2007, for commonly owned U.S. Appl. No. 10/434,827, filed May 9, 2003. 40 pages.

Office Action dated May 31, 2007, for commonly owned U.S. Appl. No. 10/434,827, filed May 9, 2003. 20 pages.

May 6, 2011 Response to Non-Final Office Action dated Nov. 9, 2010, for commonly owned U.S. Appl. No. 12/691,515, filed Jan. 21, 2010. 6 pages.

Patent Owner's Petition to Expunge the Request for Reexamination and Vacate the Filing Date and Order Granting Reexamination dated May 4, 2011, for Reexamination No. 90/011,484 regarding commonly owned U.S. Patent No. 7,013,284. 6 pages.

Muth et al., "Integrating Light-Weight Workflow Management Systems within Existing Business Environments", Proceedings, 15th International Conference on Data Engineering Mar. 23-26, 1999. 8 pages.

Patent Owner's Response with Appendices dated May 4, 2011, for Reexamination No. 90/010,735 regarding commonly owned U.S. Patent No. 7,617,240. 55 pages.

Appendix AA—Declaration of John A. Pierce dated May 3, 2011, and Accompanying exhibits, filed with Patent Owner's Response of May 4, 2011, in Reexamination No. 90/010,735 regarding commonly owned U.S. Patent No. 7,617,240. 8 pages.

Appendix BB—Therese Rutkowski, "Keeping The Promise: Insurance Network News Executive Strategies For Technology Management" Feb. 1, 2002, filed with Patent Owner's Response of May 4, 2011, in Reexamination No. 90/010,735 regarding commonly owned U.S. Patent No. 7,617,240. 3 pages.

Appendix CC—"Affirmative Insurance Selects Accenture Claims Solution For Its Transformation Program" Sep. 13, 2007, filed with Patent Owner's Response of May 4, 2011, in Reexamination No. 90/010,735 regarding commonly owned U.S. Patent No. 7,617,240. 4 pages.

Appendix DD—"Accenture Claim Components Solution Version 6.0 Implemented At OneBeacon" Jul. 10, 2007, filed with Patent Owner's Response of May 4, 2011, in Reexamination No. 90/010,735 regarding commonly owned U.S. Patent No. 7,617,240. 4 pages.

Appendix EE—"Kemper Insurance Selects Accenture's Claim Components Software" May 14, 2002, filed with Patent Owner's Response of May 4, 2011, in Reexamination No. 90/010,735 regarding commonly owned U.S. Patent No. 7,617,240. 4 pages.

Appendix Z—Celent, "Claim Systems Vendors: North American P/C Insurance 2011" Jan. 2011, filed with Patent Owner's Response of May 4, 2011, in Reexamination No. 90/010,735 regarding commonly owned U.S. Patent No. 7,617,240. 143 pages.

Ex Parte Reexamination Certificate, dated Dec. 6, 2011, pp. 1-2, Reexamination Application Serial No. 90/010,735, U.S. Patent and Trademark Office, Virginia.

Office Action, dated Aug. 28, 2012, pp. 1-13, U.S. Appl. No. 12/036,120, U.S. Patent and Trademark Office, Virginia.

Office Action, dated Jul. 7, 2011, pp. 1-19, U.S. Appl. No. 12/036,120, U.S. Patent and Trademark Office, Virginia.

Office Action, dated Aug. 5, 2011, pp. 1-33, U.S. Appl. No. 12/036,103, U. S. Patent and Trademark Office, Virginia.

Office Action, dated Oct. 7, 2011, pp. 1-52, U.S. Appl. No. 12/036,119, U.S. Patent and Trademark Office, Virginia.

Definition of "hypertext", dated 1996, pp. 1, available at http://web.archive.org.

Memorandum Opinion filed May 31, 2011, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages.

Guidewire's Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 25 pages.

Declaration of Clement S. Roberts in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 3 pages.

Exhibit 3—Accenture Newsroom, "Accenture Unveils Enhanced Property and Casualty Insurance Software Platforms", http://newsroom.accenture.com/article_display.cfm?article_id=5212, in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 4 pages.

Exhibit 4—"Segment" definition, http://www.merriam-webster.com/dictionary/segment, in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 3 pages.

Diamond Personal Auto, Applied Systems, Date Unknown. Deposition Exhibit 123, 12 pages.

The Diamond System—Overview and Features. http://web.archive.org/web/19981201192832/www.appliedsystems.com/Diamond/overview.html. Printed from the Internet May 31, 2009. Deposition Exhibit 141, p. 1.

Freedom's Claim Station, The Freedom Group, 1999. Deposition Exhibit 151, 14 pages.

"The Claims Workstation", The Freedom Group, 1997. Deposition Exhibit 154, 4 pages.

"AAA Missouri Implements Claims Management System", Case Study—The Freedom Group, 1998. Deposition Exhibit 156. 2 pages.

"Higher Customer Satisfaction. Lower Leakage. With Freedom's Claims Workstation." The Freedom Group, 1998. Deposition Exhibit 157, 4 pages.

Fawley, "Arbella Mutual Insurance Company Adds Freedom's Claims Workstation", The Freedom Group, Apr. 2, 1998. Deposition Exhibit 158, 2 pages.

Fawley, "Permanent General Assurance Corporation Adds Freedom's Claims Workstation", The Freedom Group, Dec. 29, 1998. Deposition Exhibit 159, 2 pages.

"AAA Missouri Implements Claims Management System", Date Unknown. Deposition Exhibit 160, 1 page.

Fawley, "The Concord Group Insurance Companies Go 'Live' with Freedom's Claims WorkStation", The Freedom Group, Feb. 1, 1999. Deposition Exhibit 161, 2 pages.

"Claims Workstation", USPTO Trademark Electronic Search System (TESS), printed from United States Patent and Trademark Office website Apr. 10, 2009. Deposition Exhibit 163, 2 pages.

Publically available documents taken from the Internet Archive on the Diamond System—http://web.archive.org/web/19970619183517/www.appliedsystems.com/compsys.htm, circa 1997, 12 pages.

Publically available documents taken from the Internet Archive on the Claims Workstation—web.archive.org/web/19971008183730/www.freedomgroup.com/tfgclmws.htm, circa 1997, 3 pages.

Publically available documents taken from the Internet Archive on the Pyramid—web.archive.org/web/19981212032130/http://www.pyramidservices.com, circa 1998, 37 pages.

Advisory Action issued May 27, 2011, for Reexamination No. 90/010,735 regarding commonly owned U.S. Patent No. 7,617,240. 4 pages.

Stipulation and Order of Partial Dismissal filed Jun. 17, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 4 pages.

Final Judgment filed Jun. 22, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 1 page.

Issue Notification mailed Jun. 22, 2011, for commonly owned U.S. Appl. No. 09/305,146. 1 page.

Office Action, dated Jan. 15, 2013, pp. 1-13, U.S. Appl. No. 12/036,120, U.S. Patent and Trademark Office, Virginia.

Notice of Allowance, dated Feb. 8, 2013, 1-9, U.S. Appl. No. 12/036,103, U.S. Patent and Trademark Office, Virginia.

Office Action, dated Nov. 9, 2012, pp. 1-27, U.S. Appl. No. 12/036,119, U.S. Patent and Trademark Office, Virginia.

Office Action, dated Nov. 19, 2010, pp. 1-21, U.S. Appl. No. 12/036,103, U.S. Patent and Trademark Office, Virginia.

\* cited by examiner

Rules Details

| Details | Common Rules | Advanced Rules |

Rule Details

Rule Name: RuleXMLName       Rule Number: NR0001
Rule Type: Navigation Rule    Application: FNOL
Effective Date: 01/09/2005    Expiration Date: 12/31/299
Initiated By: Person Who Initiated the Rule    Initiated Date: 01/02/2005
Last Modified By: Person who last updated the rule    Last Modified Date: 08/03/2006

Used By

Page Name: Key Facts

Navigation Rule True: PROPDAM      Navigation Rule False: NAVNEXT

[Add New] [Create Like] [Expire] [Delete]    [Edit]

Rules Details

| Details | Common Rules | Advanced Rules | Discrepancy Message | Print Help |

Rule Details

Rule Name: RULE_DIS_004                Rule Number: DS00004
Rule Type: Application Discrepancy      Application: FNOL
Effective Date: 1/1/1990                Expiration Date: 12/31/2999
Initiated By: Delilah James             Initiated Date: 8/7/2003
Last Modified By: Delilah James         Last Modified Date: 12/18/2006

Used By

Process Name: Policy

[Add New] [Create Like]                                    [Edit]

Rules Details

Details | Common Rules | Advanced Rules

Rule Details

Rule Name: _____ *

Rule Type: [(None) ▶] ◇*

Effective Date: _____ ◇*

Initiated By: Name of Person who made rule

Last Modified By: Name of person last mod the rule

Rule Number: _____ *

Application: [FNOL ▶] *

Expiration Date: _____ ◇ *

Initiated Date: 10/13/2006

Last Modified Date: 10/13/2006

Used By

[Back]  [Reset]  [Save]

Figure 6

Rules Details

| Details | Common Rules | Advanced Rules |

Rule Details

Rule Name: RuleXMLName

Rule Type: Display Rule

Effective Date: [01/01/2006] ◇ *     Application:

Expiration Date: [12/31/2999] ◇ *

Initiated By: Delilah James     Initiated Date: 1/1/2006

Last Modified By: Delilah James     Last Modified Date: 4/3/2006

Used By

Question Text: Question type does not have text associated to it
Question Name: URLForTowingCompany     Page Node:
Container Name: Ques Container VehicleDamage Question Text: Question type does not have text associated to it
Question Name: URLForTowingCompany     Page Node: /FNOL/ThirdParty/VechicleGN/
Container Name: Ques Container VehicleDamage     Page Node: ThirdPartyVehicle

[Reset] [Save]

Rules Details

| Details | Common Rules | Advanced Rules |

Rule Expression

◀ ▭ ▶

Validate full Expression
Clear
Validate Expression

Add Rule

Operand Type: [Question ▶]
Operand: Is the vehicle drivable?
Operator: [= ▶]
Operand Type: [Value ▶]          Select
Value: <Not Answered>
       Yes
       No ( )    And    Or    Complete
Reset    Save

Rules Details

Details | Common Rules | Advanced Rules | Discrepancy Message

Rule Details

- Rule Name: \_\_\_\_\_ *
- Rule Type: Application discrepancy ▶ *   Rule Number: \_\_\_\_\_
- Effective Date: 12/19/2006 *   Application: FNOL ▶ *
-   Expiration Date: 12/31/2999 *
- Initiated By: Delilah James   Initiated Date: 12/18/2006
- Last Modified By: Delilah James   Last Modified Date: 12/18/2006

Used By

- Process Name: <None> ▶

[Reset]  [Save]

Print Help

Rules Details

Details | Common Rules | Advanced Rules | Discrepancy Message

Rule Expression

//InsuredVehicle[

- View full expression
- Clear
- Validate Expression

Add Rule

- Starting Page Node: InsuredVehicle ▶
- Operand Type: Question ▶
- Operand: [ Select ]
- Evaluate all instances of questions: ☐
- Operator: <None> ▶
- Operand Type: <None> ▶

[ ( ) ] [ And ] [ Or ] [ Complete ]

[ Reset ] [ Save ]

Figure 19

Rules Details

| Details | Common Rules | Advanced Rules | Discrepancy Message |

Rule Expression

//InsuredVehicle

[View full expression]
[Clear]
[Validate Expression]

Add Rule

Starting Page Node: [InsuredVehicle ▼]
Operand Type: [Question ▼]
Operand: HasVehicleBeenRepaired
Evaluate all instances of question: ☐
Operator: [= ▼]
Operand Type: [Value ▼]
Value: Not Answered / Yes / No

[Select]

[( )] [And] [Or] [Complete]
[Reset] [Save]

Rules Details

Details | Common Rules | Advanced Rules | Discrepancy Message

Rule Expression

//InsuredVehicle[HasVehicleBeenRepaired='N'And

[View full expression]
[Clear]
[Validate Expression]

Add Rule

Starting Page Node: [InsuredVehicle ▶]

Operand Type: [<None> ▶]

Operand:

Evalute all
instances of questions: ☐

Operator: [<None> ▶]

Operand Type: [<None> ▶]

[ ( ) ] [ And ] [ Or ] [ Complete ]

[ Reset ] [ Save ]

Rules Details

| Details | Common Rules | Advanced Rules | Discrepancy Message |

Rule Expression

//InsuredVehicle[HasVehicleBeenRepaired='N'And

[View full expression]
[Clear]
[Validate Expression]

Add Rule

Start Page Node: [InsuredVehicle ▶]

Operand Type: [Node Count ▶]

Operand: [InsuredVehicle/TotalLossEval ▶]

Operator: [= ▶]

Operand Type: [Value ▶]

Value: [0]

[ ( ) ] [And] [Or] [Complete]

[Reset] [Save]

RULE GENERATION SYSTEM ADAPTED FOR AN INSURANCE CLAIM PROCESSING SYSTEM

BACKGROUND

1. Technical Field

This insurance application relates to processing insurance claims, and in particular, to a rule generation system for an insurance claim processing computer system.

2. Related Art

In processing insurance claims from an insurance customer, an insurance claim agent typically asks a variety of questions to the insurance customer. An insurance claim processing center typically employs an insurance claim processing computer system for processing insurance claims from insurance customers. The insurance claim processing computer system may be used by various employees at the claim processing center such as insurance claim agents. The insurance claim processing computer system may be operative to display various graphical user interfaces that an insurance claim agent uses when asking questions to an insurance customer and when the insurance claim agent receives answers to those questions.

In some circumstances, the insurance claim processing center desires to order the presentation of questions and various graphical user interfaces. However, an insurance claim processing computer system is usually extremely complex and requires an individual, such as a computer program developer, who has a skill set that includes the computer programming language in which the insurance claim processing computer system was written. Hence, the insurance claim processing center incurs additional burdens, including fees to the computer program developer and lag time, each time the insurance claim processing center desires to change the order or display of the graphical user interfaces. In addition, when an insurance claim processing center does not have the personnel with the technical skill set to add or create questions using the insurance claim processing computer system, the insurance claim processing center realizes additional expenses in training or hiring the personnel with the requisite skill set.

Moreover, making modifications to existing insurance claim processing computer systems requires disabling access to and shutting down the systems connected to the insurance claim processing computer system. Hence, when the insurance claim processing center desires to change the order or display of the graphical user interfaces, the insurance claim processing center must shut down the entire insurance claim processing computer system. This shutting down process results in downtime of the insurance claim processing center, which translates into lost revenue and lost worker productivity.

SUMMARY

A rule generation system dynamically generates rules for an insurance claim processing computer system. The dynamically generated rules may be used as part of the insurance claim processing computer system for presenting graphical user interfaces or other communication interfaces. The rule generation system includes various modules and graphical user interfaces that provide a streamlined mechanism for creating new rules and modifying pre-existing rules for the insurance claim processing computer system. In addition, the rule generation system minimizes the need to learn a complicated computer language or syntax each time a conversational question is created. The rule generation system may include various levels of usability that distinguish between a question programmer that programs questions for the rule question generation system and an insurance claim agent.

In general, a rule may be considered an evaluative expression. A user may use the rule generation system to generate or modify different categories of evaluative expressions. Examples of evaluative expressions include navigation evaluative expressions, display evaluative expressions, and discrepancy message evaluative expressions. An evaluative expression may have one or more evaluative expression parameters representing one or more conditional statements that correspond to the evaluative expression category of the evaluative expression. In addition, different categories of evaluative expressions may have different evaluative expression parameters. For example, a navigation evaluative expression may have different evaluative expression parameters than a display evaluative expression or a discrepancy message evaluative expression. The rule generation system may use one or more graphical user interfaces to assign values to the different categories of evaluative expressions.

In one implementation, the rule question generation system includes a memory storage device in communication with various system components, such as a processor. The memory storage device stores an evaluative expression database that has been configured with an evaluative expression framework. The evaluative expression framework may encompass different categories of evaluative expressions.

The evaluative expression database may employ various tables to implement the evaluative expression framework. By way of example, the evaluative expression database may employ an evaluative expression table, an evaluative expression support table, an evaluative expression text table, an evaluative expression association table, and a common evaluative expression table. The evaluative expression database may employ more or less tables depending on the evaluative expression framework.

The memory storage device may also store executable instructions that define evaluative expression modules for generating, editing, or modifying evaluative expressions. In one implementation, the executable instructions define an evaluative expression parameter module, an evaluative expression generator module, a common evaluative expression module, an evaluative expression parameter module, and an advanced evaluative expression module. The executable instructions may be operative to define more or less modules. Each of the modules may be associated with one or more graphical user interfaces.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 4 shows another example of an evaluative expression communication interface implemented by the evaluative expression parameter module of FIG. 2 that displays the details of a navigation rule.

FIG. 5 shows another example of an evaluative expression communication interface implemented by the evaluative expression parameter module of FIG. 2 that displays the details of a discrepancy rule.

FIG. 6 shows another example of an evaluative expression communication interface implemented by the evaluative expression parameter module of FIG. 2 for adding a new rule.

FIG. 7 shows another example of an evaluative expression communication interface implemented by the evaluative expression parameter module of FIG. 2 for editing the details of a display rule.

FIGS. 11-15 show various examples of building an advanced rule using an evaluation expression communication interface implemented by the advanced evaluative expression module of FIG. 2.

FIG. 16 shows a further example of an evaluative expression communication interface implemented by the evaluative expression parameter module of FIG. 2.

FIGS. 17-23 show additional examples of evaluation expression communication interfaces implemented by the advanced evaluative expression module of FIG. 2.

DETAILED DESCRIPTION

System Overview

Figure 1:
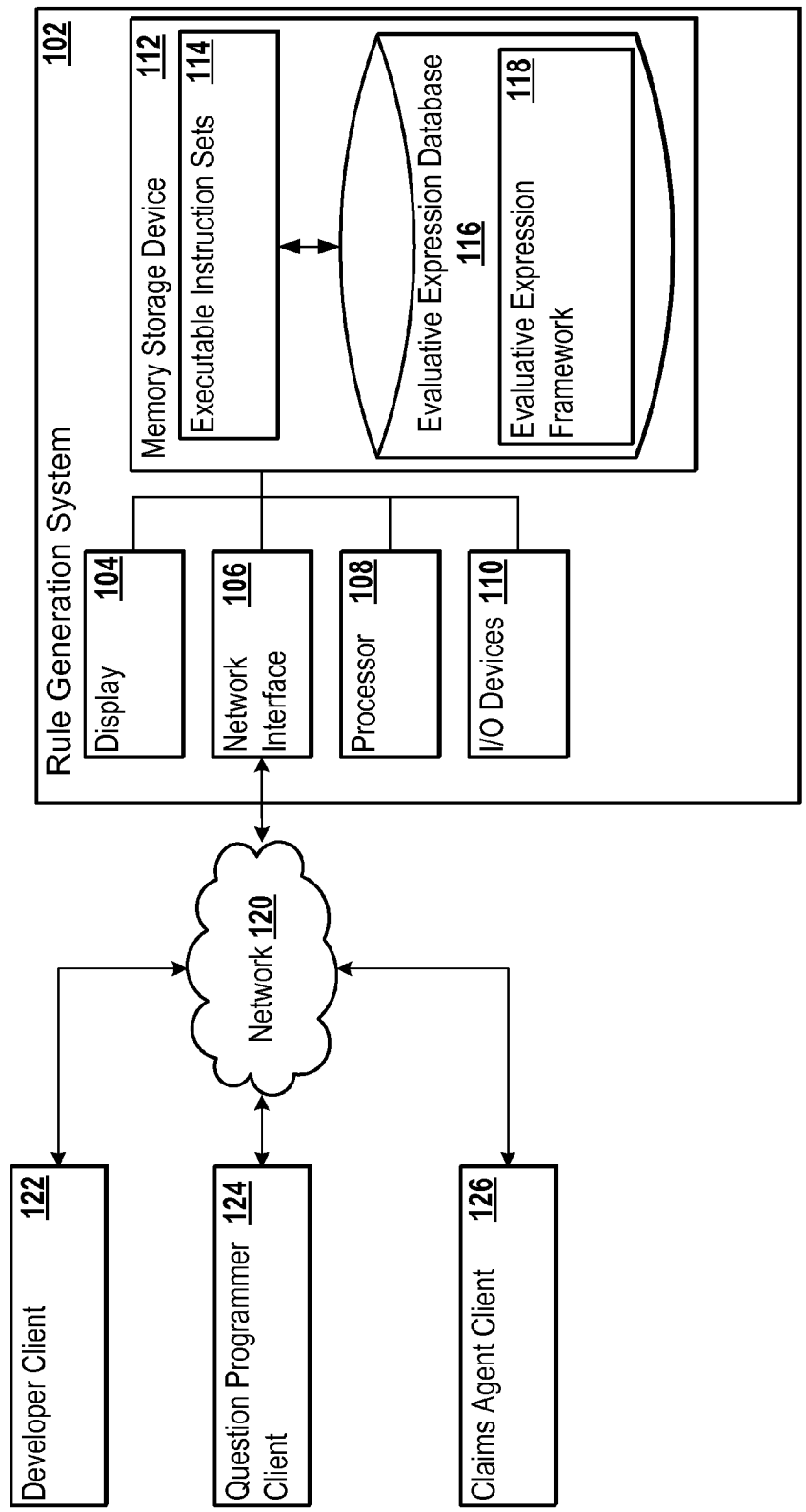
FIG. 1 shows one example of a rule generation system.

While the embodiments described herein relate to insurance claim processing, the modules and other systems described may be adopted for any system that uses databases, Internet technologies, graphical user interfaces, or other communication interfaces.

In general, an insurance claim processing computer system uses graphical user interfaces to present questions to an insurance claim agent or an insurance customer. The questions may be part of an insurance application of the insurance claim processing computer system, such as a first notice of loss insurance application or an underwriting insurance application. Although the questions may be any type of question, the questions may relate to the specific insurance application. For example, in a first notice of loss insurance application, the questions may relate to an insurance claim.

The graphical user interfaces may be displayed as part of a web page, which is usually a file of information made available for viewing on the World Wide Web and displayable in an Internet browser or other computer program. The web page may be sub-divided into sections, referred to as "containers" in the present insurance application. The insurance claim processing computer system may populate the containers with questions.

The web pages are presented to an insurance claim agent or insurance customer as part of an organized structure of the insurance application, wherein the organized structure includes a series of sequential nodes and each node represents a web page. The web page may be displayed in a window of a computer program, such as an Internet web browser. In general, the term "window" refers to a portion of a computer monitor that contains its own document or message. In window-based computer programs, the screen may be divided into several windows, each of which has its own boundaries and may contain a different document, or a different view of the same document. A window may also be a modal window, which may require user input or other action before another window is displayed. In alternative implementations, the nodes may be non-sequential or a node may represent a window.

The organized structure may include nodes relating to any part of the insurance application. For example, in a first notice of loss application, an organized structure may include nodes relating to the witnesses of an accident, the insurance policy information of an insurance customer, or other aspect of an insurance claim. With regard to the previous example, an insurance claim agent may encounter one or more nodes in processing an insurance claim.

To maintain the organization of the web pages, nodes, containers, and questions, the insurance claim processing computer system may employ various evaluative expressions, also known as rules, directed to each of these elements. For example, the insurance claim processing computer system may have rules relating to the display of questions, to the navigation of web pages, and to evaluating whether answers to the questions conflict with expected answers or previously given answers.

Because the insurance claim processing computer system may have many rules, maintaining these rules and creating additional rules is often a daunting task. Hence, a rule generation system assists in the creation and maintenance of these rules.

FIG. 1 shows an example of the rule generation system 102. The rule generation system 102 includes several components for adding, maintaining, expiring or deleting evaluative expressions used by the insurance claim processing computer system. In one implementation, the rule generation system 102 includes a display 104, a network interface 106, a processor 108, and various input/output devices 110, such as keyboards, mice, hard drives, floppy drives, optical disk drives, or other input/output devices. The rule generation system 102 also includes a memory storage device 112 that stores executable instruction sets 114 that are executable by the processor 108. The memory storage device 112 also stores an evaluative expression database 116 that implements an evaluative expression framework 118, which defines different categories of evaluative expressions.

The rule generation system 102 may generate many different categories of the evaluative expressions. As previously discussed, the different categories of evaluative expressions may relate to the web pages of the insurance claim processing computer system, navigating through the web pages of the insurance claim processing computer system, determining whether discrepancies exist in the insurance claim processing computer system, or other aspects. In one example, the different categories of evaluative expressions may include, but are not limited to, page display rules, navigation rules, and discrepancy rules. However, in other examples, the rule generation system 102 also may generate, modify, or otherwise maintain other categories of evaluative expressions.

In one implementation, page display rules determine whether an element of the insurance claim processing computer system, such as a question for an insurance customer, should be visible or not visible on a web page. For example, if the page display rule evaluates to a predetermined result, such as Boolean true, the element is visible on the web page; otherwise, if the page display rule evaluates to a different predetermined result, such as Boolean false, the element is not visible on the web page.

Navigation rules define the order in which web pages are displayed. For example, a navigation rule may determine which web page should be navigated to when leaving the current web page. However, another navigation rule may determine the order in which the web pages are displayed.

Discrepancy rules may determine whether there are discrepancies in the insurance claim processing computer system. Examples of discrepancy rules include evaluative discrepancy rules and node result discrepancy report rules. In general, evaluative discrepancy rules determine whether data discrepancies exist in the insurance claim processing computer system, and node result discrepancy report rules determine whether there are node discrepancies in the insurance claim processing computer system. The rule generation system 102 may also support other categories of discrepancy rules.

In addition to the various categories of rules, the rule generation system 102 may support different types of evaluative expressions within those categories. In one implementation, the rule generation system 102 supports at least two evaluative expression types: a common rule type and an advanced rule type. The common rule type may define rules that have commonly-used parameters or commonly-used evaluative expressions. A common rule may define evaluative expression parameter categories and assign predetermined evaluative expression parameter values to the various evaluative expression parameter categories. In contrast, the advanced rule type may be one or more system-configured or user-configured rules that have a custom set of parameters or a custom set of evaluative expressions. The rule generation system 102 may be further operative to generate a rule that includes rules from both the common rule type and the advanced rule type. In this implementation, common rule types and advanced rule types are examples of different types of rules. The rule generation system 102 also may be operative to support different types of rules other than common rule types and advanced rule types.

The rule generation system 102 may be in communication with multiple insurance claim processing center employee client computers 122-126 through a network 120. The insurance claim processing center employee client computers 122-126 may include a developer client computer 122, a question programmer client computer 124 and an insurance claim agent client computer 126. The client computers 122-126 may have different categories of access levels for accessing the rule generation system 102. For example, the developer client computer 122 may have the highest tier access level, the question programmer client computer 124 may have a mid-tier access level, and the insurance claim agent 127 may have the lowest tier access level.

The different access levels may grant different categories of access to the rule generation system 102. For example, the highest tier access level may grant access to modify the executable instruction sets 114, the evaluative expression framework 118, or any other components 104-118 of the conversational question generation system 102. In contrast, the mid-tier access level may restrict access to activities relating to evaluative expressions, such as generating the different categories of rules, modifying one or more rules, or removing rules from the evaluative expression database 116. Finally, the lowest tier access level may restrict access to displaying rules and providing parameters to the various categories of rules.

Furthermore, the different access levels may be further subdivided into additional access levels. For example, the mid-tier access level may distinguish between basic users and advanced users. In general, the rule generation system 102 assigns a basic user to be a business analyst with limited exposure to technology, and assigns an advanced user to be an individual who has a solid understanding of the supporting technology of the insurance claim processing computer system. In one implementation, the rule generation system 102 permits an advanced user to set any property of a rule when creating and editing a rule. In contrast, the rule generation system 102 limits the basic user such that the basic user may only enter a subset of the properties of a rule. In addition, the lowest tier access level and the highest tier access level may distinguish between different categories of users accessing the rule generation system 102.

Table Structures

Figure 2:
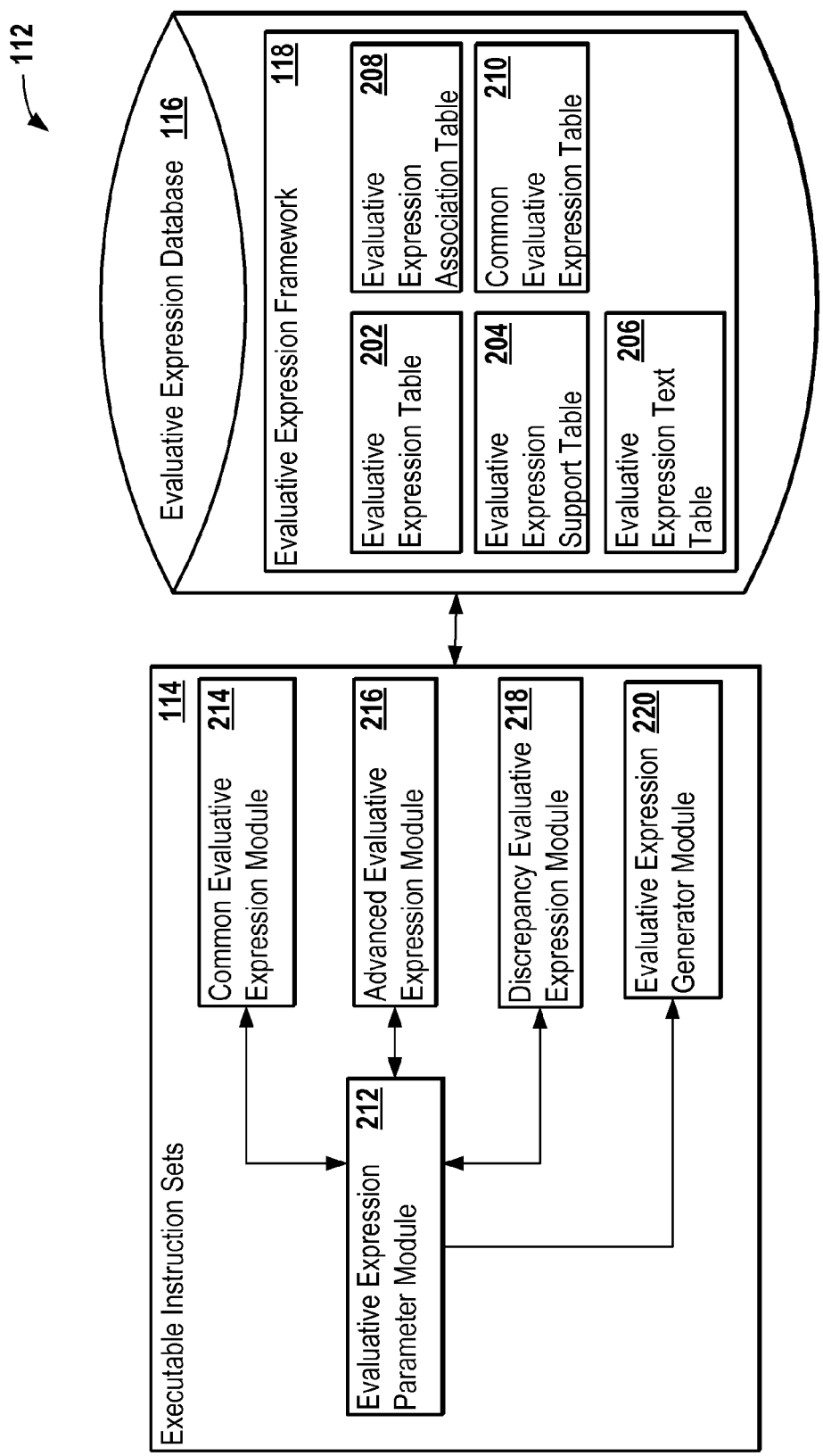
FIG. 2 shows various modules implemented by the executable instruction sets of FIG. 1 in communication with an evaluative expression database.

FIG. 2 shows an example of various modules 212-220 implemented by the executable instruction sets 114 of FIG. 1 in communication with the evaluative expression database 116, and shows additional details regarding the evaluative expression framework 118. In general, the evaluative expression framework 118 supports the various categories of rules. In one implementation, the evaluative expression framework 118 includes database tables 202-210 that contain parameter values for multiple different categories of rules. In the example of FIG. 2, the evaluative expression framework 118 includes an evaluative expression table 202, an evaluative expression support table 204, an evaluative expression text table 206, an evaluative expression association table 208, and a common evaluative expression table 210. In other examples, the evaluative expression framework 118 may include additional or fewer categories of rules to achieve the functionality described herein.

In general, the common evaluative expression table 210 includes criteria that govern the order and contents in which an insurance claim processing computer system places and displays information to a user. The placing and displaying of information may be further based on the type of insurance application that uses the common rule. For example, a common rule may be assigned to a first notice of loss insurance application or may be assigned to an underwriting insurance application. Assignment to other insurance applications is also possible. The common evaluative expression table 210 includes multiple evaluative expression entries that define the parameters for a rule of a common rule type. Table 1 below shows one implementation of the evaluative expression table 210. Table 1 includes a column for entry names, the category of data stored by the entry, whether the entry is initially set to a null value, whether the entry is used as a primary key, and whether the entry is used as a foreign key. In general, the term "primary key" refers to an entry or field that serves as a unique identifier of a specific row in a table. In general, the term "foreign key" refers to an entry or field that identifies a column or a set of columns in one (referencing) table that refers to a column or set of columns in another (referenced) table. Alternative arrangements of the common evaluative expression table 210 are also possible. For example, the common evaluative expression table 210 may include more or less entries than shown in Table 1.

TABLE 1

| Name | Data Category | Null Option | Is Primary Key? | Is Foreign Key? |
|---|---|---|---|---|
| N_CNV_COMM_RULE_ID | char(16) | NOT NULL | Yes | No |
| N_INSURANCE APPLICATION_ID | char(16) | NOT NULL | No | Yes |
| C_CATEGORY | int | NULL | No | No |
| N_DISPLAY_COL | int | NULL | No | No |
| N_CODE_SORT_COL | int | NULL | No | No |
| N_CTGY_SORT_SEQ | int | NULL | No | No |
| C_GROUP_RMU_KEY | char(16) | NOT NULL | No | No |
| M_QUES_XML_NM | char(16) | NOT NULL | No | No |
| D_EFFECTIVE | datetime | NOT NULL | No | No |
| D_EXPIRATION | datetime | NOT NULL | No | No |
| C_RCD_DEL | char(1) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | char(8) | NOT NULL | No | No |

Each of the entries of the common evaluative expression table 210 may correspond to an evaluative expression parameter for a rule associated with a common rule type. The N_CNV_COMM_RULE_ID entry represents a common rule identifier parameter that is a unique identifier for a common rule. The common rule identifier parameter for the N_CNV_COMM_RULE_ID entry may be generated by the rule generation system 102 or by the insurance claim processing computer system.

The N_INSURANCE APPLICATION_ID entry represents a common rule insurance application identifier parameter whose value is a unique identifier for the insurance application to which the common rule is assigned. For example, the N_INSURANCE APPLICATION_ID entry may indicate that the common rule is assigned to a first notice of loss insurance application of the insurance claim processing center. As another example, the N_INSURANCE APPLICATION_ID entry may indicate that the common rule is assigned to an underwriting insurance application of the insurance claim processing center.

The C_CATEGORY entry represents a common rule code/decode category parameter. In general, the common rule code/decode category parameter represents a predetermined value for a category of related items. For example, the predetermined value of the common rule code/decode category parameter may be a numerical value of "18," which may represent the countries of the world. The common rule code/decode category parameter may have one or more associated common rule code/decode category item parameters. A common rule code/decode category item parameter may represent a predetermined value for a specific item from a category of related items. For example, the common rule code/decode category item parameter value may be the numerical value of "001," which, in combination with the common rule code/decode category parameter value of "18," would represent the United States of America. In this example, the C_CATEGORY entry would store the numerical value "001." However, in other examples, the common rule code/decode category item parameter value of "001," may represent another item based on the parameter value of the common rule code/decode category parameter. In addition, when the common rule is displayed, an evaluative expression communication interface may also display one or more category items associated with the common rule code/decode category parameter as selectable parameter values for the common rule. Examples of common rules that may be displayed according to the C_CATEGORY entry include the states of the United States of America, the countries of the world, Lines of Business, Type of Loss, and other related items.

The N_DISPLAY_COL entry represents a common rule display parameter whose value is used by an insurance application of the insurance claim processing computer system to determine which code/decode column to display. The code/decode columns may include the C_CATEGORY entry, a business processing entry that is an alphanumeric representation of a category item associated with the C_CATEGORY entry, a short description entry that is a short description of the business processing entry, and a long description entry that is a long description of the business processing entry. Other code/decode columns are also possible. The N_DISPLAY_COL entry may be assigned any number of numerical values. For example, a value of "1" may cause the display of the contents of the business processing entry, a value of "2" may cause the display of the contents of the short description entry, and a value of "3" may display the contents of the long description entry.

In addition, the combination of a common rule code/decode category parameter value and business processing entry may cause the rule generation system 102 to display a predetermined value, such as the value of the short description entry or the value of the long description entry, to the user.

The N_CODE_SORT_COL entry represents a common rule sort parameter whose value determines the code/decode column to sort. In one implementation, the rule generation system 102 is configured to display items in order of the business processing entry, the short description entry, the long description entry, or any other entry. For example, a value of "1" may cause sorting on the contents of the business processing entry, a value of "2" may cause sorting on the contents of the short description entry, and a value of "3" may cause sorting on the contents of the long description entry.

The N_CTGY_SORT_SEQ entry represents a common rule position parameter whose value identifies the position in an evaluative expression communication interface where the code/decode values associated with the code/decode category parameter values are displayed.

The C_GROUP_RMU_KEY entry represents a common rule RMU parameter whose value is the RMU key for display of the group header information. In general, an RMU key is a look-up value for a dynamic link library that returns a literal representation of a key.

The M_QUES_XML_NM entry represents a common rule name parameter whose value is a text representation of the rule name. The common rule name parameter may be used in searching for the rule by the insurance claim processing computer system.

The D_EFFECTIVE entry represents a common rule effective parameter whose value indicates the effective calendar date of the common rule. Similarly, the D_EXPIRATION entry represents a common rule expiration parameter whose value indicates the expiration date of the common rule. In one implementation, the D_EFFECTIVE entry indicates the calendar day on which the insurance claim processing computer system should begin using or displaying a common rule, and the D_EXPIRATION entry indicates the calendar day on which the insurance claim processing computer system should stop using or displaying a common rule.

The common evaluative expression table 210 may also have computer system entries that represent parameters whose values are generated by the insurance claim processing computer system. For example, the C_RCD_DEL entry, the D_CREATE_TS entry, the D_LAST_UPDT_TS entry, the N_LAST_MOD entry, the N_LAST_UPDT entry, and the N_SYSTEM_MOD entry are examples of entries that have parameter values that are automatically generated by the insurance claim processing computer system. In other implementations, the common evaluative expression table 210 may have more than or less than the number of computer system entries shown in Table 2.

The C_RCD_DEL entry represents a deleted parameter whose value identifies whether a common rule is marked as deleted. In one implementation, the common rule is logically deleted from the evaluative expression database 116 and not physically deleted from the evaluative expression database 116. However, in other implementations, the common rule may be physically deleted from the evaluative expression database 116.

The D_CREATE_TS entry represents an added calendar date parameter whose value indicates a calendar date for when the common rule was added to the table. The D_LAST_UPDT_TS entry represents an updated calendar date parameter whose value indicates when the common rule was last updated. The N_LAST_MOD entry represents a user parameter whose value indicates the user who last updated or created the common rule in the evaluative expression database 116. The N_LAST_UPDT entry represents a parameter whose value changes every time a record is modified. In one implementation, the N_LAST_UPDT is updated by the insurance claim processing computer system and is used by optimistic locking. The N_SYSTEM_MOD entry represents a parameter whose value indicates the rule generation system 102 that updated the common rule.

In addition to a common evaluative expression table 210, the evaluative expression framework 118 may also include an evaluative expression association table 208. In one implementation, the evaluative expression association table 208 operates as a linking table between the tables 202-210 by providing rule association types for rules in the various evaluative expression categories. The entries of the evaluative expression association table 208 describe the rule association type for a rule.

Table 2 shows an example of one implementation of the evaluative expression association table 208. Alternative arrangements of the evaluative expression association table 208 are also possible. For example, the evaluative expression association table 208 may include more or less entries than shown in Table 2. The evaluative expression association table 208 may also have entries similar or identical to the entries found in the common evaluative expression table 210. For purposes of brevity, where the evaluative expression association table 208 has entries similar to the common evaluative expression table 210, a discussion of those entries has been omitted.

The N_CONV_RULE_ASN_ID entry represents a system rule association identifier parameter whose value is a unique numerical value. The system rule association identifier parameter value may be generated by the rule generation system 102 or another system, such as the insurance claim processing computer system.

The N_CONV_TEXT_ID entry represents a system rule text identifier parameter whose value is a unique value that identifies a message text. The system rule text identifier parameter value may be generated by the rule generation system 102 or another system, such as the insurance claim processing computer system.

The N_RULE_SEQ entry represents a rule sequence parameter whose value indicates the order in which one or more rules should be evaluated.

The PAGETYPE_ID entry represents a web page type identifier parameter whose value is a unique value that identifies the web page to which a rule is associated. For example, a web page type identifier parameter value of "INSURED-VEHTLE" represents that the web page of the insured vehicle total loss evaluator is associated with the rule. The web page type identifier parameter value may be generated by the rule generation system 102 or another system, such as the insurance claim processing computer system.

The N_QUESTION_ID entry represents a question identifier parameter whose value is a unique value that identifies a question in the insurance claim processing computer system. The question identifier parameter value may be generated by the rule generation system 102 or another system, such as the insurance claim processing computer system.

The N_INSURANCE APPLICATION_ID entry represents an insurance application identifier parameter whose value is a unique identifier that identifies an insurance application in the insurance claim processing computer system. Examples of insurance applications in the insurance claim processing computer system include a first notice of loss insurance application and an underwriting insurance application.

The C_RULE_ASSOC_TYP entry represents a rule association type parameter whose value is a code/decode value identifying the evaluative expression category of the rule. The rule association type parameter value may be a predefined value, such as a numerical value that identifies whether a rule is a display rule, a navigation rule, or a discrepancy rule. For example, display rules may be associated with the value of "1," navigation rules may be associated with the value of "2," and discrepancy rules may be associated with the value of "3."

TABLE 2

| Name | Data Category | Null Option | Is Primary Key? | Is Foreign Key? |
| --- | --- | --- | --- | --- |
| N_CONV_RULE_ASN_ID | char(16) | NOT NULL | Yes | No |
| N_CONV_TEXT_ID | char(16) | NOT NULL | No | Yes |
| N_RULE_SEQ | int | NULL | No | No |
| N_WEB PAGETYPE_ID | char(16) | NOT NULL | No | Yes |
| N_QUESTION_ID | char(16) | NOT NULL | No | Yes |
| N_INSURANCE APPLICATION_ID | char(16) | NOT NULL | No | Yes |
| C_RULE_ASSOC_TYP | char(5) | NOT NULL | No | No |
| M_CONTAINER_NM | varchar(254) | NOT NULL | No | No |
| T_CONV_RULE | varchar(2000) | NOT NULL | No | No |
| N_NAV_RULE_TRUE | char(16) | NOT NULL | No | No |
| N_NAV_RULE_FALSE | char(16) | NOT NULL | No | No |
| M_CONTAINER_NM_UC | varchar(254) | NOT NULL | No | No |
| T_DATA_TYP_DET_OVR | varchar(254) | NOT NULL | No | No |

Other values are also possible depending on the number and type of evaluative expression categories implemented in the rule generation system 102.

The M_CONTAINER_NM entry represents a rule container parameter whose value indicates the identification number of the container where a rule is located. In general, a container is a sub-section of a web page. In one implementation, the rule container parameter is assigned a value when the C_RULE_ASSOC_TYP entry identifies that the rule is a display rule.

The T_CONV_RULE entry represents a multiple rule name parameter. The T_CONV_RULE entry stores multiple rule names from the M_RULE_NM entry of the evaluative expression table 202. The rule generation system 102 or the insurance claim processing computer system refers to the T_CONV_RULE entry to combine the evaluative expressions represented by each of the rule names into one complete evaluative expression. Rule generation system 102 or the insurance claim processing computer system evaluates and expands the complete evaluative expression at run time.

The N_NAV_RULE_TRUE entry represents a rule navigation parameter whose value indicates the web page in the insurance claim processing computer system where the insurance claim processing computer system should navigate to when the navigation rule associated with the rule navigation parameter evaluates to a predetermined value, such as Boolean true. In some implementations, a web page may have multiple navigation rules. Where a web page has multiple navigation rules, the insurance claim processing computer system uses the first rule navigation parameter of a navigation rule that evaluates to the predetermined value, such as Boolean true, to determine the web page to which the insurance claim processing computer should navigate. A keyword may be assigned to the N_NAV_RULE_TRUE entry to also indicate the web page to which the insurance claim processing computer system should navigate. An example of a keyword is "NAVNEXT," which would indicate to the insurance claim processing computer system that the insurance claim processing computer system should navigate to the next sequential web page after the current web page.

The N_NAV_RULE_FALSE entry represents a rule navigation parameter whose value indicates the web page in the insurance claim processing computer system where the insurance claim processing computer system should navigate to when the navigation rule associated with the rule navigation parameter evaluates to a predetermined value, such as Boolean false. In some implementations, a web page may have multiple navigation rules. Where a web page has multiple navigation rules, the insurance claim processing computer system may use the last rule navigation parameter of a navigation rule that evaluates to the predetermined value, such as Boolean false, to determine the web page to which the insurance claim processing computer should navigate. A keyword may be assigned to the N_NAV_RULE_FALSE entry to also indicate the web page to which the insurance claim processing computer system should navigate. An example of a keyword is "NAVNEXT," which would indicate to the insurance claim processing computer system that the insurance claim processing computer system should navigate to the next sequential web page after the current web page.

The M_CONV_QUESTION TEXT_NM_UC entry represents an uppercase container name parameter whose value is the name of the container on which the rule appears. The insurance claim processing computer system may use the uppercase container name parameter to facilitate name searches in the evaluative expression database 116.

The T_DATA_TYP_DET_OVR entry represents a datatype override parameter whose value indicates whether the insurance claim processing computer system should override the datatype of a previously configured question. The datatype override parameter value either replaces the datatype of a question where the previously configured question has a datatype, or is appended to the datatype of a question where the previously configured question does not have a datatype.

Furthermore, the evaluative expression framework 118 may also include the evaluative expression text table 206. In one implementation, the evaluative expression text table 206 contains entries for the text of discrepancy messages associated with discrepancy rules. The evaluative expression text table 206 may also support the internationalization of discrepancy messages.

Table 3 shows an example of one implementation of the evaluative expression text table 206. Alternative arrangements of the evaluative expression text table 206 are also possible. For example, the evaluative expression text table 206 may include more or less entries than shown in Table 3. The evaluative expression text table 206 may also have entries similar or identical to the entries found in the other tables 202-210. For purposes of brevity, where the evaluative expression text table 206 has entries similar to the tables 202-210, a discussion of those entries has been omitted.

TABLE 3

| Name | Data Category | Null Option | Is Primary Key? | Is Foreign Key? |
|---|---|---|---|---|
| N_CONV_TEXT_ID | char(16) | NOT NULL | Yes | No |
| N_SEQUENCE_NUM | int | NOT NULL | Yes | No |
| C_LOCALE | char(5) | NOT NULL | Yes | No |
| C_UPPERCASE_IND | char(1) | NOT NULL | Yes | No |
| N_INSURANCE APPLICATION_ID | char(16) | NOT NULL | No | Yes |
| T_MSG_TEXT | varchar(4000) | NOT NULL | No | No |
| M_CONV_TEXT_NM | varchar(50) | NOT NULL | No | No |
| M_CONV_TEXT_NM_UC | varchar(50) | NOT NULL | No | No |
| C_DISC_MSG_IND | char(16) | NOT NULL | No | No |
| C_RCD_DEL | char(1) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | char(8) | NOT NULL | No | No |
| N_LAST_UPDT | int | NOT NULL | No | No |

In one implementation, the entries of the evaluative expression text table 206 correspond to a text parameter of a rule. The parameter values for the text parameters may be provided by any number of actors or systems. For example, the text parameter values may be provided by an insurance claim agent, provided by an insurance customer using a graphical user interface, or another provided by system in communication with the rule generation system 102.

The N_CONV_TEXT_ID entry represents a system text identifier parameter whose value is a unique numerical value. The system text association identifier parameter value may be generated by the rule generation system 102 or another system, such as the insurance claim processing computer system.

The N_SEQUENCE_NUM entry represents a sequence number parameter whose value is a sequence number when the message text of a rule is greater than a predetermined rule text character limit. In one implementation, the rule text character limit is 4000 characters. In this implementation, when the number of characters in the rule text of a rule is less than 4000 characters, the N_SEQUENCE_NUM parameter value is 0. However, when the number of characters in the rule text of a rule is less than 4000 characters, the N_SEQUENCE_NUM parameter value starts at a predetermined value, such as the number 1, and as additional rows of rule text are added, the N_SEQUENCE_NUM parameter value is incremented by a predetermined value, such as being incremented by 1, and the incremented parameter value is associated with the added rule text.

The C_LOCALE entry represents a rule language parameter whose value is a predefined value that indicates the language of the rule text. The C_LOCALE entry enables the use of multiple languages for a rule. A rule may have multiple C_LOCALE entries. In one implementation, the C_LOCALE entry indicates a number and the number is associated with a language. For example, the number "001" may be associated with "English" and the number "245" may be associated with French. In this example, a rule that is associated with multiple C_LANGUAGE entries is displayable in multiple languages. The language of the rule text may be selected based on input provided by a user, based on a selection by the rule generation system 102, or based on selection by the insurance claim processing computer system.

The C_UPPERCASE_IND entry represents an uppercase indicator parameter whose value is assigned a logic value, such as a Boolean true value or a Boolean false value. In one example, a Boolean true value indicates that the text associated with a rule is displayable in uppercase alphanumeric characters, and a Boolean false value indicates that the text associated with a rule is displayable in both lowercase and uppercase alphanumeric characters. The insurance claim processing computer system may refer to the C_UPPERCASE_IND entry when performing text searches for rules in the evaluative expression database 116.

The T_MSG_TEXT entry represents a rule message text parameter whose value is a text message associated with a rule. For example, the rule message text parameter may be a text message associated with a discrepancy message or other rule.

The M_CONV_TEXT_NM represents a rule text name parameter whose value is a unique identifying name of the rule text associated with the rule. The rule text name parameter value may be used by the rule generation system 102, by the insurance claim processing computer system, or any other system, for searching and selecting the rule text associated with the rule.

The M_CONV_TEXT_NM_UC entry represents an uppercase rule text name parameter whose value is an uppercase parameter value of the parameter value stored in the M_CONV_QUESTION TEXT_NM entry. The insurance claim processing computer system may use the uppercase rule text name parameter to facilitate name searches in the evaluative expression database 116.

The C_DISC_MSG_IND entry represents a discrepancy message indicator parameter that indicates whether the text is used for a discrepancy rule or for a question.

Additionally, the evaluative expression framework 118 may also include the evaluative expression support table 204. In one implementation, the evaluative expression support table 204 contains entries that support creating a common rule, an advanced rule, or a combination of the rule types.

Table 4 shows an example of one implementation of the evaluative expression support table 204. Alternative arrangements of the evaluative expression support table 204 are also possible. For example, the evaluative expression support table 204 may include more or less entries than shown in Table 4. The evaluative expression support table 204 may also have entries similar or identical to the entries found in the other tables 202-210. For purposes of brevity, where the evaluative expression support table 204 has entries similar to the tables 202-210, a discussion of those entries has been omitted.

TABLE 4

| Name | Data Category | Null Option | Is Primary Key? | Is Foreign Key? |
|---|---|---|---|---|
| N_CONV_RULE_LIB_ID | char(16) | NOT NULL | Yes | Yes |
| T_COMMON_RULE | char(16) | NOT NULL | No | No |
| T_ADVANCED_RULE | char(16) | NOT NULL | No | No |
| C_RCD_DEL | char(1) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | char(8) | NOT NULL | No | No |

The N_CONV_RULE_LIB_ID entry is a primary support key parameter whose value is both a primary key of the evaluative expression support table 204 and a foreign key to the evaluative expression table 202.

The T_COMMON_RULE entry is a common rule parameter whose value is the common portion of a rule. Where a rule does not have a common portion, the value of the common rule parameter may be a null value. The T_COMMON_RULE entry may refer to one or more entries, such as the T_RULE entry, of the evaluative expression table 202.

The T_ADVANCED_RULE entry is an advanced rule parameter whose value is the advanced portion of a rule. Where a rule does not have an advanced portion, the value of the advanced rule parameter may be a null value. The T_ADVANCED_RULE entry may refer to one or more entries, such as the T_RULE entry, of the evaluative expression table 202.

Furthermore, the evaluative expression framework 118 may also include the evaluative expression table 202. In one implementation, the evaluative expression table 202 contains entries that define the parameters for a rule. The entries of the evaluative expression table 202 may refer to other entries of the tables 204-210, or the entries of the tables 204-210 may refer to entries in the evaluative expression table 202. A rule defined by the entries of the evaluative expression table 202 may be a common rule, an advanced rule, or combination rule that includes both a common rule and an advanced rule.

Table 5 shows an example of one implementation of the evaluative expression table 202. Alternative arrangements of the evaluative expression table 202 are also possible. For example, the evaluative expression table 202 may include more or less entries than shown in Table 5. The evaluative expression table 202 may also have entries similar or identical to the entries found in the other tables 204-210. For purposes of brevity, where the evaluative expression table 202 has entries similar to the tables 204-210, a discussion of those entries has been omitted.

TABLE 5

| Name | Data Category | Null Option | Is Primary Key? | Is Foreign Key? |
|---|---|---|---|---|
| N_CONV_RULE_ID | char(16) | NOT NULL | Yes | No |
| N_INSURANCE APPLICATION_ID | char(16) | NOT NULL | No | Yes |
| N_ORG_ENTY_ID | char(16) | NOT NULL | No | Yes |
| M_RULE_NM | varchar(254) | NOT NULL | No | No |
| T_RULE | varchar(2000) | NOT NULL | No | No |
| D_EFFECTIVE | datetime | NOT NULL | No | No |
| D_EXPIRATION | datetime | NOT NULL | No | No |
| C_RULE_ASSOC_TYP | char(5) | NOT NULL | No | No |
| M_RULE_NM_UC | varchar(254) | NOT NULL | No | No |
| C_RCD_DEL | char(1) | NOT NULL | No | No |
| C_RULE_NBR | char(16) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | char(8) | NOT NULL | No | No |

The N_CONV_RULE_ID entry represents a rule identifier parameter whose value is a unique identifier for a rule. The rule identifier parameter may be used as the primary key for the evaluative expression table 202. The rule identifier parameter value may be generated by the rule generation system 102 or by another system, such as the insurance claim processing computer system.

The N_ORG_ENTY_ID entry represents an organization entity identification parameter whose value is a foreign key to the organization entity identification number of the employee who created the conversational question.

The M_RULE_NM entry represents a rule name parameter whose value is a unique set of alphanumeric characters that identify the name of the rule. The rule generation system 102 may provide that the rule name parameter value be in a preconfigured format. For example, rule generation system 102 may provide that the rule name parameter value start with "?^" and end with "^?," such as in "?^BusinessRuleName1^?". The M_RULE_NUM entry may be referenced by other tables 204-210, such as the evaluative expression association table 208.

The T_RULE entry represents an expression parameter whose value is the text expression of the rule. The expression parameter value may be written in the XML Path Language ("XPATH") or other expression language. In addition, the format of the expression parameter value may be based on the evaluative expression category associated with the rule. For example, display rules and navigation rules may have a type of formatting for the expression parameter, while discrepancy rules may have another type of formatting. The expression parameter value may also be assigned a predetermined value, such as a Boolean value of "true" or "false," to indicate that the rule should always evaluate to the predetermined value, such as to always evaluate as true or to always evaluate as false. Assigning a predetermined value to the expression parameter may provide organization of the web pages displayed by the rule generation system 102 or the insurance claim processing computer system, such as by eliminating questions or web pages from the system in an orderly fashion, or setting up questions or rules that do not affect the current insurance application.

The M_RULE_NM_UC entry represents an uppercase rule name parameter whose value is an uppercase name of the rule name parameter value of the M_RULE_NM entry. The insurance claim processing computer system may use the uppercase rule name parameter to facilitate name searches in the evaluative expression database 116.

The executable instruction sets 114 of FIG. 2 implement various modules that are used to populate the evaluative expression database 116 according to the evaluative expression framework 118. In one implementation, the executable instructions sets 114 implement an evaluative expression parameter module 212, a common evaluative expression module 214, an advanced evaluative expression module 216, a discrepancy evaluative expression module 218, and an evaluative expression generator module 220. However, in other examples, the executable instruction sets 114 may implement more or fewer modules that encompass the functionality described herein.

The evaluative expression parameter module 212 is operative to receive evaluative expression parameter values that correspond to evaluative expression parameters. The evaluative expression parameter module 212 may use a graphical user interface or other communication interface to receive the evaluative expression parameter values. For example, the evaluative expression parameter module 212 may receive manually entered evaluative expression parameter values from one of the client computers 122-126 through network 120. As another example, the evaluative expression parameter module 212 may receive the evaluative expression parameter values from one of the components 104-110 of the rule question generation system 102, such as from the I/O devices 110 (FIG. 1). In addition, the evaluative expression parameter values may be provided by any number of actors or systems. For example, the evaluative expression parameter values may be manually provided by an insurance claim agent, manually provided by an insurance customer using a graphical user interface, or provided by another system in communication with the rule generation system 102.

The evaluative expression parameter module 212 is also in communication with the common evaluative expression module 214. The common evaluative expression module 214 is operative to receive common evaluative expression parameters for a rule. In general, rules of the insurance claim processing computer system may have parameters in common, and the common evaluative expression module 214 may be operative to define these parameters. In addition, the common evaluative expression parameters may be based on previously configured questions of the insurance claim processing computer system. Furthermore, the common evaluative expression parameters may vary by insurance application. In one implementation, during operation, the common evaluative expression module 214 communicates with the evaluative expression database 116 to determine the current insurance application, and displays the commonly-used parameters associated with the current insurance application. Examples of common evaluative expression parameters include FNOL Loss Type (Property, Auto, Liability, etc.), FNOL Cause of Loss (Collision, Comprehensive, Theft, etc.), Loss Location Country (USA, Canada, etc.), Loss Location State (New Jersey, Newfoundland, etc.). Other common evaluative expression parameters are also possible.

The evaluative expression parameter module 212 is also in communication with the advanced evaluative expression module 216. The advanced evaluative expression module 216 is operative to define an advanced rule using a combination of advanced rule parameters and advanced rule operands. In one implementation, the advanced evaluative expression module 216 receives the advanced rule parameters as part of a manual entry procedure by a user, such as an insurance claim agent. In another implementation, the advanced evaluative expression module 216 implements an advanced parameter user input form that assists a user in formulating an advanced rule. The advanced parameter user input form helps a user define advanced rule parameters including, but not limited to, advanced rule attributes, advanced rule parameter values, advanced rule answer values, and advanced rule operands. The guided procedure then generates an advanced rule from the input provided by the user. The advanced evaluative expression module 216 may be operative to edit the received advanced rule parameters and advanced rule parameter values after the advanced rule is generated based on user-provided input.

Discrepancy rules that are configured as advanced rules may have additional advanced rule parameters. Where a user starts the process of creating a discrepancy rule using the advanced evaluative expression module 216, the advanced evaluative expression module 216 also may receive a node count parameter value and a node attribute parameter value manually entered by a user or other system through a communication interface.

The evaluative expression parameter module 212 also communicates with the discrepancy evaluative expression module 218. The discrepancy evaluative expression module 218 is operative to receive rule discrepancy parameters manually entered by a user. The discrepancy evaluative expression module 218 is further operative to display or modify the discrepancy messages associated with a discrepancy rule. For example, the discrepancy evaluative expression module 218 may be operative to display a message associated with a discrepancy rule when the discrepancy is evaluated to a predetermined value, such as Boolean true. The discrepancy evaluative expression module 218 also may be operative to associate discrepancy rules with questions of the insurance claim processing computer system using input provided by a user. The user may use a control, such as a graphically displayed button, to search for and attach a new discrepancy rule or change the message that is associated with the rule. The user may also associate a discrepancy rule with a previously configured question.

During operation, after the rule parameter values have been received for a rule, the evaluative expression parameter module 212 communicates with the evaluative expression generator module 220 to generate the rule. The evaluative expression parameter module 212 may communicate any number of rule parameter values to the evaluative expression generator module 220 including common rule parameter values, advanced rule parameter values, display rule parameter values, navigation rule parameter values, discrepancy rule parameter values, or other parameter values. The evaluative expression generator module 220 receives the rule parameter values from the evaluative expression parameter module 212 and generates a rule from these rule parameter values. In one implementation, the evaluative expression generator module 220 communicates with the evaluative expression database 116 to populate the entries of the tables 202-210 with the rule parameter values received from the evaluative expression parameter module 212.

Detail Rule Parameter Interface

Figure 3:
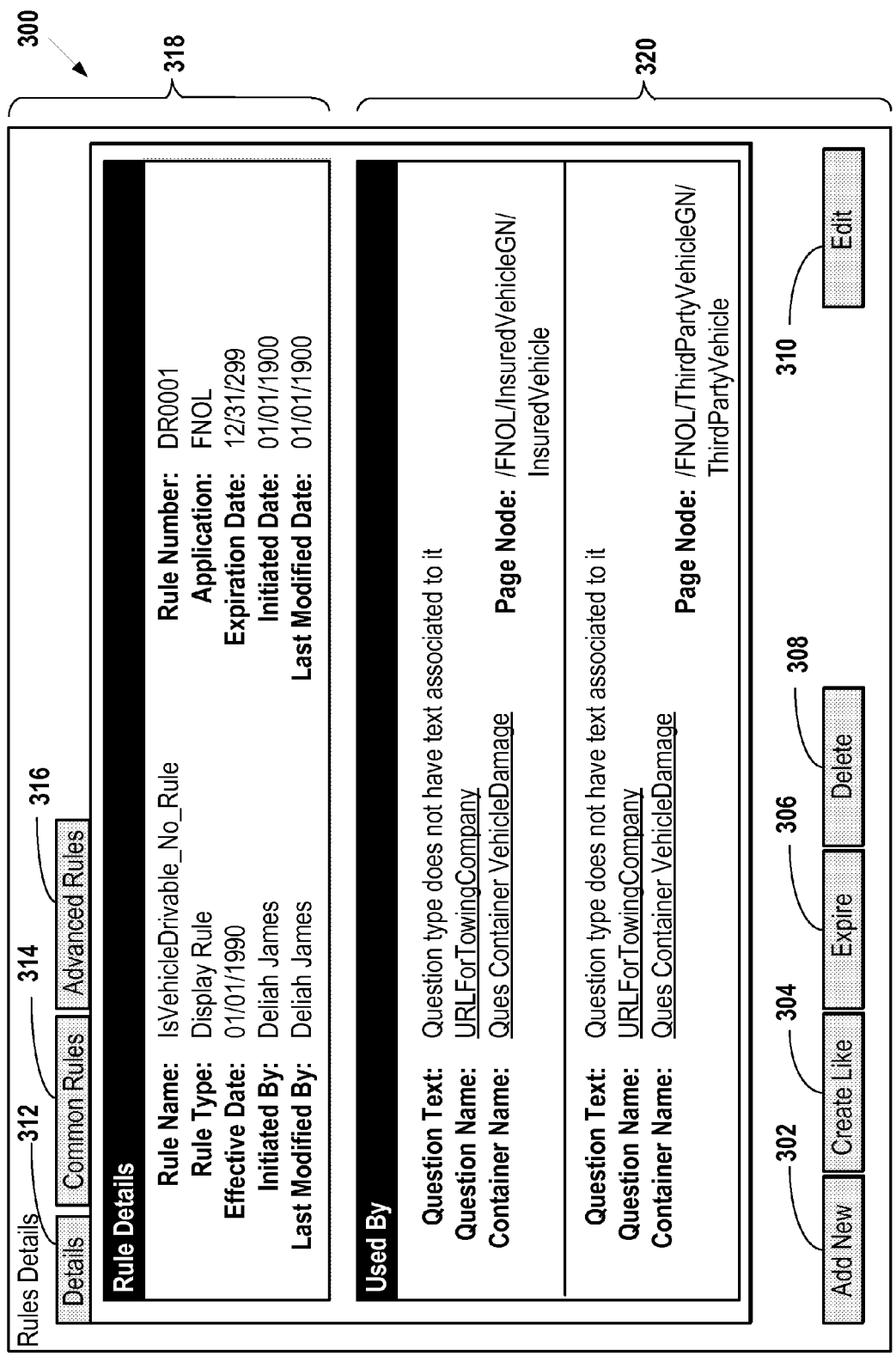
FIG. 3 shows one example of an evaluative expression communication interface implemented by the evaluative expression parameter module of FIG. 2.

The modules 212-220 may implement one or more evaluative expression communication interfaces for receiving rule parameters. In one implementation, the evaluative expression parameter module 212 implements one or more evaluative expression communication interfaces as graphical user interfaces displayable in a web browser or other computer display program. FIG. 3 shows one example of a display-detail-evaluative-expression communication interface 300 implemented by the evaluative expression parameter module of FIG. 2.

As shown in FIG. 3, the display-detail-evaluative-expression communication interface 300 displays the details regarding a rule. The display-detail-evaluative-expression communication interface 300 may display the details regarding any of the categories of rules, including display rules, navigation rules, and discrepancy rules.

The display-detail-evaluative-expression communication interface 300 may initially display a detail rule parameter interface. The detail rule parameter interface is operative to initially display interface selection controls 312-316. The interface selection controls 312-316 include a detail parameter selection control 312, a common rule selection control 314, and an advanced parameter selection control 316. The detail parameter interface is also operative to display a discrepancy message selection control (not shown) when a selected rule is a discrepancy rule.

Selecting one of the interface selection controls 312-316 causes the display of one of several different evaluative expression communication interfaces. For example, selecting the detail parameter selection control 312 communicates to the evaluative expression parameter module 212 to display the detail rule parameter interface. The detail rule parameter interface generally displays details about a selected rule and where the selected rule is used in an insurance application. As another example, selecting the common rule selection control 314 communicates to the common evaluative expression module 214 to display one or more common-parameter-evaluative-expression communication interfaces. As a further example, selecting the advanced parameter selection control 316 communicates to the advanced evaluative expression module 216 to display one or more advanced-parameter-evaluative-expression communication interfaces. Other communication interfaces are also displayable, including discrepancy-message-evaluative-expression communication interfaces. Hence, a user may switch between the common-parameter-evaluative-expression communication interfaces, advanced-parameter-evaluative-expression communication interfaces, and discrepancy-message-evaluative-expression communication interfaces using the interface selection controls 314-316.

The detail rule parameter interface also includes various display sections. In one implementation, the detail rule parameter interface includes a rule detail display section 318 and a location display section 320. The rule detail display section 318 screen displays various rule parameters about a selected rule. The rule parameters may define one or more properties about a selected rule, such as the name of the rule, the application to which the rule belongs, whether the rule is a display, navigation, or discrepancy rule, when the rule should go into effect, when the rule should be no longer used, the user who created the rule and when the rule was created. In one implementation, during operation, the rule generation system 102 automatically generates a rule identifier parameter value for the rule, and automatically determines the user who created the rule and when the rule was created.

Table 6 shows an example of rule parameters displayed in the display section 320 and their associated entries in the evaluative expression table 202. Table 6 lists the rule parameter, a brief description of the rule parameter, and the evaluative expression table entry from the evaluative expression table 202 associated with the rule parameter.

TABLE 6

| Rule Parameter Name | Brief Description | Evaluative Expression Entry |
|---|---|---|
| Rule Name | The rule name. Initial focus in Add New or Create Like mode. | M_RULE_NM |
| Rule Number | The rule identification number assigned by the insurance claim processing computer system. | C_RULE_NBR |
| Rule Type | The rule category associated with the rule. | C_RULE_NBR |
| Application | The name of the application that the rule is used in. | C_RULE_ASSOC_TYP |
| Effective Date | The calendar on which the rule becomes effective. Initial focus in Edit mode. | C_RULE_ASSOC_TYP |
| Expiration Date | The calendar date on which the rule expires. | D_EFFECTIVE |
| Initiated by | The name of the user who created the rule. | M_EXPIRATION |
| Initiated Date | The calendar date that the rule was initiated. | N_ORG_ENTITY_ID |
| Last Modified by | The name of the user that last modified the rule. | D_CREATE_TS |
| Last Modified date | The calendar date that the rule was last modified. | M_RULE_NM |

The location display section 320 of the detail rule parameter interface displays rule parameters that relate to where in the insurance claim processing computer system the rule is used. The rule parameters displayed in the location display section 320 may be based on the evaluative expression category associated with the rule. For example, a display rule may have a different set of rule parameters displayed in the location display section 320 than a navigation rule. Similarly, a navigation rule may have a different set of rule parameters displayed in the location display section 320 than a discrepancy rule. However, it is also possible that rules of different evaluative expression categories, such as display rules and navigation rules, share similar or identical rule parameters that are displayed in the location display section 320.

The location display section 320 may also include various links to parts of the insurance claim processing computer system where the rule is used. In one implementation, the links are implemented as hyperlinks. The links provided for the rule may vary depending on the category of the rule. For example, the location display section 320 may display one set of links for a display rule, another set of links for a navigation rule, and yet a further set of links for a discrepancy rule. As one example of links that are displayed, the location display section 320 may display links to each web page that is associated with a selected navigation rule. Alternatively, or in addition, the location display section 320 may display links for displaying windows that are associated with a selected navigation rule. As explained with reference to FIG. 8, as another example, where the selected rule is a discrepancy rule, the location display section 320 displays the process names that are associated with the discrepancy rule and further assists the user in associating a process to a discrepancy rule.

Table 7 shows an example of rule parameters displayable in the location display section 320. Table 7 lists the rule parameters, a brief description of the rule parameter, and the evaluative expression category associated with the rule parameter.

TABLE 7

| Rule Parameter Name | Brief Description | Evaluative Expression Category |
|---|---|---|
| Question Text | The text of the question that uses the rule as a display rule. | Display |
| Question Name | The Question XML Name used as a hyperlink to a question details web page for the listed question | Display |
| Container Name | The name of the container that holds the question in the same | Display |

TABLE 7-continued

| Rule Parameter Name | Brief Description | Evaluative Expression Category |
|---|---|---|
| | record. The container name links to a web page for customizing the container. | |
| Page Node | The XML path (page node name) of the web page on which the question appears. | Display |
| Page Name | A hyperlink displaying the page display literal for the page that the navigation rule is associated to. | Navigation |
| Navigation Rule True | Displays where to navigate to if a rule is true. | Navigation |
| Navigation Rule False | Displays where to navigate to if a rule is false. | Navigation |
| Process Name | The name of the process that will trigger the running a discrepancy when the process is completed. | Discrepancy |

The detail rule parameter interface also includes various controls 302-310. The controls 302-310 control the detail rule parameter interface and may be configured for creating, editing, and viewing rule parameter values of a selected rule. One or more controls 302-310 may also be operative to instruct the evaluative expression parameter module 212 to display additional or alternative evaluative expression communication interfaces including a new-rule-evaluative-expression communication interface, an edit-display-evaluative-expression communication interface, an edit navigation evaluative expression communication interface, an edit-discrepancy-evaluative-expression communication interface, or other interfaces. The display-detail-evaluative-expression communication interface 300 may be configured for a view mode, such as shown in FIG. 3. Other evaluative expression communication interfaces, such as the new-rule-evaluative-expression communication interface may be associated with an add mode. Examples of other modes include an edit mode or other modes. Additional controls may be displayed in the detail rule parameter interface based on the mode of the evaluative expression communication interface. For example, a reset control element (not shown in FIG. 3) may be displayed when an evaluative expression communication interface is displayed that is associated with an edit mode.

In addition, using the controls 302-310, a user may delete a rule, generate a new rule, generate a new rule using existing rule parameter values, expire a rule, etc. Any number of controls may be included in the display-detail-evaluative-expression communication interface 300 for modifying or manipulating rules. Table 8 lists an example of displayable controls in the detail rule parameter interface, a brief description of the controls, and the modes of the detail rule parameter interface associated with the controls.

The create-like control 304 is operative to instruct the evaluative expression parameter module 212 to start the process of creating a new rule having rule parameter values similar to an existing rule. In general, the create-like control 304 is used in conjunction with a previously selected pre-existing rule. For example, the pre-existing rule may be selected by a user using the detail rule parameter interface. In one implementation, selecting the create-like control 304 causes the evaluative expression parameter module 212 to communicate with the evaluative expression database 116 to retrieve rule parameter values from the entries of the evaluative expression tables 202-210 for the previously selected pre-existing rule. The evaluative parameter module 212 then copies each of the rule parameter values associated with the previously configured rule and stores the copied rule parameter values in the memory storage device 112. After copying each of the rule parameter values to the memory storage device 112, the evaluative parameter module 212 then retrieves each copied parameter value and populates the evaluative expression tables 202-210 with the copied rule parameter values. The evaluative parameter module 212 then displays the copied rule parameter values using the detail rule parameter interface. In one implementation, after selecting the create-like control 304, the detail rule parameter interface may prompt the user to provide a different rule parameter name value from the rule parameter value of the previously selected pre-existing rule.

TABLE 8

| Control Name | Brief Description | Mode |
| --- | --- | --- |
| Add New | Selecting this control launches a new instance of the detail rule parameter interface in add mode. | View |
| Create Like | Selecting this control while viewing a preconfigured rule launches a new instance of the detail rule parameter interface in add mode and uses the current rules criteria as a starting point to create a new rule. | View |
| Expire | Sets the rule's expiration to the current date. | View |
| Delete | Deletes an inactive unassociated rule from the evaluative expression tables. | View |
| Reset | Resets the form to its last saved state. Message box requests confirmation of action if changes had been made. Displayed in edit mode. | Add, Edit |
| Back | Returns the system to previously viewed page. Message box requests confirmation of action if changes had been made. Displayed in edit mode. | Add |
| Save | Saves the data to the evaluative expression database. Default control in Edit mode. Validates syntax of advanced rules, if present. | Add, Edit |
| Edit | Enables the user to edit an existing rule. Default button in view mode | View |

FIG. 3 also shows that the display-detail-evaluative-expression communication interface 300 is associated with a view mode. In the view mode, the detail rule parameter interface of the display-detail-evaluative-expression communication interface 300 displays the controls of an add control 302, a create-like control 304, an expire control 306, a delete control 308, and an edit control 310. In alternative implementations, the detail rule parameter interface may display other controls.

The add control 302 is operative to instruct the evaluative expression parameter module 212 to start the process of creating a new rule. The evaluative expression parameter module 212 then displays a new-rule-evaluative-expression communication interface associated with an add mode. The new-rule-evaluative-expression communication interface is further explained with reference to FIG. 6.

The expire control 306 is operative to instruct the evaluative expression parameter module 212 to expire a rule. In one implementation of expiring a rule, the evaluative expression parameter module 212 sets the expiration date of the rule to the current calendar date. Alternatively, a user may provide an expiration date parameter value, which would instruct the evaluative expression parameter module 212 to expire the rule on the calendar date provided by the expiration date parameter value. The evaluative expression parameter module 212 may set the expiration date by communicating with the evaluative expression database 112 and modifying one or more of the evaluative expression tables 202-210.

In some implementations of the rule generation system 102, the evaluative expression parameter module 212 may prevent or prohibit the expiration of rules. For example, the evaluative expression parameter module 212 may prohibit the expiration of a rule where the rule is associated with a container, question, or other element of the insurance claim processing computer system. In prohibiting the expiration of a rule where the rule is associated with a container, the evaluative expression parameter module 212 may examine the associated M_CONTAINER_NM entry of the rule to determine whether the associated M_CONTAINER_NM entry is populated with a rule container parameter value. Where the associated M_CONTAINER_NM entry is populated with a rule container parameter value, the evaluative expression parameter module 212 may prohibit the expiration of the rule. In prohibiting the expiration of a rule where the rule is associated with a question, the evaluative expression parameter module 212 may examine the associated N_QUESTION_ID entry to determine whether the associated N_QUESTION_ID entry is populated with a question identifier parameter value. Where the associated N_QUESTION_ID entry is populated with a question identifier value, the evaluative expression parameter module 212 may prohibit the expiration of the rule.

The delete control 308 is operative to instruct the evaluative expression parameter module 212 to delete a rule. Depending upon the configuration of the insurance claim processing computer system, deleting a rule may be a logical deletion or a physical deletion. For example, a logical deletion includes marking one or more entries in the evaluative expression tables 202-210 that a rule has been deleted. A physical deletion may include removing one or more rows from the evaluative expression tables 202-210 associated with the rule. In a logical deletion, the evaluative expression parameter module 212 may populate one or more entries of the tables 202-210 with a value to indicate that the rule has been deleted. For example, in logically deleting a rule, the evaluative expression parameter module 212 may populate the C_RCD_DEL entry of the tables 202-210. Alternatively, the evaluative expression parameter module 212 may communicate a delete command to the insurance claim processing computer system, which may then perform the logical deletion of the selected rule. In a physical deletion, the evaluative expression parameter module 212 may communicate a delete command to the insurance claim processing computer system, which may then perform the physical deletion of the selected rule.

The rule generation system 102 may also have safeguards in place relating to the deletion of a rule. For example, the rule generation system 102 may prevent or prohibit the deletion of a rule where the rule is an active rule; that is, the rule generation system 102 may prevent the deletion of a rule if the rule is in use by the insurance claim processing computer system or if the rule is still associated with containers, questions, or other entities. In prohibiting the deletion of a rule where the rule is associated with a container, the evaluative expression parameter module 212 may examine the associated M_CONTAINER_NM entry of the rule to determine whether the associated M_CONTAINER_NM entry is populated with a rule container parameter value. Where the associated M_CONTAINER_NM entry is populated with a rule container parameter value, the evaluative expression parameter module 212 may prohibit the deletion of the rule. In prohibiting the deletion of a rule where the rule is associated with a question, the evaluative expression parameter module 212 may examine the associated N_QUESTION_ID entry to determine whether the associated N_QUESTION_ID entry is populated with a question identifier parameter value. Where the associated N_QUESTION_ID entry is populated with a question identifier value, the evaluative expression parameter module 212 may prohibit the deletion of the rule.

FIGS. 4-5 show other examples of evaluative expression communication interfaces implemented by the evaluative expression parameter module 212 when viewing different categories of rules. FIG. 4 shows an example of a navigation-detail-evaluative-expression communication interface 400 that displays the details of a navigation rule using a detail rule parameter interface. FIG. 5 shows an example of a discrepancy-detail-evaluative-expression communication interface 500 that displays the details of a discrepancy rule using a detail rule parameter interface. As shown in FIG. 4 and in FIG. 5, the evaluative expression parameter module 212 displays different rule parameters depending on the category of the selected rule.

FIG. 6 shows an example of a new-rule-evaluative-expression communication interface 600 implemented by the evaluative expression parameter module 212 for adding a new rule. In one implementation, during operation, a user provides various rule parameter values including a rule name parameter value, a rule type parameter value, an application parameter value, an activate date parameter value, an expiration data parameter value, and other values. In providing a rule name parameter value, the rule name parameter value may be an XML name. The evaluative expression parameter module 212 may perform one or more checks to determine whether a valid name was provided. For example, the evaluative expression parameter module 212 may use pattern-matching, regular expressions, a previously configured syntax, or other techniques to determine whether a valid name was provided for the rule name parameter value.

Referring to FIGS. 2, 3, and 6, the rule type parameter value may affect the display of the location display section 320 and the advanced evaluative expression communication interface of the advanced evaluative expression module 216.

The evaluative expression parameter module 212 may have one or more preconfigured safeguards for the various rule parameters. The preconfigured safeguards may be stored as part of the executable instruction sets 114, as part of the programming for the evaluative expression parameter module 212, or stored in the memory storage device 112 and retrievable by the evaluative expression parameter module 212. For example, when a new rule is added, the effective data parameter value for the rule may have a default calendar date of the following calendar date. Similarly, the expiration date may have a default date of a future calendar date. When adding a rule, the expiration date may be set to system default expiration date. In addition, during operation, the evaluative expression parameter module 212 may determine whether the expiration date parameter value is a calendar date prior to the current date. Similarly, the evaluative expression parameter module 212 may determine whether the effective date parameter value is a calendar date that occurs after the current date.

Some or all of the rule parameter values may be provided by the rule generation system 102 or the insurance claim processing computer system. For example, the rule generation system 102 may provide the "initiated by" parameter value and the initiated date parameter value. The "initiated by" parameter value may by the username or some other identifier of the current user adding the rule. The initiated date parameter value may be the date on which the rule was added or created.

Figure 8:
FIG. 8 shows another example of an evaluative expression communication interface implemented by the evaluative expression parameter module of FIG. 2 for editing the details of a discrepancy rule.

FIGS. 7-8 show examples of evaluative expression communication interfaces implemented by the evaluative expression parameter module 212 for editing different categories of rules. FIG. 7 shows an example of an edit-display-evaluative-expression communication interface 700 for editing the properties of a display rule. In one implementation, the properties that are editable for a display rule include the effective date parameter value and the expiration date parameter value. However, in other implementations, alternative or additional parameters are also editable.

Although not shown, an edit navigation evaluative expression communication interface may be configured similarly to an edit-display-evaluative-expression communication interface. In one implementation, the properties that are editable for a navigation rule include an effective date parameter value and an expiration date parameter value. However, in other implementations, alternative or additional parameters are also editable.

FIG. 8 shows an example of an edit-discrepancy-evaluative-expression communication interface 800 implemented by the evaluative expression parameter module 212 of FIG. 2 for editing the details of a discrepancy rule. In one implementation, the editable rule parameters for a discrepancy rule include the effective date parameter, the expiration date parameter, and the process name rule parameter. In other implementations, alternative or additional rule parameters are also editable.

Common Rules

Figure 9:
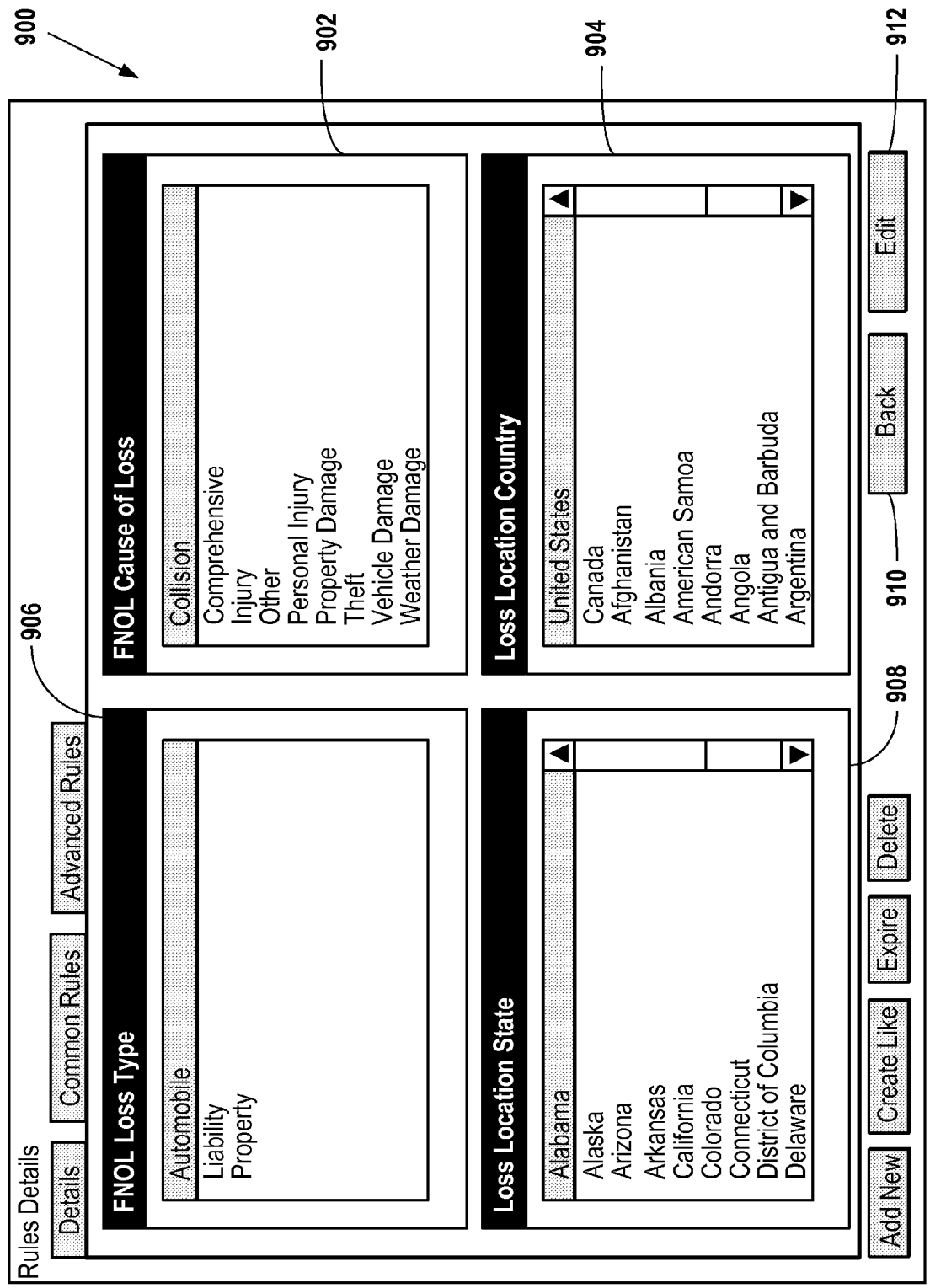
FIG. 9 shows an example of an evaluative expression communication interface implemented by the common evaluative expression module of FIG. 2 for displaying common rules.

Briefly referring back to FIG. 3, a user may view the common rules associated with a selected rule or may add common rules to a newly added rule using the common rule selection control 314. FIG. 9 shows an example of a display-common-evaluative-expression communication interface 900 implemented by the common evaluative expression module 214 of FIG. 2 for displaying common rules as common evaluative expression parameters. The display-common-evaluative-expression communication interface 900 displays various common rules 902-908 and evaluative expression communication interface controls 910-912. The evaluative expression communication interface controls include a back control 910 and an edit control 912. In this example, the common rules include an FNOL Cause of Loss common rule 902, a Loss Location country common rule 904, an FNOL Loss Type common rule 906, and a Loss Location state 908. In other examples, the common rules may include rules relating to countries, states, the type of accident, the cause of an accident, or other common rules.

Each of the common rules 902-908 includes common rule parameter values. In the example of FIG. 9, the currently selected rule from FIG. 3 is associated with the four common rules 902-908 and one or more of their associated common rule parameter values. The common evaluative expression module 214 may read from one or more of the evaluative expression tables 202-210 to determine which common rules to display. For example, the common evaluative expression module 214 may retrieve the parameter value stored in the T_RULE entry of the evaluative expression table 202 or the T_COMMON_RULE entry of the evaluative expression support table 204.

Figure 10:
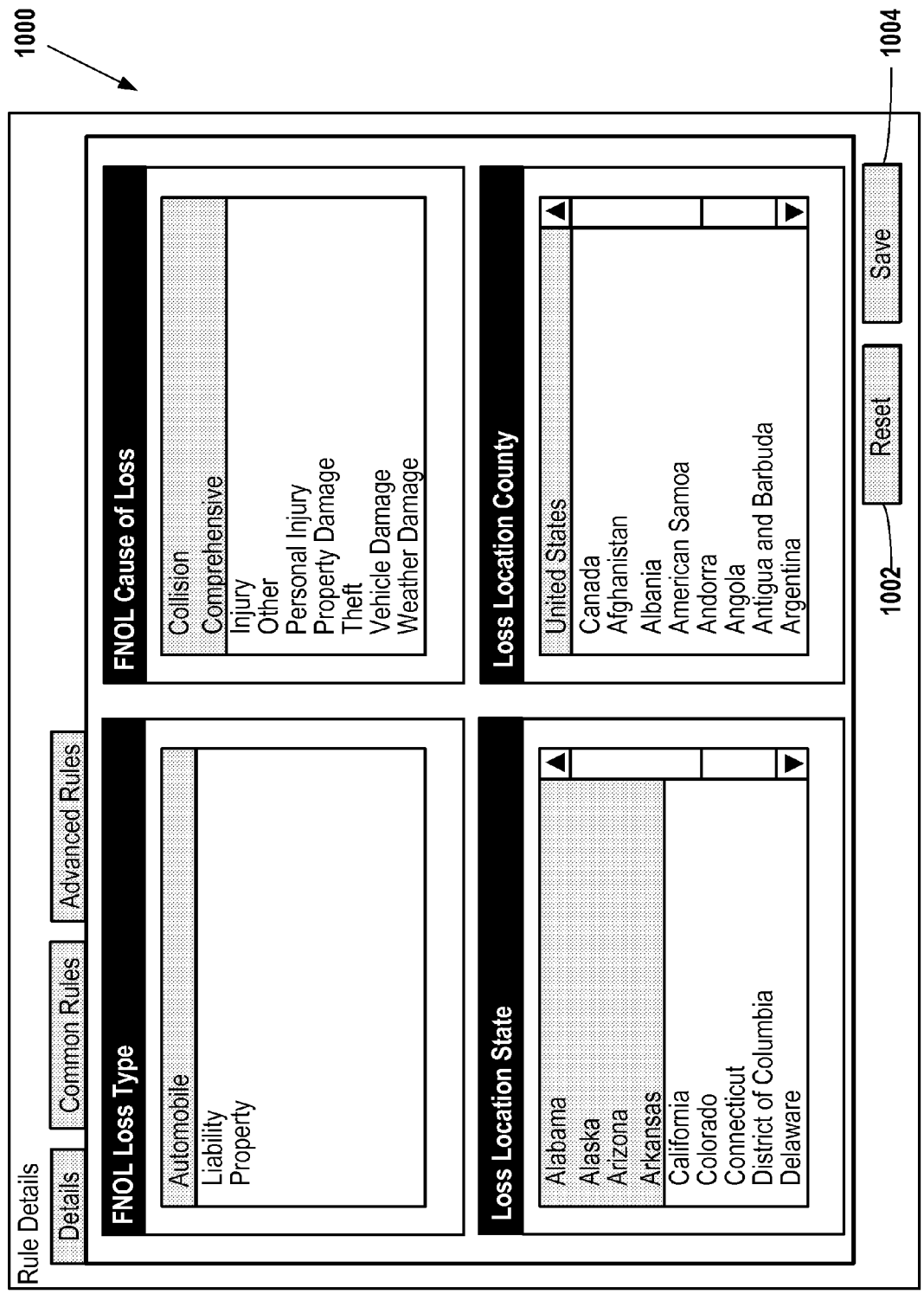
FIG. 10 shows another example of an evaluative expression communication interface implemented by the common evaluative expression module of FIG. 2 for editing common rules.

The evaluative expression module 214 is also operative to implement an add-common-evaluative-expression communication interface for adding common rules to a newly created rule or a previously configured rule. FIG. 10 shows an example of an add-common-evaluative-expression communication interface 1000 for adding common rules and associated common rule parameters to a newly created rule or a previously configured rule. The add-common-evaluative-expression communication interface 1000 may include any number of controls, including a reset control 1002 and a save control 1004. In one implementation, the common rules displayed on the evaluative expression communication interface 1000 are based on the insurance application associated with the rule and the evaluative expression tables 202-210.

Using the evaluative expression communication interface 1000, a user may select one or more parameter values from a common rule for associating with the selected rule. Where the user selects multiple parameter values from a common rule, the evaluative expression module 214 logically couples the common rule parameter values together, such as with a Boolean "OR" statement, and groups the common rule parameter values within parenthesis to create an evaluative expression string. The evaluative expression string may then be used as an XPath query or other query. An example of creating an evaluative expression string using a logical OR of multiple common rule parameter values is:
(\\LossLocationState='Alabama' OR
\\LossLocationState='Alaska' OR
\\LossLocationState='Arizona' OR
\\LossLocationState='Arkansas').

In addition, a user may select more than one common rule for associating with the selected rule. Where the user selects multiple common rules, the evaluative expression module 214 logically couples the common rule parameter values for the various common rules, such as with a Boolean "AND" statement, to create an evaluative expression string. The evaluative expression string may then be used in a predetermined query format, such as an XPath query or some other query format. An example of creating an evaluative expression string using a logical AND of multiple common rule parameter values is \\FNOLLossType='Automobile' AND (\\FNOLCauseOfLoss='Collision' OR \\FNOLCauseOfLoss='Comprehensive') AND (\\LossLocationState='Alabama' OR \\LossLocationState='Alaska' OR \\LossLocationState='Arizona' OR \\LossLocationState='Arkansas') AND \\LossLocationCountry='United States'. Other combinations of logical operators are also possible.

During operation, after the user has selected the common rules and common rule parameter values, the user may then associate the common rules and common rule parameter values with the selected rule. For example, by selecting the save control 1004, the user indicates to the common evaluative expression module 214 to save the common rules associated with the selected rule. In one implementation, the common evaluative expression module 214 communicates the parameters and parameter values selected by the user to the evaluative expression generator module 220. The evaluative expression generator module 220 may then communicate the parameter values selected by the user to the evaluative expression tables 202-210. For example, the evaluative expression generator module 220 may populate the T_RULE entry of the evaluative expression support table 204 with the parameter values received from the common evaluative expression module 214. Alternatively, or in addition, the evaluative expression generator module 220 may append the selected parameter values to a preexisting parameter value stored by the T_RULE entry of the evaluative expression support table 204. In yet a further addition or alternative, the evaluative expression generator module 220 populates or appends values to other entries, such as the T_COMMON_RULE entry.

Advanced Rules (Navigation and Display Rules)

In addition to associating common rules, a user may also view or associate advanced rule parameters to a previously configured rule or a newly created rule. Using the advanced parameter selection control 316 (FIG. 3), a user may view or edit the advanced rule parameters for a rule, including display rules, navigation rules, and discrepancy rules. However, the rule generation system 102 may use the access level of a user to restrict or prevent the user from manipulating the advanced rule parameters for every category of a rule. For example, the rule generation system 102 may be operative to permit an advanced user to edit the advanced rule parameters for each of the rule categories. As another example, the rule generation system 102 may be operative to permit basic users to only edit the advanced rule parameters for display rules. Hence, using the access level of a user, the rule generation system 102 may be operative to grant different levels of access to the advanced rule parameters for the various rule categories.

Figure 11:
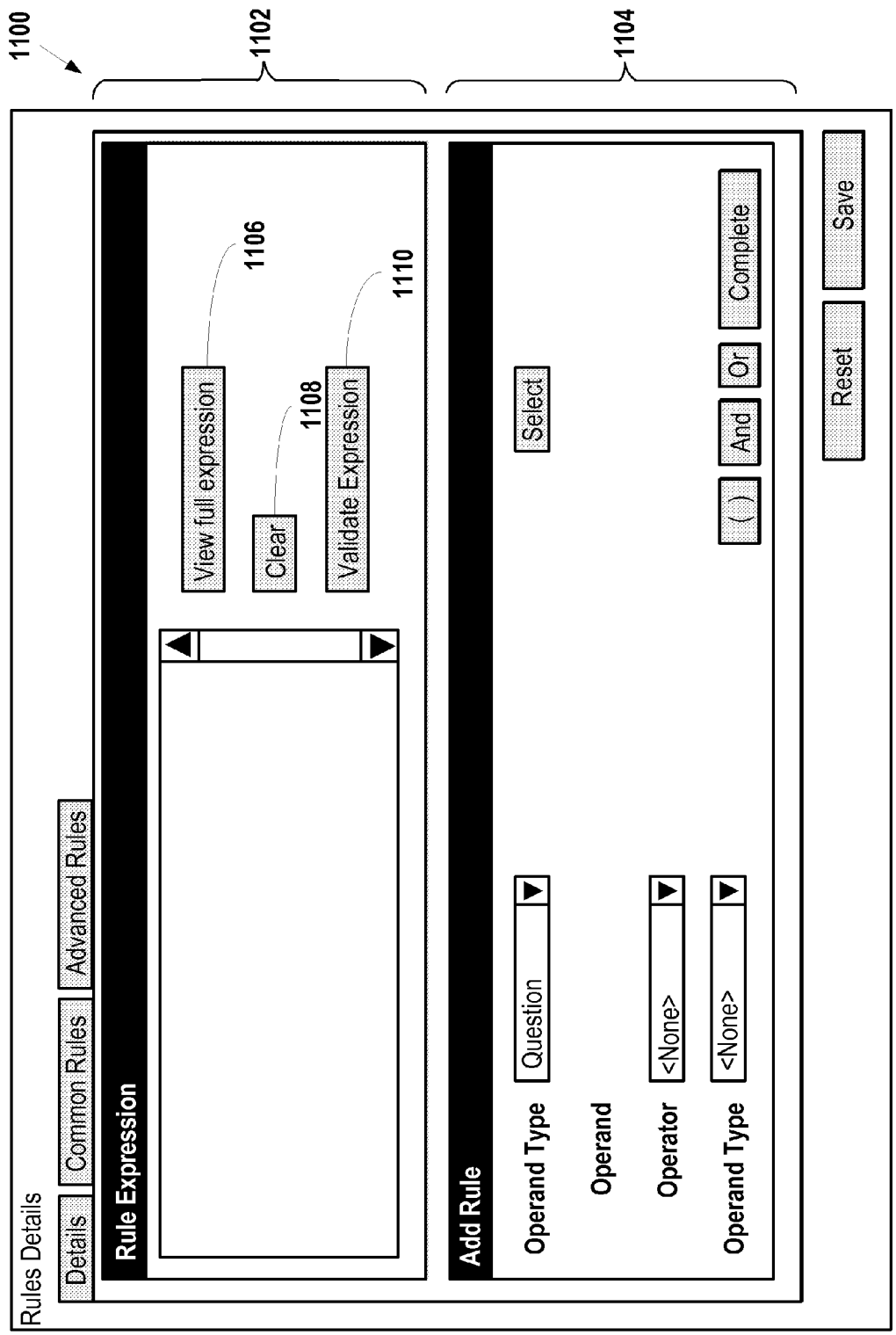

FIGS. 11-15 show various examples of building an advanced rule for a display rule using an advanced evaluation expression communication interface 1100 implemented by the advanced evaluative expression module 216 of FIG. 2. FIG. 11 shows an advanced evaluative expression communication interface 1100 for the display rule that includes a rule expression display section 1102 and an add rule display section 1104. The rule expression display section 1102 is operative to display the advanced portion of a rule and may receive text input from a user. The add rule display section 1104 is operative to assist the user in building the advanced portion of the rule. The add rule display section 1104 may be in communication with the rule expression display section 1102, such that selections made in the add rule display section 1104 appear in the rule expression display section 1102.

The rule expression display section 1102 includes various controls for manipulating and verifying a rule. In one implementation, the rule expression display section 1102 includes a view full expression control 1106, a clear control 1108, and a validate expression control 1110. The view full expression control 1106 is operative to instruct the advanced evaluative expression module 216 to display the entire rule, including the common portion and the advanced portion. In displaying the entire rule, the advanced evaluative expression module 216 to validate the advanced rule displayed in the rule expression display section 1102. The evaluative expression module 216 may validate the displayed advanced rule by determining whether the syntax of the advanced rule is correct or whether the advanced rule conforms to expected rules of a previously configured grammar. In one implementation, the syntax of the advanced rule may be validated by comparing the advanced rule, such as an XPath query, with a previously configured document, such as an XML document. Where the advanced rule does not conform to the XML document, the evaluative expression module 216 may display an error stating that the syntax is incorrect and that the advanced rule is invalid.

The add rule display section 1104 assists the user in building an advanced rule. The illustrated example of the add rule display section 1104 includes various expression controls, including parenthesis controls, a logical AND control, a logical OR control, a COMPLETE control. In other examples, any other logic may be selected or otherwise implemented with the add rule display section 1104. The logical AND control, the logical OR control, and the COMPLETE control are operative to instruct the advanced evaluative expression module 216 to validate the criteria selected from the add rule display section 1104, manipulate the selected criteria into a previously configured syntax, such as XPath, and append the criteria to the existing rule displayed in the view expression display section 1102. During operation in this example, selection of the AND control causes the word AND to append to the end of the rule, the OR control causes the word OR to append to the end of the rule, and the COMPLETE control does not append any keywords to the end of the rule. Table 9 lists the controls for the add rule display section 1004 and provides a brief description of each.

TABLE 9

| Control Name | Brief Description |
|---|---|
| ( | Appends a "(" to the rule expression. |
| ) | Appends a ")" to the rule expression. |
| And | Validates and Creates the expression from the entered data in the Add Rules section, appends an "And" keyword and adds it to the Rule Expression text box. |
| Or | Validates and Creates the expression from the entered data in the Add Rules section, appends an "Or" keyword and adds it to the Rule Expression text box. |
| Complete | Validates and Creates the expression from the entered data in the Add Rules section and appends it to the Rule Expression text box. In one implementation, the Complete control is configured to determine whether any open parenthesis or brackets remain in the rule and to close those open parenthesis or brackets. |

216 may communicate with the evaluative expression tables 202-210 to retrieve one or more parameter values from the entries of the evaluative expression tables 202-210, such as the T_RULE entry, the T_COMMON_RULE entry, or the T_ADVANCED_RULE entry. The clear control 1108 is operative to instruct the advanced evaluative expression module 216 to remove all of the advanced rules associated with the selected rule. The validate expression control 1110 is operative to instruct the advanced evaluative expression module The add rule display section 1104 may also display one or more operators and operands for adding to the advanced portion of the rule. The displayed operators and operands may vary depending on the selected rule category. For example, a navigation rule or a display rule may have different operators and operands than a discrepancy rule. Table 10 lists an example of various display operators and operands, a brief description of each, and the category associated with the operator or operand.

TABLE 10

| Control Name | Brief Description | Rule Category |
|---|---|---|
| Starting Page Node | Allows the user to select the page display name to be used as the starting point when entering a Node Evaluation Discrepancy Report Rule. | Discrepancy |

TABLE 10-continued

| Control Name | Brief Description | Rule Category |
| --- | --- | --- |
| Add | Adds the selected Starting Page Node to the Rule Expression textbox when entering a Node Evaluation Discrepancy Report Rule. | Discrepancy |
| Operand Type (1) | Allows the user to select what type of operand is required to create the rule evaluation. | Display, Navigation, Discrepancy |
| Operand (1) | Displays the Question Text when a user has selected a question type operand or displays a dropdown of the page node names when the user selects a node type operand. | Display, Navigation, Discrepancy |
| Select (Operand 1) | Allows the user to search for a question. | Display, Navigation, Discrepancy |
| Operand 1 (Combobox) | A combobox displaying all selectable nodes in the node count or node attribute evaluation. | Display, Navigation, Discrepancy |
| Evaluate all instances of a question. | When checked, the system evaluates all instances of a question instead of a specific instance. | Display, Navigation, Discrepancy |
| Operator | Allows the user to select the logical operator for the rule. | Display, Navigation, Discrepancy |
| Operand Type (2) | Provides the user with choice of Question or Value. | Display, Navigation, Discrepancy |
| Operand (2) | If the user has selected question as the second operand the Operand (2) display the Question Text. | Display, Navigation, Discrepancy |
| Select (Operand 2) | Enables the user to search for a question for the second operand. | Display, Navigation, Discrepancy |
| Value | Provides input for user to enter a value for the right hand side of the operator. | Display, Navigation, Discrepancy |

The advanced evaluative expression module 216 may implement various safeguards for creating an advanced rule for a display rule or a navigation rule. The preconfigured safeguards may be stored as part of the executable instruction sets 114, as part of the programming for the advanced evaluative expression module 216, or stored in the memory storage device 112 and retrievable by the advanced evaluative expression module 216. For example, the Operand Type (1) parameter may be pre-assigned a value, such as "Question," when the selected rule is a display rule or a navigation rule. When creating the advanced portion of a navigation rule or a display rule, the advanced evaluative expression module 216 may further use absolute pathing to add the selected question to the advanced portion of the rule. In other configurations, the advanced evaluative expression module 216 may use relative pathing to add the selected question to the advanced portion of the rule. In general, absolute pathing is evaluating a rule starting with the highest node of the path and evaluating each node that matches the path. In contrast, relative pathing generally refers to evaluating a rule starting with a starting page node. With relative pathing, the rule generation system 102 starts its evaluation from the starting page node and evaluates inwards instead of evaluating the entire path.

When the parameter value of the Operand Type (1) parameter is "Question," the advanced evaluative expression module 216 may require that the user select a parameter value for the Operand Type (2) parameter. For example, the advanced evaluative expression module 216 may maintain an association as part of the executable instruction sets 114 that where the Operand Type (1) parameter value is "Question," the Operand Type (2) parameter should have a parameter value. Examples of parameter values for the Operand Type (2) parameter include "Value" and "Question." Other parameter values are also possible.

The advanced evaluative expression module 216 may also have safeguards relating to the Operator parameter. For example, the advanced evaluative expression module 216 may determine whether the displayed operator choices are consistent with the type of evaluation. Where the user has selected numeric comparison, the advanced evaluative expression module 216 may determine that the valid operators are "+," "−," "=," "<=," ">=," or "< >." Where the user has selected a string comparison or a code value, the advanced evaluative expression module 216 may determine that the valid operators are "< >" and "=." The advanced evaluative expression module 216 may determine that other valid operators are also possible.

Where the Operand Type (1) parameter value is "Question" and the Operand Type (2) parameter value is selected as "Value," the advanced evaluative expression module 216 may prompt the user to provide a numerical value for the Operand (2) parameter value. In addition, when the Operand Type (2) parameter value is selected as "Value," the available input for the parameter value matches the associated datatype of the question. The advanced evaluative expression module 216 may communicate with the insurance claim processing computer system to determine the datatype of the question. The datatype of a question may be any datatype including, but not limited to, String, integer, Boolean, or other datatype. As one example, where the selected question datatype is an integer, then a textbox that only accepts integers is displayed to the user. As another example, where the selected question datatype is a code/decode value, then a drop-down box displaying the available code/decode values is displayed to the user. Other values for the Operand Type (2) parameter are also possible. In addition, where the user selects "Question" as the parameter value for the Operand Type (2) parameter, the user may search for a question to be used as the Operand (2) parameter value. The rule generation system 102 may then perform a question value to question value comparison.

Figure 12:
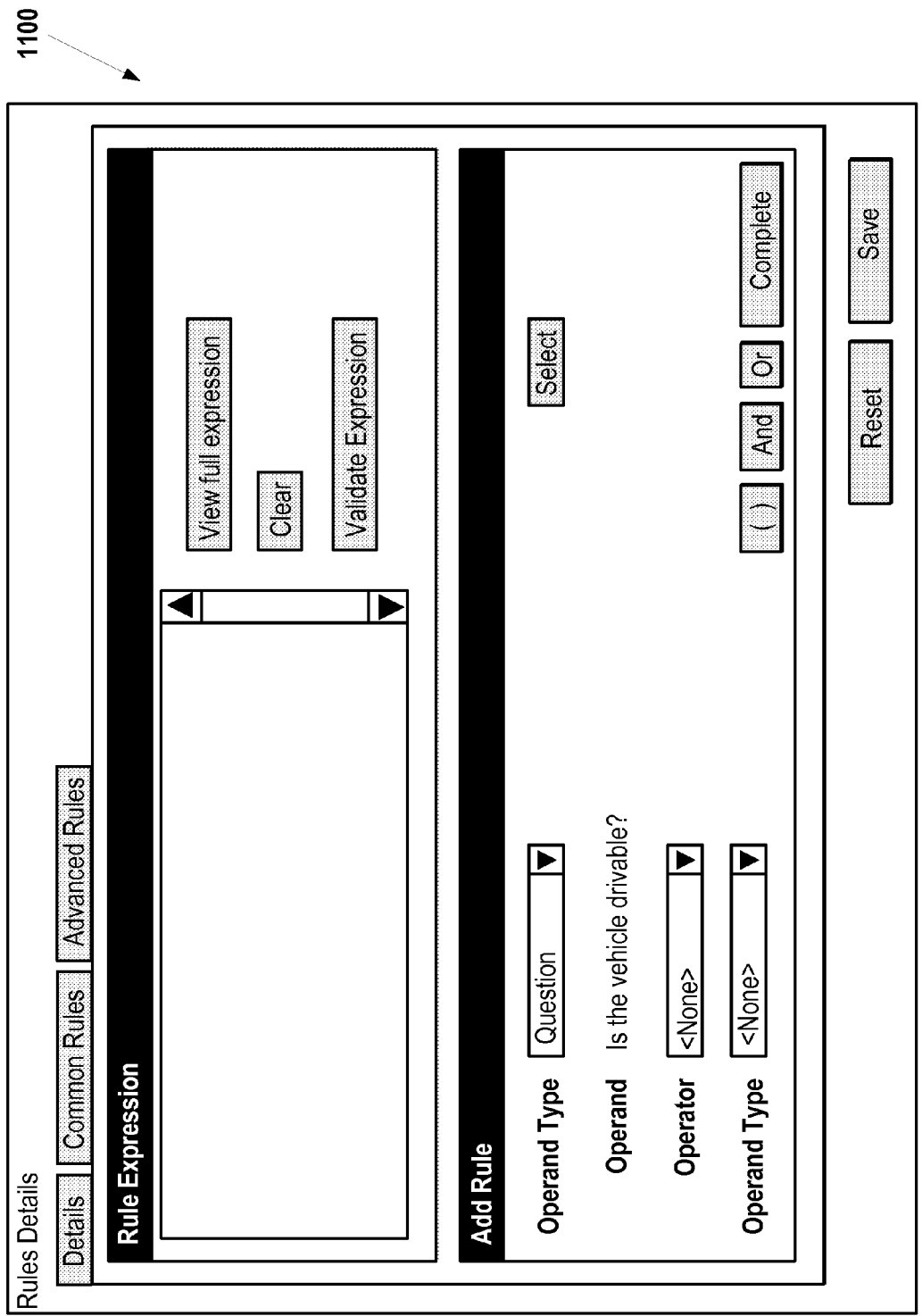
Figure 14:
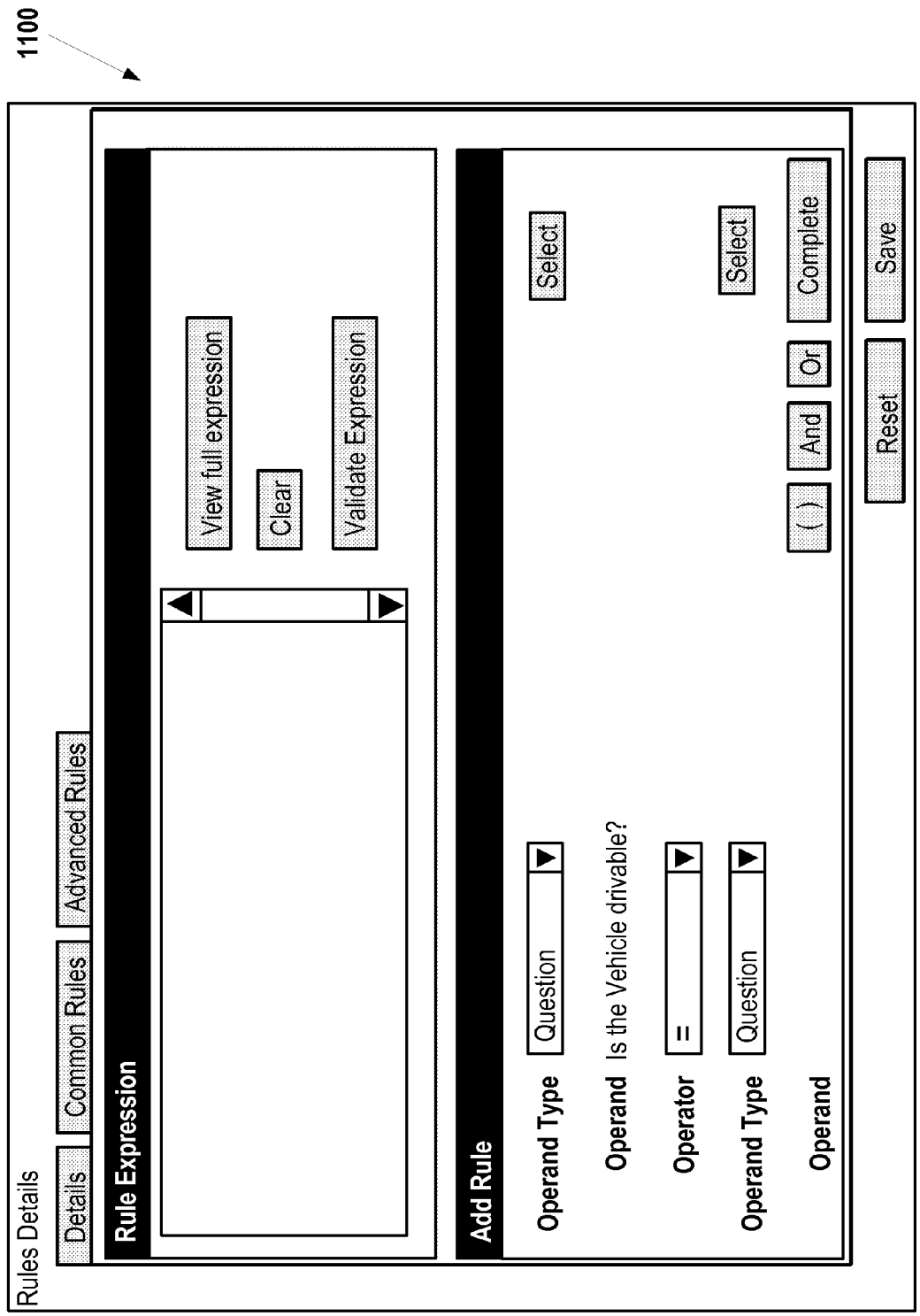
Figure 15:
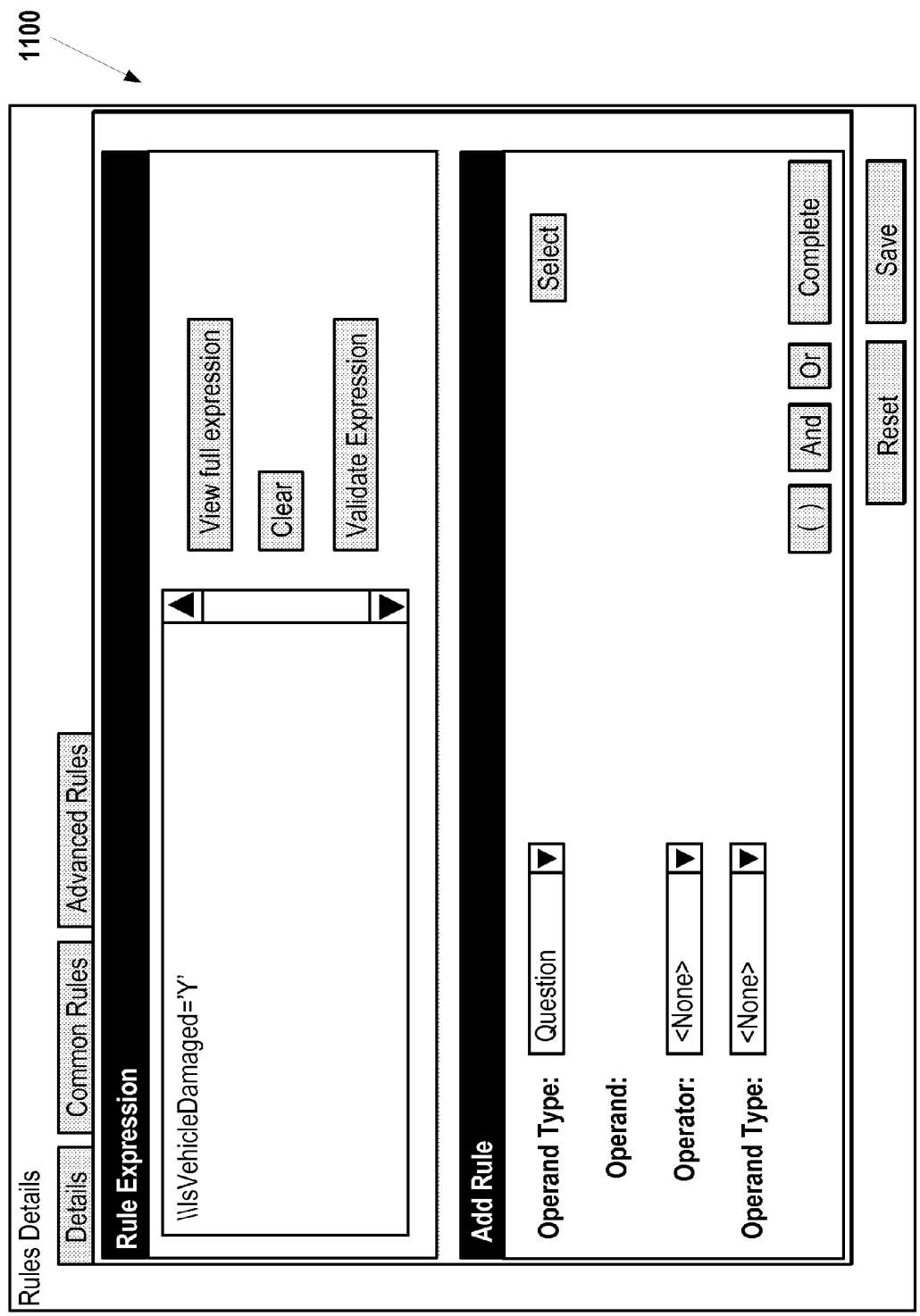

FIGS. 11-15 show an example of selecting advanced rule parameters for a display rule to aid the reader. FIG. 11 shows that no operators, operands, or values have been selected for the advanced portion of the display rule. FIG. 12 shows that the parameter value for the Operand Type (1) parameter is "Question" and that the parameter value for the Operand (1) parameter is "Is the vehicle drivable?" FIG. 13 shows that the parameter value for the Operator parameter is "=" and that the parameter value for the Operand Type (2) parameter is "Value." FIG. 14 shows an example of selecting "Question"

for the parameter value of the Operand Type (2) parameter. Finally, FIG. 15 shows the advanced portion of the rule in the rule expression display section 1102 using the parameter values from FIGS. 12-13.

Advanced Rules (Discrepancy Rules)

FIG. 16 shows an example of an edit-discrepancy-evaluative-expression communication interface 1600 implemented by the evaluative expression parameter module of FIG. 2. The edit-discrepancy-evaluative-expression communication interface 1600 is associated with an edit mode and displays a detail rule parameter interface for configuring the rule parameters of a node discrepancy report rule. After configuring the rule parameters of a node discrepancy report rule, a user may then configure the common rule parameters, or may proceed to the advanced rule parameters. For purposes of brevity, the details regarding the common rule parameters is hereby omitted, as the common rule parameters for a discrepancy rule may be similar or identical to the common rule parameters for a navigation or display rule.

However, a discrepancy rule may have a different set of advanced rule parameters compared with a navigation rule or a display rule. FIGS. 17-23 show an example of building an advanced rule portion of a discrepancy rule using an advanced evaluative expression communication interface 1100 implemented by the advanced evaluative expression module of FIG. 2. For the example shown in FIG. 17-23, the discrepancy rule is a node discrepancy report rule. As earlier discussed, a node discrepancy report rule is a rule that determines whether node discrepancies exist in the insurance claim processing computer system.

Figure 17:
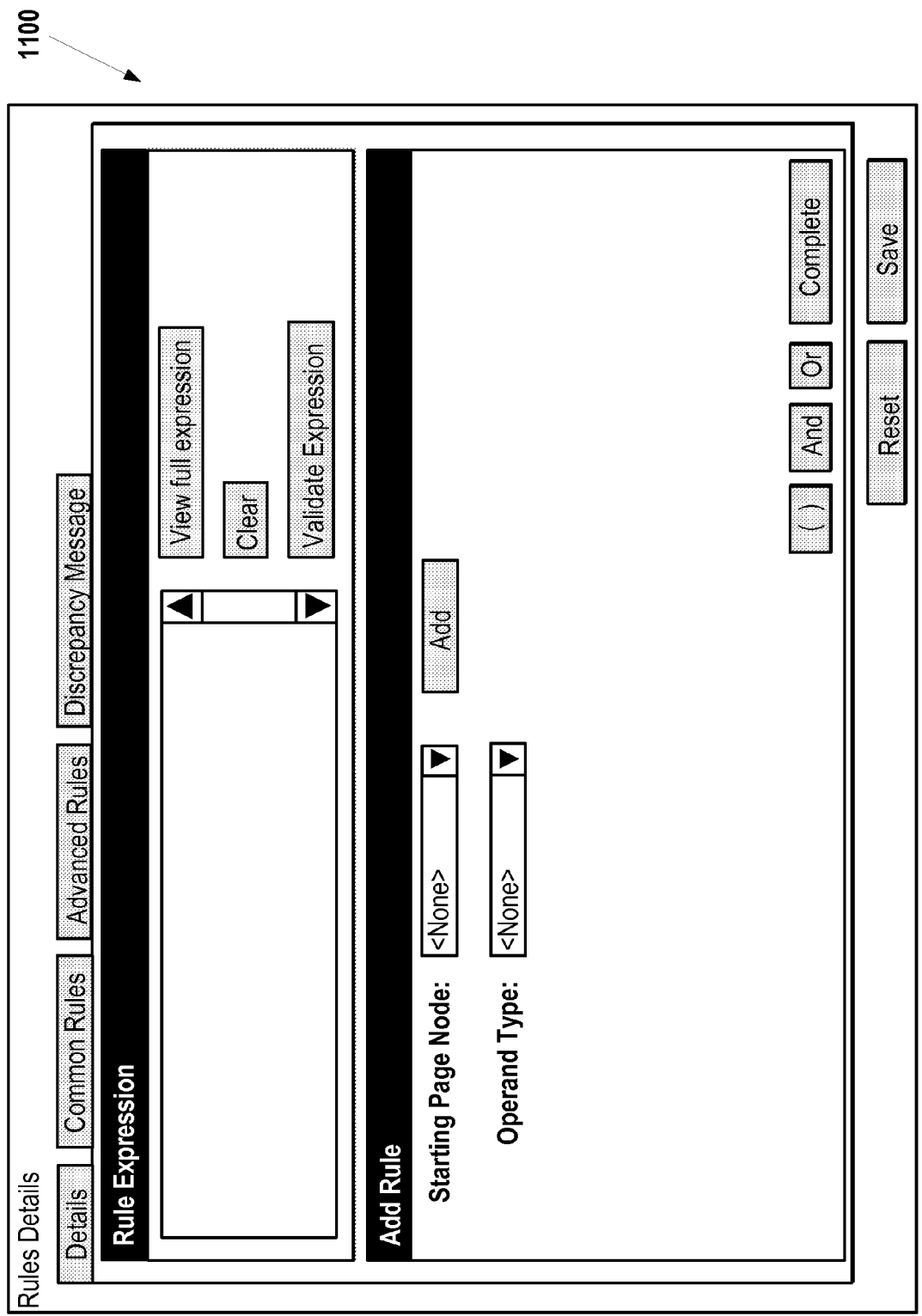

FIG. 17 shows the advanced evaluative expression communication interface 1100 where no operands or operators have been selected for building a discrepancy rule. In particular the advanced evaluative expression communication interface 1100 is an example of configuring the advanced evaluative expression communication interface 1100 for a node result discrepancy rule. However, other configurations of the advanced evaluative expression communication interface 1100 are also possible.

Initially, when a user creates a node result discrepancy rule, the user is given the option to select a starting page node. As shown in FIG. 17, the advanced evaluative expression communication interface 1100 initially starts with a starting page node parameter and an Operand Type (1) parameter. Selecting the add control causes the advanced evaluative expression parameter module 216 to begin the evaluation of the advanced portion of the rule.

In contrast to a navigation rule or a display rule, a discrepancy rule is configurable with different operands from the Operand Type (1) parameter. Table 11 lists the examples of various parameter values for the Operand Type (1) parameter for a discrepancy rule. However, the parameter values for the Operand Type (1) may include more than or less than the parameter values shown in Table 11.

TABLE 11

| Parameter Value | Brief Description |
| --- | --- |
| Question | The Question operand evaluates a questions value to either the value for that question as previously answered or the value of another question. Comparing question to question may be used when the questions are of similar data type. Example: //WasAnyonesvehicleDamaged='Y' |

TABLE 11-continued

| Parameter Value | Brief Description |
| --- | --- |
| Question Answer Count | The Question Answer Count operand evaluates the number of times a question was answered with a specific value. Example: Count(//IsIndivInjured[.='Y'])=0) |
| Question Count | The Question Count operand evaluates the number of times a question was presented during a conversation. Example: Count(//KeyFacts/WhatTypeofAccident)=0 |
| Node Attribute | The Node Attribute operand evaluates the value of a specific attribute for a node in XML. Example: ./DamageDetails/@id='' |
| Node Count | The node count evaluated how many times a specific node appears in the XML node tree. Example: Count(./TotalLossEval) = 0 |

In creating a node result discrepancy rule, the rule generation system 102 is operative to track the page node name of the page node, such as through the use of the evaluative expression database 116 or through the insurance claim processing computer system. The rule generation system 102 uses tracking to help the advanced evaluative expression module 216 determine the type of pathing, relative or absolute, to use when generating the evaluative expression of the advanced portion of the rule. For example, the rule generation system 102 may detect that the selected question for the advanced portion of the rule is located on a child node of the starting node given in the Starting Node Page parameter. In this example, the advanced evaluative expression module 216 uses relative pathing to write the advanced portion of the rule because the node on which the question exists is a child node, and the rule generation system 102 uses the starting node from the Starting Node Page parameter in evaluating the rule. In contrast, where the rule generation system 102 detects that the selected question for the advanced portion of the rule exists on a node other than a child node of the starting node, the advanced evaluative expression module 216 uses the absolute path of question to generate the advanced portion of the rule. Similar determinations may be made where the Operand Type (1) parameter is selected to be Question Count, Question Answer Count, Node Count and Node Attribute evaluations.

Although the advanced evaluative expression module 216 may use different types of pathing for a node result discrepancy rule, the advanced evaluative expression module 216 may be operative to use one type of pathing for other types of rules. For example, the advanced evaluative expression module 216 may use absolute pathing for creating the advanced portion of an evaluative discrepancy report rule. Other types of pathing for other types of rules are also possible.

The advanced evaluative expression module 216 may also be operative to help a user search for a question in the insurance claim processing computer system for use in the advanced portion of the rule. In one implementation, where a user selects Question, Question Count or Question Answer Count as the parameter value for the Operand Type (1) parameter, the advanced evaluative expression module 216 displays a Select control 1902 (FIG. 19) on the advanced evaluative expression communication interface 1100 that helps the user to search for a Question. Selecting the Select control 1902 may display another or alternative communication interface that displays the questions in the insurance claim processing computer system or a search option for searching through the questions in the insurance claim processing computer system.

The rule generation system 102 may be operative to evaluate all instances of a question rather than a single instance of the question. In one implementation, the advanced evaluative expression module 216 displays an option via the advanced evaluative expression communication interface 1100 for indicating that the rule generation system 102 should evaluative all instances of a selected question. Where the user selects to evaluate all instances of a question, the advanced evaluative expression module 216 may append a syntax indicator for absolute pathing to the beginning of the evaluative expression of the advanced portion of the rule. For example, the advanced evaluative expression module 216 may append the characters "//" to the beginning of the advanced portion of the rule.

Selecting other types of operands for the Operand Type (1) parameter may present additional options to the user. For example, there may be additional options associated with the Node Count operand or the Node Attribute operand. In one implementation, where the user selects the Node Count operand or the Node Attribute operand, the advanced evaluative expression module 216 is operative to display on the advanced evaluative expression communication interface 1100 a drop-down list of all of the page node names in the insurance claim processing computer system.

After providing the operands and operators using the advanced evaluative expression communication interface 1100, the user may then save the advanced rule by selecting a Save control. In one implementation, selecting the Save control causes the advanced evaluative expression module 216 to communicate the advanced portion of the rule to the evaluative expression generator module 220. The evaluative expression generator module 220 may then communicate the advanced portion of the rule to one or more evaluative expression tables 202-210. For example, the evaluative expression generator module 220 may append the advanced portion of the rule to the T_RULE entry associated with the rule, or may populate the T_ADVANCED_RULE entry associated with the rule. However, the evaluative expression generator module 220 may also populate other entries of the evaluative expression tables 202-210. Moreover, the rule generation system 102 may be operative to prohibit or prevent the user from using the Save control until the rule is provided with a common portion, an advanced portion, or both.

Figure 18:
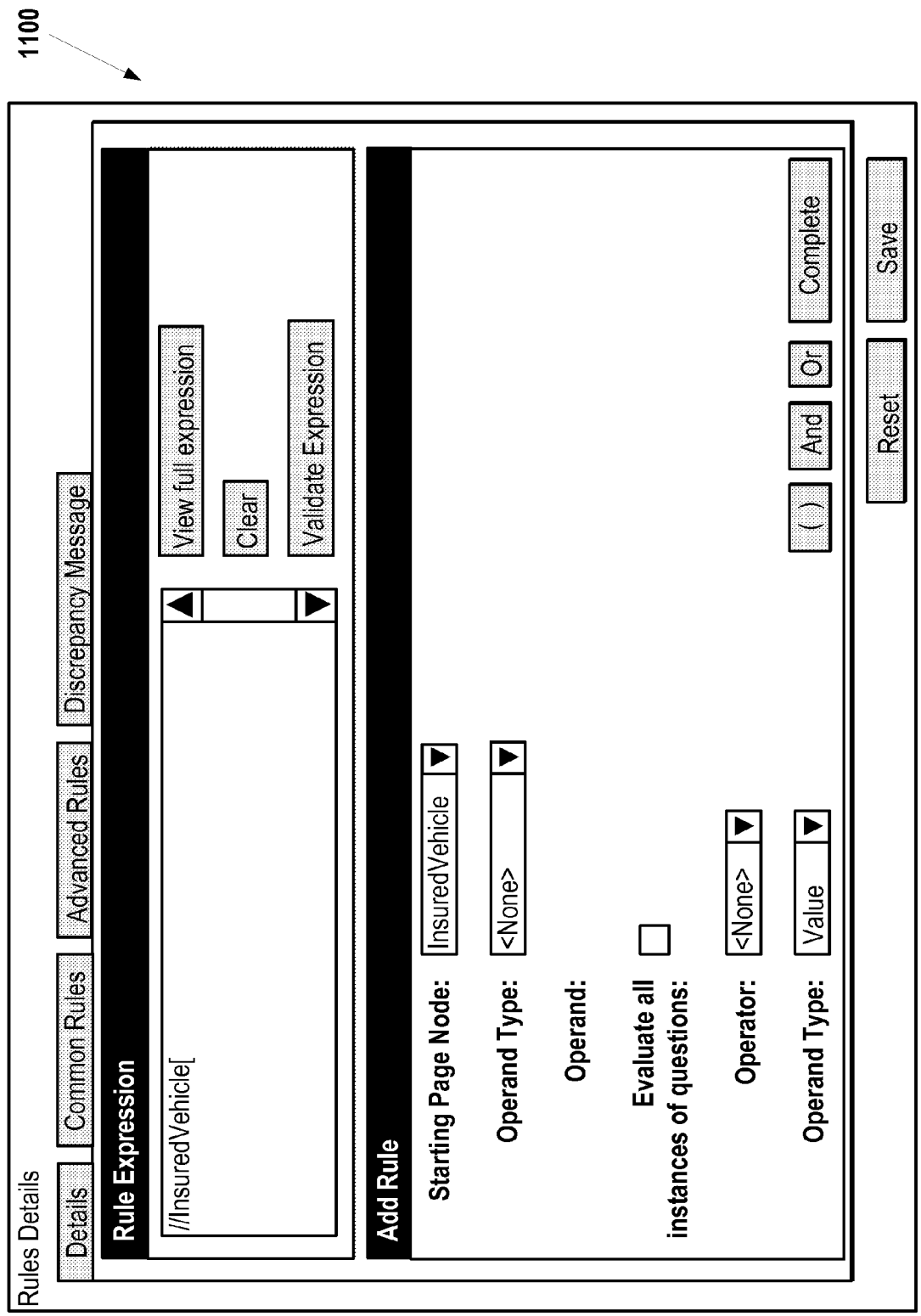

FIGS. 18-20 also show an example of building an advanced portion of a node discrepancy report rule. FIG. 18 shows the advanced evaluative expression communication interface 1100 where the user has selected a starting page node for the advanced portion of the node discrepancy report rule. FIG. 19 shows the advanced evaluative expression communication interface 1100 where the user selected the Question operand as the parameter value for the Operand Type (1) parameter. FIG. 20 shows the advanced evaluative expression communication interface 1100 where the user selected the "=" operator for the Operator parameter and the Value operand for the Operand Type (2) parameter. FIG. 20 further shows that the parameter values for the Value parameter correspond to the type of answers expected for the selected questions. FIG. 21 shows that the user has added the criteria from FIGS. 18-20 to the advanced portion of the node discrepancy report rule. FIG. 21 also shows that the user has selected a logical AND operator.

Figure 23:
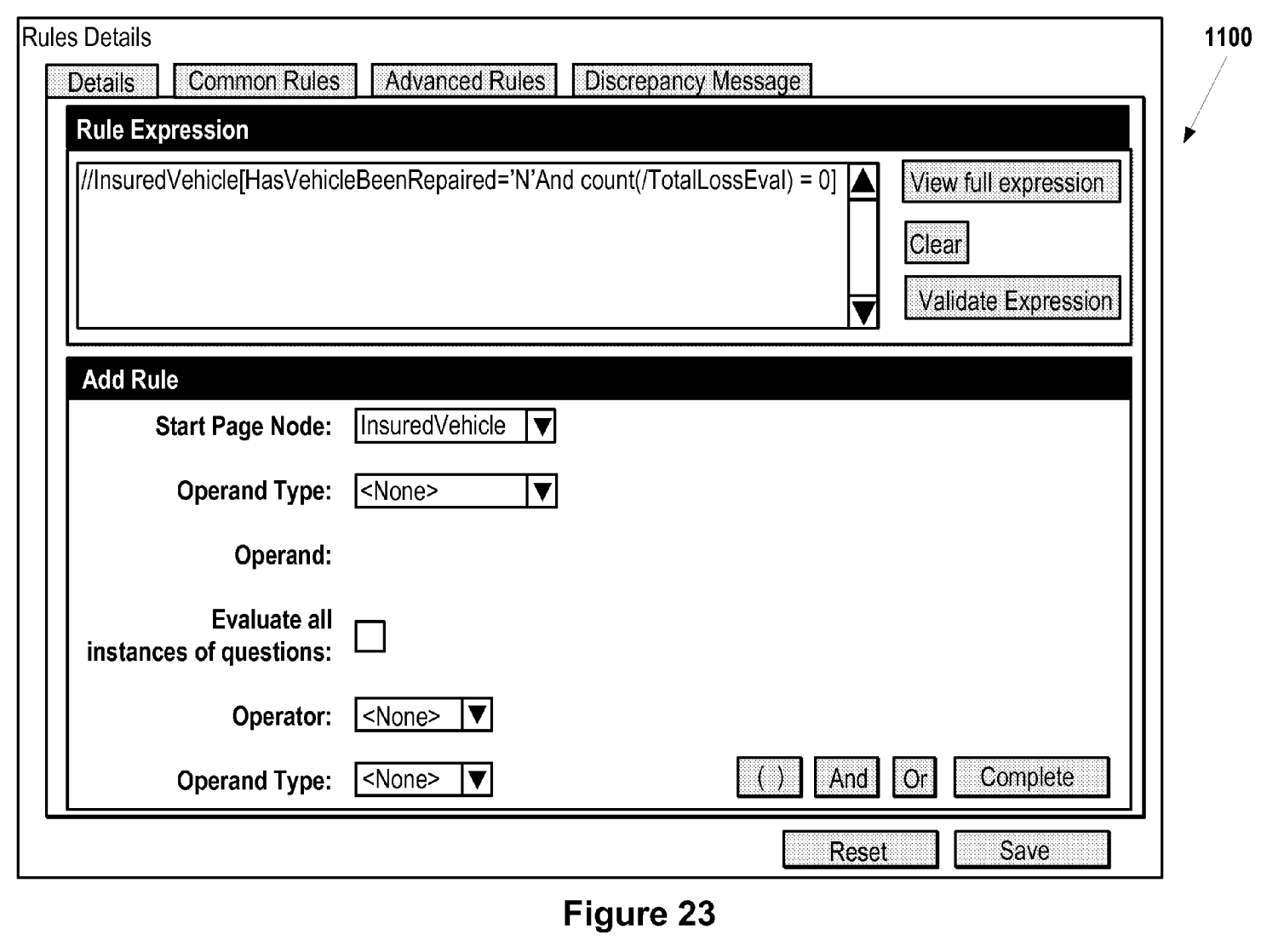

FIGS. 22-23 show the user building a second advanced portion of the node discrepancy report rule of FIGS. 17-21. FIG. 22 shows that user has selected the Node Count operand for the Operand Type (1) parameter, that the parameter values for the Operand parameter correspond to the page node names in the insurance claim processing computer system, and that the Operand Type (2) parameter value is Value. Finally, FIG. 23 shows that the user has added the second advanced portion to the node discrepancy report rule. As previously discussed, the advanced evaluative expression module 216 is operative to build upon previously configured advanced portions of rules, and in the example shown in FIG. 23, the advanced evaluative expression module 216 has read from the parameter values selected by the user and appended those parameter values to the first advanced portion previously created. Although FIGS. 17-23 provide an example of a user building an advanced rule with only two advanced portions, a user may add up to an infinite amount of advanced portions to a rule. Conversely, a rule may only have one or no advanced portion. The configuration possibilities for an advanced rule are unlimited.

Discrepancy Messages

Figure 24:
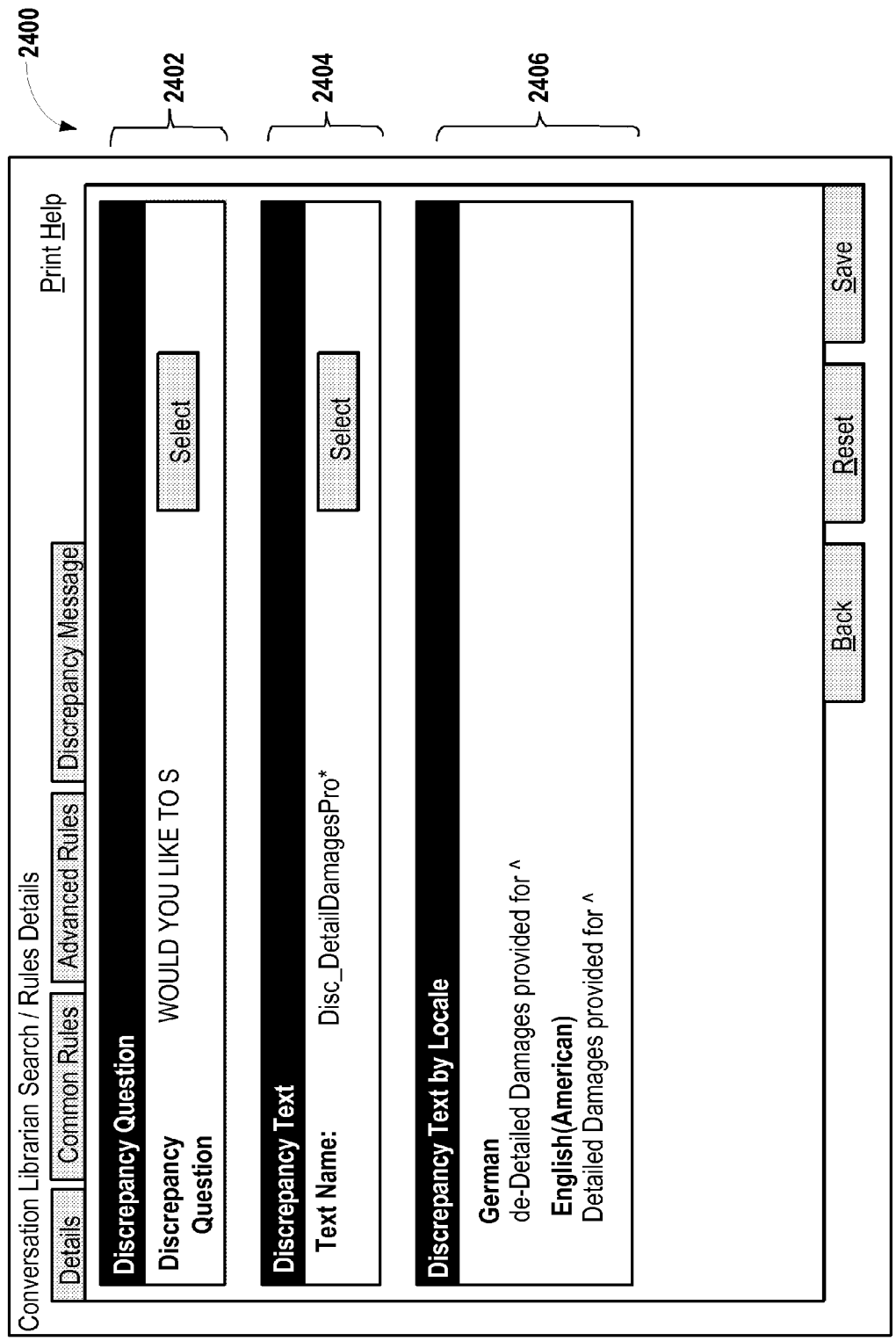
FIGS. 24-25 show examples of evaluation expression communication interfaces implemented by the discrepancy evaluative expression module of FIG. 2.
Figure 25:
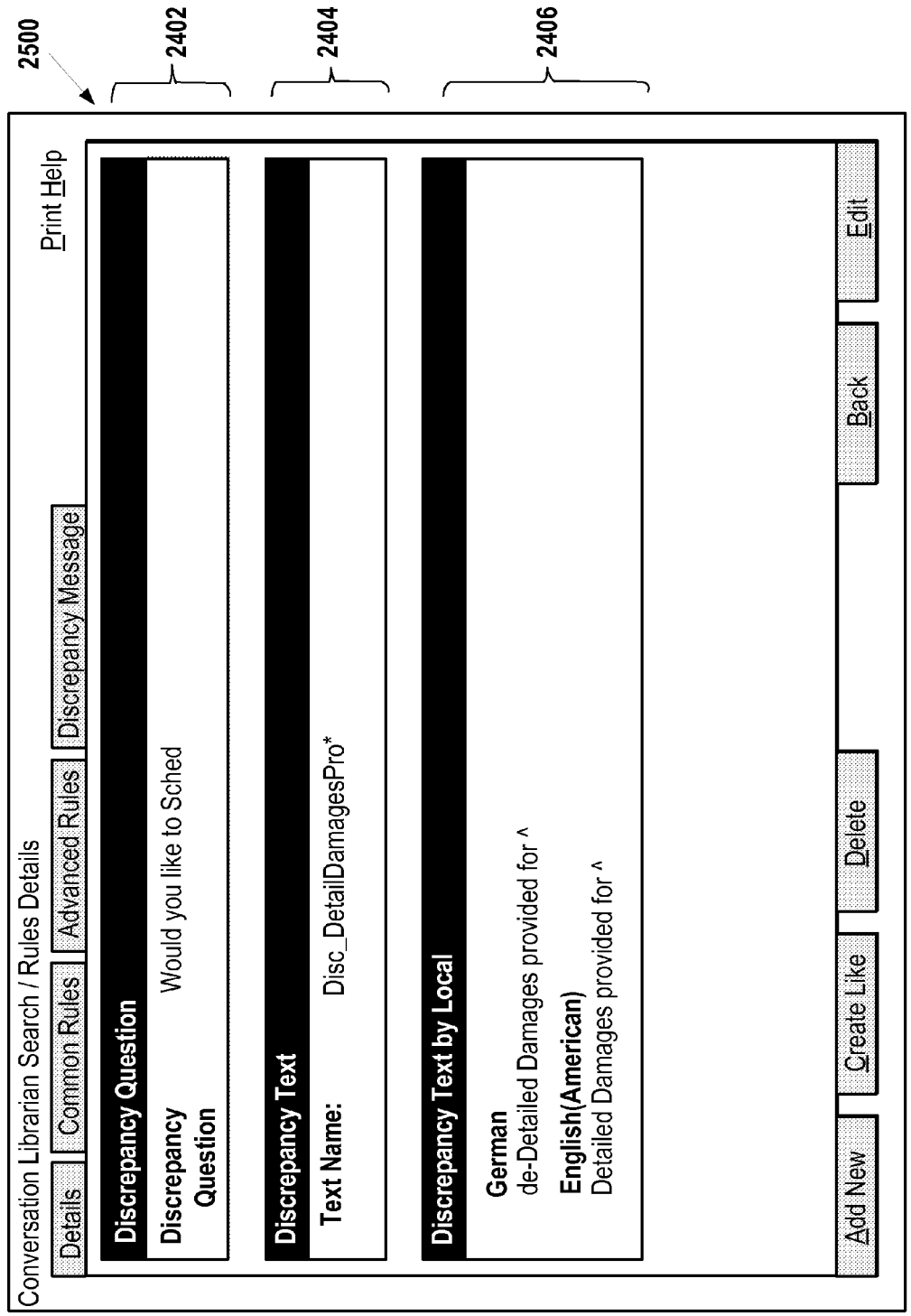

FIGS. 24-25 show examples of evaluation expression communication interfaces 2400-2500 implemented by the discrepancy evaluative expression module 218 of FIG. 2. In general, the discrepancy evaluative expression module 218 is operative to associate text messages with a discrepancy rule, such as an evaluative discrepancy report rule or a node discrepancy report rule. FIG. 24 shows an example of an evaluative expression communication interface 2400 implemented by the discrepancy evaluative expression module 218 for associating text messages with a discrepancy rule.

In one implementation, the evaluative expression communication interface 2400 includes three display sections: a discrepancy question display section 2402, a discrepancy text display section 2404, and a discrepancy locale display section 2404. In one implementation, a question generally has three parts: a question name, a text name, and a text message. The discrepancy question display section 2402 is operative to display the question name of the question associated with the discrepancy rule. The discrepancy text display section 2404 is operative to display the name of the text message. The discrepancy locale display section 2404 is operative to display the text message associated with the discrepancy rule. Where the text message is displayable in more than one language, the discrepancy text display section 2404 displays the text discrepancy message in its various languages. Table 12 shows the various parameters displayed in the evaluative expression communication interface 2400 and their associated entries in the evaluative expression tables 202-210.

TABLE 12

| Parameter | Entry | Table |
|---|---|---|
| Discrepancy Question | N_QUESTION_ID | Evaluative expression association table 208 |
| Text Name | M_CONV_TEXT_NM | Evaluative expression text table 206 |
| Discrepancy Text | T_MSG_TEXT | Evaluative expression text table 206 |

Using the Select controls of the evaluative expression communication interface 2400, a user may search for either the name of the question or the name of the text message associated with a question. For example, selecting the Select control of the discrepancy question display section 2402 allows the user to search for the question name of a question, select the question name of the question, and associate the question with the discrepancy rule. Associating the question with the discrepancy rule also associates the text message associated with the question with the discrepancy rule. As another example, selecting the Select control of the discrepancy text display section 2404 allows the user to search for the text name of a text message, and associate the text message with the discrepancy rule. Associating the text message with the discrepancy rule also associates the question associated with the text message with the discrepancy rule. While numerous text messages may be associated with a discrepancy rule, the discrepancy evaluative expression module 218 may restrict the number of text messages to one text message per discrepancy rule. Similarly, the discrepancy evaluative expression module 218 may require that at least one text message is associated with a discrepancy rule. However, the number of text messages associated with a discrepancy rule may be zero or unlimited.

In general, the text messages are stored in the evaluative expression database 116. When the evaluative expression module 218 associates a text message with a discrepancy rule, the evaluative expression module 218 communicates with one or more tables 202-210 to store the association between the text message and the discrepancy rule.

The evaluative expression module 218 receives the selection of the text message. In general, the text message may be identified by a system identifier, numerical or otherwise. The evaluative expression module 218 then communicates the text message system identifier to the evaluative expression tables 202-210 to associate the text message with the discrepancy rule. For example, the evaluative expression module 218 may store the text message system identifier as a parameter value for the N_CONV_TEXT_ID entry of the evaluative expression association table 208. The N_CONV_TEXT_ID entry of the evaluative expression association table 208 may then be used as a foreign key to the N_CONV_TEXT_ID entry, or other entries, of the evaluative expression text table 206. The evaluative expression module 218 may also store the question name of the question associated with the text message in one of the evaluative expression tables 202-210. Alternatively, a question may have a system identifier and the evaluative expression module 218 stores the question system identifier in one or more evaluative expression tables 202 to associate the question with the discrepancy rule.

The discrepancy evaluative expression module 218 is also operative to display an evaluative expression communication interface for viewing the discrepancy message details of a discrepancy rule. FIG. 25 shows an evaluative expression communication interface 2500 implemented by the discrepancy evaluative expression module 218 for viewing the message details of a selected discrepancy rule. In displaying the message details of a selected discrepancy rule, the discrepancy evaluative expression module 218 is operative to retrieve the parameter values displayed by the display sections 2402-2406 from the evaluative expression tables 202-210 and the evaluative expression database 116.

Figure 26:
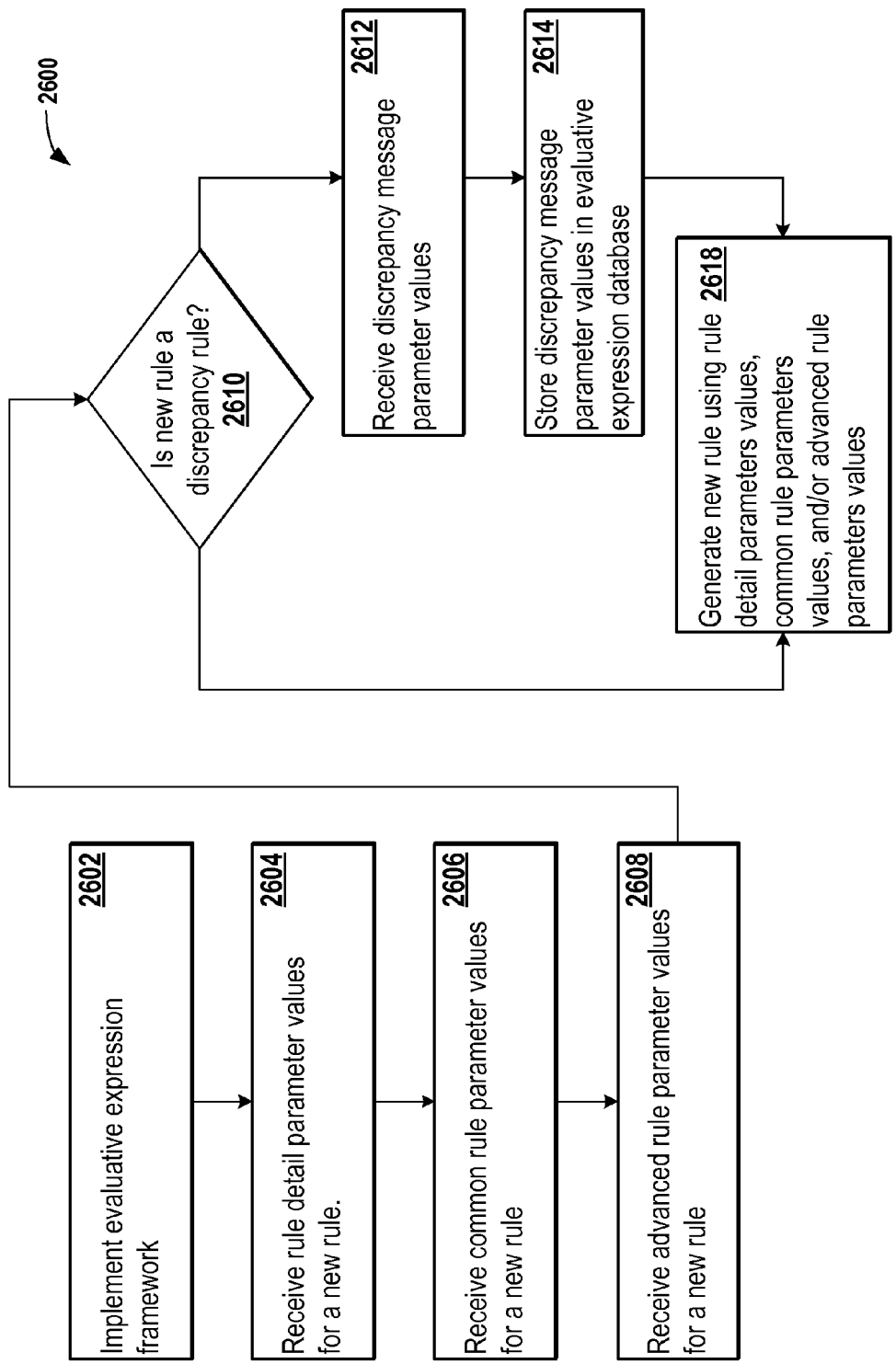
FIG. 26 shows an example of logic flow for generating an evaluative expression using the rule generation system of FIG. 1.

FIG. 26 shows an example of logic flow 2600 for generating an evaluative expression using the rule generation system 102 of FIG. 1. Initially, the evaluative expression framework 118 is implemented (2602). The evaluative expression parameter module 212 then receives the rule detail parameter values for a new rule (2604). Similarly, the common evaluative expression module 214 receives common rule parameter values (2606) for creating the common portion of a rule, or the advanced evaluative expression module 216 receives advanced rule parameter values (2608) for creating the advanced portion of a rule.

The rule generation system 102 then determines whether the created rule is a discrepancy rule (2610). Where the new rule is a discrepancy rule, the discrepancy evaluative expression module 218 receives discrepancy message parameter values from the user (2612). The discrepancy evaluative expression module 218 then stores the discrepancy message detail parameter values in the evaluative expression database 116, such as in the entries of one or more evaluative expression tables 202-210. Thereafter, the rule generation system 102 proceeds to store the rule parameter values (rule detail parameter values, common rule parameters, and advanced rule parameter values) in the evaluative expression database 116. However, where the rule generation system 102 determines that the created rule is not a discrepancy rule, the rule generation system 102 may proceed to store the rule parameter values (rule detail parameter values, common rule parameters, and advanced rule parameter values) in the evaluative expression database 116.

The elements illustrated in the Figures interoperate as explained in detail above. In implementing the system described above, one or more technologies may be used. However, the technologies are merely exemplary and alternative technologies may be used as well. For example, the system may be implemented in one or more computer programming languages. Examples of computer programming languages include ASP, C, and PHP. The system may also use various computer programming frameworks including the .NET framework available from Microsoft Corporation located in Redmond, Wash. The system may also use various database technologies including Microsoft SQL Server, also available from the Microsoft Corporation. In addition, the system may use markup languages, such as XML for transmitting data structures and additional data type definitions, HTML, DHTML, or other markup languages.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs or other forms of ROM or RAM either currently known or later developed.

Furthermore, although specific components of innovations were described, methods, systems, and articles of manufacture consistent with the innovation may include additional or different components. For example, a processor may be implemented as a microprocessor, microcontroller, insurance application specific integrated circuit (ASIC), discreet logic, or a combination of other categories of circuits or logic. Similarly, memories may be DRAM, SRAM, Flash or any other category of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors. The framework used herein may be any diagram, plan, scheme, organizational pattern, structure, schema, or combinations thereof. The framework may further describe one or more databases to a database management system, including the aspects of a database, such as attributes, fields, domains, and parameters of the attributes or fields.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

I claim:

1. A rule generation system to generate rules for a computer program, the system comprising: a processor; a memory storage device comprising a computer program, the computer program comprising instructions executable with the processor, the instructions comprising:

an evaluative expression parameter module configured to generate a graphical user interface for creation of a navigation rule, the navigation rule being indicative of whether to navigate from a first page of the computer program to a second page of the computer program;

the evaluative expression parameter module further configured to receive an expression parameter, a logical operator, and at least one expression parameter value from the graphical user interface in response to user input via the graphical user interface at runtime, the expression parameter identifying a question displayed on the first page of the computer program, the at least one expression parameter value including at least one potential answer to the question, wherein the expression parameter and the at least one expression parameter value are operands of the logical operator;

an evaluative expression generator configured to generate the navigation rule, the navigation rule including a combination of a first evaluative expression and a second evaluative expression, the first evaluative expression comprising the expression parameter, the operator, and the at least one expression parameter value;

instructions executable with the processor to store the first and second evaluative expressions in a database;

instructions executable with the processor to receive an answer to the question displayed on the first page from user input at runtime;

instructions executable with the processor to evaluate the first and second evaluative expressions retrieved from the database at runtime, the expression parameter set to the answer in the evaluation of the first evaluative expression; and instructions executable with the processor to navigate to the second page from the first page at runtime based on the evaluation of the first and second evaluative expressions retrieved from the database.

2. The rule generation system of claim 1, wherein the instructions further comprise a common evaluative expression module configured to receive names of common rules from the graphical user interface in response to user input, the evaluative expression generator further configured to include the names of the common rules as operands in the evaluative expression, the evaluation of the evaluative expression depending on an evaluation of the common rules.

3. The rule generation system of claim 1, wherein
the computer program further comprises instructions executable with the processor to navigate from the first page to the second page based on the evaluation of the first and second evaluative expressions of the navigation rule without a restart of the computer program between receipt of the second evaluative expression through the graphical user interface and the evaluation of the navigation rule.

4. The rule generation system of claim 1, wherein
the evaluative expression parameter module is further configured to generate a second graphical user interface that includes a name of the navigation rule selectable for inclusion in evaluative expressions of rules other than the navigation rule; and
the evaluative expression parameter module is further configured to receive an expiration date for the navigation rule from the first graphical user interface in response to user input, and the expiration date indicates when the evaluative expression parameter module stops including the navigation rule in the second graphical user interface.

5. The rule generation system of claim 1, wherein the evaluative expression parameter module is further configured to modify the first and second evaluative expressions of the navigation rule based on expression parameters and expression parameter values received from the graphical user interface in response to user input at runtime.

6. The rule generation system of claim 1, wherein the evaluative expression parameter module is further configured to create a page display rule, the navigation rule, or a discrepancy rule depending on what evaluative expression category is received from the graphical user interface.

7. A computer-implemented method for generating rules for an application, the method comprising:

generating a graphical user interface with a processor for creation of a navigation rule, the navigation rule indicative of where to navigate when leaving a page in the application;

receiving an expression parameter, a logical operator, and at least one expression parameter value with the processor from the graphical user interface in response to user input entered through the graphical user interface, the expression parameter identifying a question, the at least one expression parameter value including at least one potential answer to the question, wherein the expression parameter and the at least one expression parameter value are operands of the logical operator;

generating the navigation rule with the processor, the navigation rule including a combination of a first evaluative expression and a second evaluative expression, the first evaluative expression comprising the expression parameter, the operator, and the at least one expression parameter value;

storing the first and second evaluative expressions in a database; receiving an answer to the question with the processor from user input; evaluating the first and second evaluative expressions retrieved from the database at runtime with the processor, the expression parameter set to the answer in the evaluation of the first evaluative expression; and determining a next page with the processor when navigating away from the page based on the evaluation of the first and second evaluative expressions of the navigation rule.

8. The computer-implemented method of claim 7 further comprising:

receiving names of common rules from the graphical user interface in response to user input; and including the names of the common rules as operands in the second evaluative expression, wherein evaluating the second evaluative expression further comprises evaluating the common rules.

9. The computer-implemented method of claim 7 further comprising:

generating the graphical user interface for creation of a page display rule, the page display rule indicative of whether to display an element on the page;

receiving a third evaluative expression from the graphical user interface in response to user input;

generating the page display rule comprising the third evaluative expression; and determining whether to display the element on the page based on an evaluation of the page display rule without stopping the application after receiving the third evaluative expression.

10. The computer-implemented method of claim 7 further comprising receiving an expiration date for the navigation rule from the graphical user interface in response to user input, the expiration date indicative of when to stop displaying the navigation rule in the graphical user interface for inclusion in evaluative expressions of rules other than the navigation rule.

11. The computer-implemented method of claim 7 further comprising creating a discrepancy rule from a third evaluative expression received from the graphical user interface in response to user input, wherein the discrepancy rule indicates whether data discrepancies exist in answers provided to questions, and the answers are received by the application.

12. The computer-implemented method of claim 7 further comprising modifying the second evaluative expression in the navigation rule based on expression parameters and expression parameter values received from the graphical user interface in response to user input.

13. The computer-implemented method of claim 7 further comprising creating a page display rule, the navigation rule, or a discrepancy rule depending on what evaluative expression category is received from the graphical user interface in response to user input.

14. A non-transitory machine-readable medium comprising a software program for rule generation, the software program comprising instructions executable with a processor to:
generate a graphical user interface for creation of a navigation rule, the navigation rule indicative of where to navigate to when leaving a page of the software program;
receive a first expression parameter, a logical operator, and at least one expression parameter value entered through the graphical user interface in response to user input at runtime of the software program, the first expression parameter identifying a question, the at least one expression parameter value including at least one potential answer to the question, wherein the first expression parameter and the at least one expression parameter value are operands of the logical operator;
generate the navigation rule, the navigation rule comprising an evaluative expression comprising the first expression parameter, the operator, the at least one expression parameter value, and a second expression parameter;
store the evaluative expression in a database;
receive an answer to the question from user input at runtime of the software program;
evaluate the evaluative expression retrieved from the database at runtime of the software program, the first expression parameter set to the answer in the evaluation of the evaluative expression; and
navigate away from the page to a next page of the software program based on the evaluation of the evaluative expression of the navigation rule without a stop of the software program after the receipt of the first expression parameter, the logical operator, and the at least one expression parameter value from the graphical user interface.

15. The non-transitory machine-readable medium of claim 14, wherein the instructions are further configured to:
receive names of common rules from the graphical user interface in response to user input; and
include the names of the common rules as operands in the evaluative expression, and the evaluation of the evaluative expression depends on an evaluation of the common rules.

16. The non-transitory machine-readable medium of claim 14, wherein the instructions are further configured to:
generate a second graphical user interface that includes a name of a page display rule selectable for inclusion in evaluative expressions of rules other than the page display rule, the page display rule indicative of whether to display the question on the page; and
receive an expiration date for the page display rule from a third graphical user interface in response to user input, the expiration date indicative of when to stop including the name of the page display rule in the second graphical user interface.

17. The non-transitory machine-readable medium of claim 14, wherein the instructions are further configured to create a discrepancy rule from a second evaluative expression received from the graphical user interface in response to user input, wherein the discrepancy rule indicates whether data discrepancies exist in answers provided to questions.

18. The non-transitory machine-readable medium of claim 14, wherein the instructions are further configured to modify the evaluative expression of the navigation rule based on expression parameters and expression parameter values received from the graphical user interface in response to user input at runtime.

19. The non-transitory machine-readable medium of claim 14, wherein the instructions are further configured to create a page display rule, the navigation rule, or a discrepancy rule depending on an evaluative expression category received from the graphical user interface in response to user input.

\* \* \* \* \*

UNITED STATES PATENT AND TRADEMARK OFFICE
CERTIFICATE OF CORRECTION

| | | |
|---|---|---|
| PATENT NO. | : 8,515,786 B2 | Page 1 of 2 |
| APPLICATION NO. | : 12/036115 | |
| DATED | : August 20, 2013 | |
| INVENTOR(S) | : Eugene Goldfarb | |

It is certified that error appears in the above-identified patent and that said Letters Patent is hereby corrected as shown below:

On the Title Page

Page 4 in U.S. Patent Documents, item (56), delete "McGriffin" and insert --McGiffin--

Page 6 in Other Publications, item (56), column 2 line 14 delete "Judgment(Partial)" and insert --Judgment (Partial)--

Page 7 in Other Publications, item (56), column 1 line 15 delete "Flaherty" and insert --Flaharty--

Page 7 in Other Publications, item (56), column 2 line 20 delete "or ," and insert --or,--

Page 11 in Other Publications, item (56), column 2 line 4 delete "GMBH" and insert --GmbH--

Page 11 in Other Publications, item (56), column 2 line 8 delete "GMBH" and insert --GmbH--

Page 11 in Other Publications, item (56), column 2 line 12 delete "GMBH" and insert --GmbH--

Page 11 in Other Publications, item (56), column 2 line 16 delete "GMBH" and insert --GmbH--

Page 11 in Other Publications, item (56), column 2 line 20 delete "GMBH" and insert --GmbH--

Page 11 in Other Publications, item (56), column 2 line 24 delete "GMBH" and insert --GmbH--

Page 11 in Other Publications, item (56), column 2 line 28 delete "GMBH" and insert --GmbH--

Page 11 in Other Publications, item (56), column 2 line 32 delete "GMBH" and insert --GmbH--

Page 12 in Other Publications, item (56), column 1 line 9 delete "GMBH" and insert --GmbH--

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,515,786 B2

In the Claims

Column 39 line 44 set line as new paragraph listing (move out to margin)

UNITED STATES PATENT AND TRADEMARK OFFICE
CERTIFICATE OF CORRECTION

PATENT NO. : 8,515,786 B2  Page 1 of 1
APPLICATION NO. : 12/036115
DATED : August 20, 2013
INVENTOR(S) : Eugene Goldfarb It is certified that error appears in the above-identified patent and that said Letters Patent is hereby corrected as shown below:

On the Title Page

Item (73) Assignee, delete "GmbH" and insert -- Limited --

Signed and Sealed this
Twenty-fifth Day of February, 2014

Michelle K. Lee
*Deputy Director of the United States Patent and Trademark Office*